(12) United States Patent
Moriyama et al.

(10) Patent No.: US 8,235,420 B2
(45) Date of Patent: Aug. 7, 2012

(54) STEERING APPARATUS, MANUFACTURING METHOD OF STEERING APPARATUS AND MANUFACTURING METHOD OF SHAFT

(75) Inventors: Seiichi Moriyama, Gunma (JP);
Hiromichi Komori, Gunma (JP);
Tsuyoshi Itou, Kanagawa (JP);
Masaharu Igarashi, Gunma (JP);
Yoshiro Udo, Gunma (JP)

(73) Assignee: NSK Ltd., Tokyo (JP)

( * ) Notice: Subject to any disclaimer, the term of this patent is extended or adjusted under 35 U.S.C. 154(b) by 273 days.

(21) Appl. No.: 12/594,087

(22) PCT Filed: Apr. 25, 2008

(86) PCT No.: PCT/JP2008/058142
§ 371 (c)(1),
(2), (4) Date: Sep. 30, 2009

(87) PCT Pub. No.: WO2008/136445
PCT Pub. Date: Nov. 13, 2008

(65) Prior Publication Data
US 2010/0109273 A1    May 6, 2010

(30) Foreign Application Priority Data

Apr. 27, 2007 (JP) ................... 2007-118500
Dec. 28, 2007 (JP) ................... 2007-339349
Jan. 29, 2008 (JP) ................... 2008-017053
Feb. 14, 2008 (JP) ................... 2008-032705

(51) Int. Cl.
*B62D 1/16* (2006.01)
*B62D 1/18* (2006.01)
*F16D 3/16* (2006.01)

(52) U.S. Cl. .......... 280/777; 74/492; 280/779; 464/134; 403/235

(58) Field of Classification Search ............. 280/93.506, 280/777, 779; 74/492; 403/290, 235; 464/134; 180/443, 444
See application file for complete search history.

(56) References Cited

U.S. PATENT DOCUMENTS
4,927,174 A * 5/1990 Jones ............................ 280/777
(Continued)

FOREIGN PATENT DOCUMENTS
JP         6-72779 U    10/1994
(Continued)

OTHER PUBLICATIONS
International Search Report for PCT/JP2008/058142 dated Jul. 1, 2008 [PCT/ISA/210].
(Continued)

*Primary Examiner* — Joseph Rocca
(74) *Attorney, Agent, or Firm* — Sughrue Mion, PLLC

(57) ABSTRACT

An intermediate shaft is provided which connects a steering shaft and a steering gear mechanism together via a universal joint, a shoulder bolt is provided which fastens one of yokes of the universal joint and a shaft portion of the intermediate shaft and on which a small diameter portion and a large diameter portion which are adapted to be brought into engagement with an outer circumferential surface of the shaft portion are formed sequentially from a distal end portion side, and the intermediate shaft has a bolt engagement recess portion which is formed on an outer circumferential surface of the shaft portion in such a manner as to extend in a direction which intersects an axial direction and which is adapted to be brought into engagement with the large diameter portion of the shoulder bolt and a dislocation preventive projecting portion which is formed on an outer circumferential surface of an end portion thereof, whereby a temporary fastening is implemented by bringing the small diameter portion of the shoulder bolt into engagement with an outer circumferential surface which lies adjacent to the bolt engagement recess portion, and a final fastening is implemented by bringing the large diameter portion of the shoulder bolt into engagement with the bolt engagement recess portion.

20 Claims, 41 Drawing Sheets

U.S. PATENT DOCUMENTS

| | | | |
|---|---|---|---|
| 5,090,833 A * | 2/1992 | Oertle et al. | 403/12 |
| 5,358,350 A * | 10/1994 | Oertle | 403/12 |
| 5,640,884 A * | 6/1997 | Fujiu et al. | 74/492 |
| 5,653,146 A * | 8/1997 | Barton | 74/492 |
| 5,813,788 A * | 9/1998 | Yamamoto et al. | 403/57 |
| 5,829,310 A * | 11/1998 | DePaolis | 74/492 |
| 6,026,704 A * | 2/2000 | Shibata et al. | 74/496 |
| 6,270,418 B1 * | 8/2001 | Oka et al. | 464/89 |
| 6,443,650 B2 * | 9/2002 | Ikeda | 403/12 |
| 6,565,446 B2 * | 5/2003 | Oka et al. | 464/89 |
| 7,481,459 B2 * | 1/2009 | Lednicky et al. | 280/779 |
| 7,513,709 B2 * | 4/2009 | Shimada et al. | 403/399 |
| 2001/0012470 A1 * | 8/2001 | Ikeda | 403/290 |
| 2005/0077716 A1 * | 4/2005 | Urista et al. | 280/777 |
| 2005/0282641 A1 * | 12/2005 | Sadakata et al. | 464/134 |
| 2006/0073902 A1 * | 4/2006 | Sekine | 464/134 |

FOREIGN PATENT DOCUMENTS

| | | |
|---|---|---|
| JP | 6-72780 U | 10/1994 |
| JP | 9-210074 A | 8/1997 |
| JP | 11-280777 A | 10/1999 |
| JP | 2000-249157 A | 9/2000 |
| JP | 2001-221244 A | 8/2001 |
| JP | 2006-38058 A | 2/2006 |

OTHER PUBLICATIONS

Written Opinion PCT/JP2008/056532 [PCT/ISA/237], Dated Jul. 1, 2008.

* cited by examiner

STEERING APPARATUS, MANUFACTURING METHOD OF STEERING APPARATUS AND MANUFACTURING METHOD OF SHAFT

TECHNICAL FIELD

The present invention relates to a steering apparatus including an intermediate shaft which connects a steering shaft to which a steering wheel is attached with a steering gear mechanism via universal joints which are provided at both ends thereof and a manufacturing method of the steering apparatus, and improvements to a connecting portion between a shaft and a yoke of a universal joint which is made use of for connection of end portions of various types of shafts which make up the steering apparatus and yokes of universal joints and a manufacturing method of the shaft.

BACKGROUND ART

As a steering apparatus of this type, there is known an attaching construction of a steering column lower joint portion in which a fastening bolt is brought into engagement with a cut-out groove which is formed on a connecting shaft portion of a steering column which is connected to a lower joint, so as to fix a top lower joint by tightening the bolt and the fastening bolt is brought into engagement with a cut-out recess portion which is formed on the connecting shaft portion, so as to fix a bottom lower joint to the connecting shaft portion by tightening the bolt, wherein a temporary fastening stepped groove portion is provided in such a manner as to extend from the cut-out groove, and a small diameter portion adapted to be brought into engagement with the temporary fastening stepped groove portion so as to temporarily fasten the top lower joint to the connecting shaft portion and a large diameter portion adapted to be brought into engagement with the cut-out groove so as to finally fix the top lower joint to the connecting portion are formed on the fastening bolt (for example, JP-UM-A-06-72780, page 1, FIG. 9).

As is shown in FIG. 49, in a steering apparatus for imparting a steering angle to steered road wheels, a steering shaft 102 having a steering wheel 101 fixed to a rear end portion thereof is supported rotatably on an inside diameter side of a steering column 103 which is supported on a vehicle body. In addition, a rear end portion of an intermediate shaft 105 is connected to a front end portion of the steering shaft 102 via a universal joint 104, and a rear end portion of an input shaft 108 of a steering gear unit 107 is connected to a front end portion of the intermediate shaft 105 via a universal joint 106. When the driver operates to turn the steering wheel 101 in this state, the rotational force is transmitted to the steering gear unit 107 via the aforesaid respective members 102, 104, 105, 106. As a result of this, tie rods (not shown) connected to both end portions in an axial direction (in a front-back direction of FIG. 49) of the steering gear unit 107 are pushed and pulled to thereby impart a steering angle to the left and right steered road wheels (not shown).

FIG. 50 shows a connecting portion between a shaft and a yoke of a universal joint that is described in JP-A-2000-249157 as a conventional construction of such a connecting portion. FIG. 50 is an exploded perspective view of a connecting portion between the front end portion of the aforesaid intermediate shaft 105 and one yoke 109 which makes up the aforesaid universal joint 106. A segmental cylindrical tube-shaped shaft attaching portion 110 is provided at a base half portion (a right-hand upper half portion of FIG. 50) of the one yoke 109. In addition, an inner circumferential surface of this shaft attaching portion 110 is made into a female serration portion 111. Additionally, a pair of flange portions 112a, 112b which are parallel to each other are provided at both edges in a circumferential direction of the shaft attaching portion 110. In addition, of the pair of flange portions, a through hole 113 is formed in part of one flange portion 112a, while a thread hole (not shown) is formed in part of the other flange portion 112b, the through hole 113 and the tread hole being formed coaxially with each other. On the other hand, an outer circumferential surface of the front end portion of the intermediate shaft 105 is made into a male serration portion 114. In addition, an engagement projecting portion 115 is formed at one location in the circumferential direction along a front edge on the outer circumferential surface of the intermediate shaft 105. This engagement projecting portion 115 is formed by plastically deforming the material of the intermediate shaft 105 at portions which lie circumferentially on both sides of a portion where the engagement projecting portion 115 is to be formed and drawing the material centrally to the portion so that the material so drawn is caused to rise radially outwards.

When connecting the front end portion of the intermediate shaft 105 and the one yoke 109 together, prior to the connection of the front end portion and the yoke, the universal joint 106 is fabricated in advance by connecting a bifurcated distal end portion of the one yoke 109 (a left-hand lower end portion of FIG. 50) and a bifurcated distal end portion of the other yoke 120 together via a cross joint (refer to FIG. 49). Then, in this state, firstly, the front end portion of the intermediate shaft 105 is inserted into an inside of the shaft attaching portion 110, so that the male serration portion 114 is brought into loose serration engagement with the female serration portion 111 (in such a manner as to permit an axial relative displacement). At the same time as this occurs, the engagement projecting portion 115 is caused to enter between both the circumferential edges of the shaft attaching portion 110 (both the flange portions 112a, 112b). In addition, in this state, the engagement projecting portion 115 is made to be disposed axially deeper into the shaft attaching portion 110 (a deeper side in a direction in which the front end portion of the intermediate shaft 105 is inserted, a left-hand lower side of FIG. 50) than the through hole 113 and the thread hole which are formed in both the flange portions 112a, 112b, respectively. Following this, a shank portion 117 of a bolt 116 is inserted into the through hole 113. Further, a male thread portion 118 provided on a distal half portion of the shank portion 117 is screwed into the thread hole, and this bolt 116 is tightened in such a state that a head portion 119 of the bolt 116 is kept in abutment with an outer surface of the one flange portion 112a. By this action, a space between both the flange portions 112a, 112b is narrowed so as to contract the shaft attaching portion 110 in diameter, whereby the female serration portion 111 and the made serration portion 114 are brought into strong serration engagement with each other. As a result of this, the front end portion of the intermediate shaft 105 and the one yoke 109 are connected and fixed to each other.

In addition, as in the case of the steering apparatus shown in FIG. 49, when a construction is adopted in which the other yoke 120 is fixedly welded to an upper end portion of the input shaft 108, the connecting work between the front end portion of the intermediate shaft 105 and the one yoke 109 is performed in such a state that the other yoke 120 is fixedly welded to the upper end portion of the input shaft 108. In contrast to this, when as the other yoke 120, something that can be connected to the upper end portion of the input shaft 108 with a bolt (a so-called side-insertion-type yoke or the like) is adopted, the connecting work between the front end portion of the intermediate shaft 105 and the one yoke 109 can be performed before the other yoke 120 is connected to the upper end portion of the input shaft 108. As this occurs, when the work of connecting the other yoke 120 to the upper end portion of the input shaft 108 is performed after the connection of the front end portion of the intermediate shaft 105 and the one yoke 109, the connecting portion between the front end portion of the intermediate shaft 105 and the one yoke 109 is left in a temporarily fastened state, that is, the bolt 116 is kept in a loosened state only with the male thread portion 118 of the bolt 116 which has been inserted into the through hole 113 being screwed into the thread hole. In this temporarily fastened state, since the female serration portion 111 and the male serration portion 114 are put in a state where they are in loose serration engagement with each other, the front end portion of the intermediate shaft 105 and the one yoke 109 can be displaced relative to each other by a predetermined amount only in an axial direction. Specifically, the axial relative displacement is permitted between a position where the shank portion 117 of the bolt 116 and the engagement projecting portion 115 are brought into engagement with each other and a position where the cross joint 121 and a front end face of the intermediate shaft 105 are brought into abutment with each other. Consequently, the working properties in connecting the other yoke 120 to the upper end portion of the input shaft 108 can be made better by such an extent that such an axial relative displacement is allowed.

In any case, in the case of the connecting portion between the front end portion of the intermediate shaft 105 and the one yoke 109, not only when the work of connecting the other yoke 120 to the upper end portion of the input shaft 108 is performed but also even in case the temporarily fastened state occurs as a result of the bolt 116 getting loosened while a motor vehicle is running, the engagement projecting portion 115 is brought into engagement with the shank portion 117 of the bolt 116, whereby the front end portion of the intermediate shaft 105 can be prevented from being dislocated from the inside of the shaft attaching portion 110 of the one yoke 109 towards a proximal end side thereof.

Incidentally, in the case of the conventional construction that has been described above, a width dimension W of the engagement projecting portion 115 does not have to equal a space D between both the circumferential edges (both the flange portions 112a, 112b) of the shaft attaching portion in such a state that the front end portion of the intermediate shaft 105 is fixedly connected with the one yoke 109. However, from the viewpoint of increasing the accuracy with which the front end portion of the intermediate shaft 105 and the one yoke 109 match in phase with respect to the circumferential direction, the width dimension W is preferably made as close to the space D as possible. In the case of the conventional construction, however, in the event that a yoke in which the space D is wide is adopted as the one yoke 109, it becomes difficult that the width dimension W of the engagement projecting portion 115 is increased so as to match the increased width dimension. This is because as the width dimension W of the engagement projecting portion 115 which is determined in the design stage is made larger, the amount of the material of the intermediate shaft 105 at portions which lie circumferentially on both sides of a portion where the engagement projecting portion 115 is to be formed (the material which is to make up the engagement projecting portion 115) is reduced, easily calling for a shortage of the material. In addition, as another reason, this is because the increasing rate of working force exerted on the engagement projecting portion 115 becomes very large as the width dimension W of the engagement projecting portion 115 is increased and there exists a possibility that a deformation which is not preferred is produced at portions surrounding the worked portion by virtue of the working force so increased.

However, in the conventional example described in JP-UM-A-06-72780, when connecting the steering column shaft and the steering gear part are connected together by the lower joint, the cut-out groove is formed at a lower joint side end portion of the steering column shaft in a position lying in the vicinity of the end face. Further, since the temporary fastening stepped groove portion is made to be formed consecutively to a side of the cut-out groove which is opposite to the end face, in the case of an electric power steering apparatus being equipped on the vehicle as seen on recent vehicles in which a steering assist force is produced by an electric motor so as to be transmitted to a steering column shaft via a reduction gear mechanism, there still exists an unsolved problem that a torque that is to be transmitted to the steering column shaft becomes large and the rigidity of the steering column shaft is reduced due to the cross sectional area of the steering column shaft being reduced by the cut-out groove and the temporary fastening stepped groove portion.

Although it is considered that the depth of the cut-out groove, which configures a weakest portion, is made less deep in order to suppress the reduction in rigidity of the steering column shaft, as this actually occurs, the engagement force between the cut-out groove and the fastening bolt becomes small, and this produces a new problem that no sufficient stopper function can be exhibited when an impact force is transmitted to the steering column shaft in a direction in which the shaft is contracted.

DISCLOSURE OF THE INVENTION

Then, the invention has been made in view of the unsolved problems inherent in the conventional examples, and an object thereof is to provide a steering apparatus which can facilitate the assembling work of an intermediate shaft without reducing rigidity by the use of a simple construction.

In addition, in view of the situations described above, with respect to the connecting portion where the shaft and the yoke of the universal joint and the manufacturing method of the shaft, in order to cope with a case where as the yoke, a yoke is adopted in which a space between both circumferential edges (a pair of flange portions) of a shaft attaching portion is wide, the invention provides a construction which facilitates the increase in width dimension of an engagement projecting portion which is provided at one end portion of a shaft to match the increased space and a manufacturing method of the shaft.

According to a first aspect of the invention, a steering apparatus is a steering apparatus comprising an intermediate shaft which connects a steering shaft to which a steering wheel is attached and a steering gear mechanism via universal joints which are provided at both ends thereof, wherein the intermediate shaft has a bolt engagement recess portion which is formed on an outer circumferential surface of a shaft portion in such a manner as to extend in a direction which intersects an axial direction and a dislocation preventive projecting portion which is formed on an outer circumferential surface of the end portion, and wherein as a member for fastening one yoke of the universal joint and the shaft portion of the intermediate shaft together, a shoulder bolt is provided on which a small diameter portion adapted to be brought into engagement with an outer circumferential surface of the intermediate shaft and a large diameter portion adapted to be brought into engagement with the bolt engagement recess portion are formed in that order from a distal end portion side, whereby the one yoke of the universal joint and the shaft portion of the intermediate shaft are temporarily fastened together by bringing the small diameter portion of the shoulder bolt into engagement with the outer circumferential surface which lies adjacent to the bolt engagement recess portion, and the one yoke of the universal joint and the shaft portion of the intermediate shaft are finally fastened together by brining the large diameter portion of the shoulder bolt into engagement with the bolt engagement recess portion.

In addition, according to a second aspect of the invention, in the first steering apparatus described above, although the other yoke of the universal joint and the shaft of the intermediate shaft are restricted from moving relatively while the vehicle is normally driven, a predetermined collapsing stroke is made to be secured when an impact load is inputted.

In addition, according to a third aspect of the invention, in the first steering apparatus described above, a small diameter portion is formed on the shaft portion of the intermediate shaft, and a slidable connecting tube-shaped element for connecting between shaft portions which hold therebetween the small diameter portion is fitted on an outer circumference of the small diameter portion, whereby when absorbing impact, the other yoke of the universal joint pushes the connecting tube-shaped element in the axial direction to thereby release the connecting state between the shaft portions which hold therebetween the small diameter portion.

Additionally, according to a fourth aspect of the invention, in the first steering apparatus described above, a bolt dislocation preventive portion is formed at a distal end of the small diameter portion of the shoulder bolt.

In addition, according to a fifth aspect of the invention, in the first steering apparatus described above, the bolt engagement recess portion is made up of a milled groove whose bottom portion has a predetermined length in the axial direction.

Additionally, according to a sixth aspect of the invention, in the first steering apparatus described above, the shoulder bolt is made to fasten between the yoke of the universal joint which lies to face the steering gear mechanism and the shaft portion of the intermediate shaft.

In addition, according to a seventh aspect of the invention, in the first steering apparatus described above, the shoulder bolt includes a male thread formed on an outer circumferential surface of the small diameter portion and a tapered outer circumferential surface which is formed on a side of the large diameter portion which lies to face the small diameter portion and which is gradually reduced in diameter as it extends towards the small diameter portion, and the one yoke of the universal joint includes a shaft holding portion which is an annular member having a slit provided therein for free contraction in diameter so as to fit on to hold the shaft portion of the intermediate shaft, a pair of flange portions which extend from positions which hold therebetween the slit in the shaft holding portion with a predetermined distance maintained therebetween, a female thread formed in one flange portions of the pair of flange portions for screw engagement with the male thread on the small diameter portion, and a bolt through hole formed in the other flange portion in such a manner as to penetrate therethrough towards the female thread for engagement with the large diameter portion of the shoulder bolt, whereby when the shoulder bolt is inserted from the other flange portion side so that the male thread on the small diameter portion is screwed into the female thread on the one flange portion in a temporarily fastened state in which the shaft holding portion is not contracted in diameter, part of the tapered outer circumferential surface formed on the side of the large diameter portion which lies to face the small diameter portion is loosely inserted into the bolt insertion hole in the other flange portion.

In addition, according to an eighth aspect of the invention, in the seventh steering apparatus described above, the shoulder bolt has a straight portion whose axial outside diameter remains the same between the small diameter portion and the bolt head portion, and a large diameter collar portion in which the tapered outer circumferential surface is provided on a side thereof which lies to face the small diameter portion is fitted on the straight portion.

Further, according to a ninth aspect of the invention, in the first steering apparatus described above, there is provided a phase matching portion which matches a circumferential phase of the shaft portion to the one yoke of the universal joint so that the bolt engagement recess portion is disposed in a position where the bolt engagement recess portion is brought into engagement with the large diameter portion of the shoulder bolt.

Furthermore, according to a tenth aspect of the invention, in the first steering apparatus described above, the shaft portion of the intermediate shaft and the one yoke of the universal joint are connected together though serration engagement or spline engagement, and the phase matching portion is made up of a projecting portion which is formed by cutting part of serration teeth or spline teeth of one of the shaft portion and the yoke and a recess portion which is formed by cutting part of serration teeth or spline teeth of the other of the shaft portion and the yoke, the projecting portion and the recess portion being made to fit in and on each other only when the bolt engagement recess portion is disposed in a position where the bolt engagement recess portion is brought into engagement with the large diameter portion of the shoulder bolt.

According to an eleventh aspect of the invention, there is provided a connecting portion between a shaft and a yoke of a universal joint, comprising a yoke of a universal joint, a shaft and a bolt, in them, the yoke having a tube-shaped shaft attaching portion which has a discontinued portion at one location in a circumferential direction, a pair of flange portions which are provided substantially parallel to each other in such a manner as to extend continuously from both circumferential edges of the shaft attaching portion, a through hole which is provided in one flange portion of both the flange portions, and a thread hole which is provided in the other flange portion in such a manner as to be coaxial with the through hole; the shaft having an engagement projecting portion on an outer circumferential surface of one end portion at one location in a circumferential direction, the one end portion being inserted into an inside of the shaft attaching portion, the engagement projecting portion being disposed at a portion which lies between the both circumferential edges of the shaft attaching portion and deeper into the shaft attaching portion in an axial direction thereof than the through hole and the thread hole; the bolt having a shank portion which has a male thread portion provided at least at a distal end portion thereof and a head portion which resides at a proximal end portion of the shank portion, of the shank portion and the head portion, by the shank portion being inserted into an inside of the through hole and by the male thread portion being screwed into the thread hole and being further tightened thereinto, the one end portion of the shaft being made to be connected to the shaft attaching portion, whereby the dislocation of the one end portion of the shaft from the inside of the shaft attaching portion towards the other end side is made to be prevented based on engagement of the shank portion of the bolt with the engagement projecting portion, even in a temporarily fastened state in which the shank portion of the bolt is inserted into the inside of the through hole and the male thread portion is screwed into the thread hole, with the bolt being not tightened, wherein the shaft is made into a tube-shaped portion at least at the one end portion thereof, and the engagement projecting portion is formed by plastically bending and erecting radially outwards one circumferential portion of the tube-shaped portion at a distal end portion thereof in such a state that the engagement projecting portion is cut apart from both circumferential side portions of the one circumferential portion.

According to a twelfth aspect of the invention, there is provided a connecting portion between a shaft and a yoke of a universal joint, comprising a yoke of a universal joint, a shaft and a bolt, in them, the yoke having a tube-shaped shaft attaching portion which has a discontinued portion at one location in a circumferential direction, a pair of flange portions which are provided substantially parallel to each other in such a manner as to extend continuously from both circumferential edges of the shaft attaching portion, a through hole which is provided in one flange portion of both the flange portions, and a thread hole which is provided in the other flange portion in such a manner as to be coaxial with the through hole; the shaft having an engagement projecting portion on an outer circumferential surface of one end portion at one location in a circumferential direction, the one end portion being inserted into an inside of the shaft attaching portion, the engagement projecting portion being disposed at a portion which lies between the circumferential edges of the shaft attaching portion and deeper into the shaft attaching portion in an axial direction thereof than the through hole and the thread hole; the bolt having a shank portion which has a male thread portion provided at least at a distal end portion thereof and a head portion which resides at a proximal end portion of the shank portion, of the shank portion and the head portion, by the shank portion being inserted into an inside of the through hole, and by the male thread portion being screwed into the thread hole and being further tightened thereinto, the one end portion of the shaft being made to be connected to the shaft attaching portion, while the dislocation of the one end portion of the shaft from the inside of the shaft attaching portion towards the other end side is made to be prevented based on engagement of the shank portion of the bolt with the engagement projecting portion, even in a temporarily fastened state in which the shank portion of the bolt is inserted into the inside of the through hole and the male thread portion is screwed into the thread hole, with the bolt being not tightened, wherein the shaft has a recessed groove formed in one circumferential location on an outer circumferential surface of a portion which lies closer to the one end portion, and the engagement projecting portion is formed by squeezing a material of the shaft residing in a portion between the recessed groove and one end face of the shaft in the axial direction of the shaft so as to erect the material so squeezed radially outwards.

According to a thirteenth aspect of the invention, there is provided a method for manufacturing a shaft which configures a connecting portion between the shaft and a yoke of a universal joint, wherein after a shaft intermediate element of which at least one end portion is made into a tube-shaped portion is manufactured, with a jig being pressed on to one circumferential portion of the tube-shaped portion at a distal end portion thereof in an axial direction to thereby cause a force directed radially outwards to be exerted on the one circumferential portion, the one circumferential portion is plastically bent and erected radially outwards while tearing off portions lying on both circumferential sides of the one circumferential portion so as to form an engagement projecting portion.

According to a fourteenth aspect of the invention, there is provided a method for manufacturing a shaft which configures a connecting portion between the shaft and a yoke of a universal joint, wherein after a shaft intermediate element in which a recessed groove is formed in one circumferential location on an outer circumferential surface of a portion which lies closer to one end portion of the shaft intermediate element, a material residing in a portion between the recessed groove and one end face of the shaft intermediate element is squeezed in an axial direction of the shaft intermediate element by a pair of jigs so as to cause the material so squeezed to be erected radially outwards to thereby form an engagement projecting portion.

According to the invention, since the bolt engagement recess portion and the dislocation preventive projecting portion are formed on the shaft of the intermediate shaft and the small diameter portion of the shoulder bolt is brought into engagement with the outer circumferential portion of the intermediate shaft, while the large diameter portion of the shoulder bolt is brought into engagement with the bolt engagement recess portion, both the temporary fastening and final fastening can be implemented without reducing the cross sectional area of the shaft of the intermediate shaft, and the free stroke length at the time of temporary fastening can be made long, thereby making it possible to obtain an advantage that the assembling work of the steering apparatus can facilitated.

According to the connecting portion between the shaft and the yoke of the universal joint and the manufacturing method of the shaft of the invention, being from the conventional construction shown in FIG. 50, there occurs no such situation that the material for forming the engagement projecting portion is reduced as the circumferential width dimension of the engagement projecting portion which is determined in the design stage is increased. In addition, compared with the case of the conventional construction shown in FIG. 50, since the working force to form the engagement projecting portion can be made small, the circumferential portion surrounding the worked portion can be made difficult to be deformed by the working force, as long as an engagement projecting portion with quite a wide width is not attempted to be formed. Consequently, even in the event that the space between both the circumferential edges (the pair of flange portions) of the shaft attaching portion which configures the yoke is wide and the circumferential width dimension of the engagement projecting portion which is determined in the design stage is increased so as to match the increase in the space between the circumferential edges of the shaft attaching portion, the formation of the engagement projecting portion is facilitated. Further, since the one circumferential portion of the tube-shaped portion provided at the one end portion of the shaft is plastically bent and erected radially outwards so as to form the engagement projecting portion, compared with the case of the conventional construction shown in FIG. 50, the height dimension of the engagement projecting portion can easily be increased.

BEST MODE FOR CARRYING OUT THE INVENTION

Hereinafter, embodiments of the invention will be described based on the drawings.

First Embodiment

Figure 1:
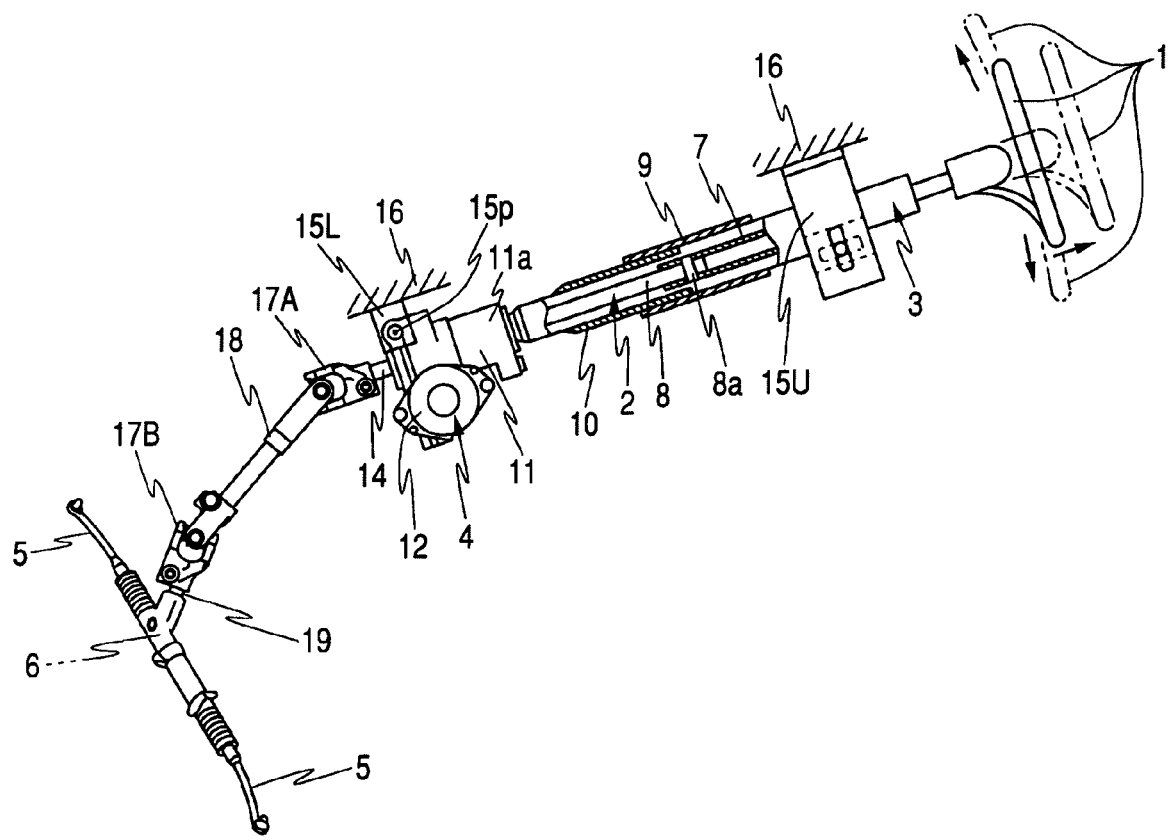
FIG. 1 An overall block diagram showing a first embodiment of the invention.
Figure 2:
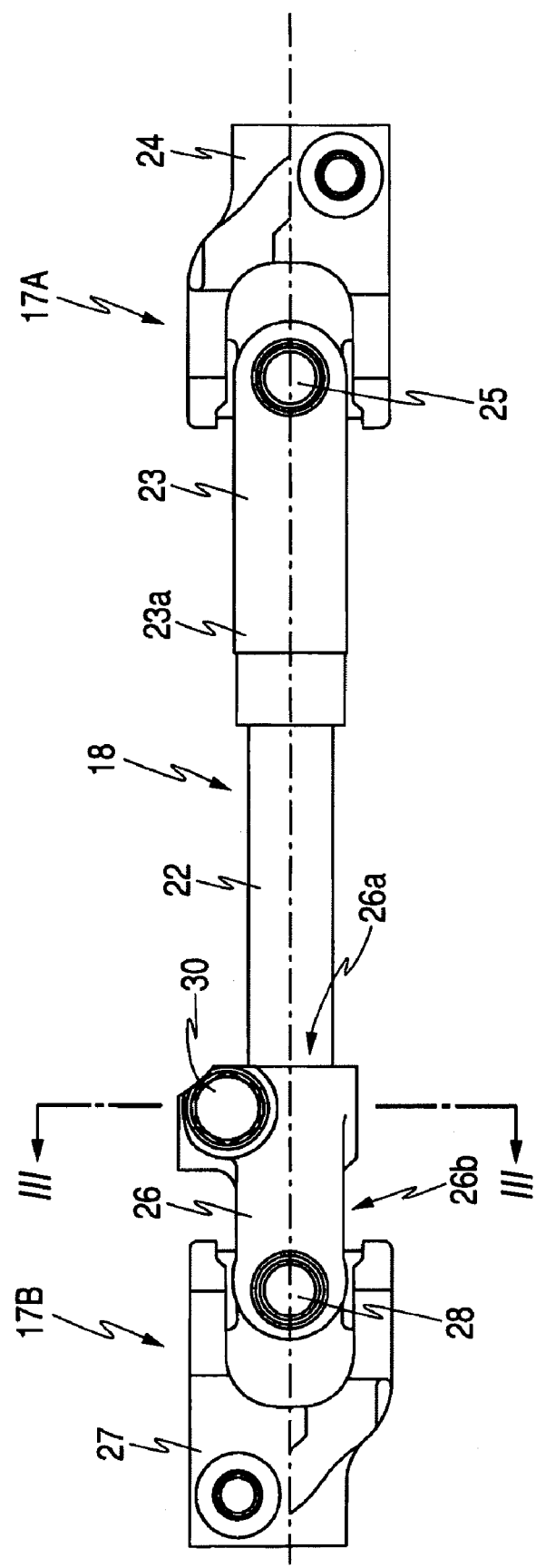
FIG. 2 A side view showing an intermediate shaft to which the invention is applied.
Figure 3:
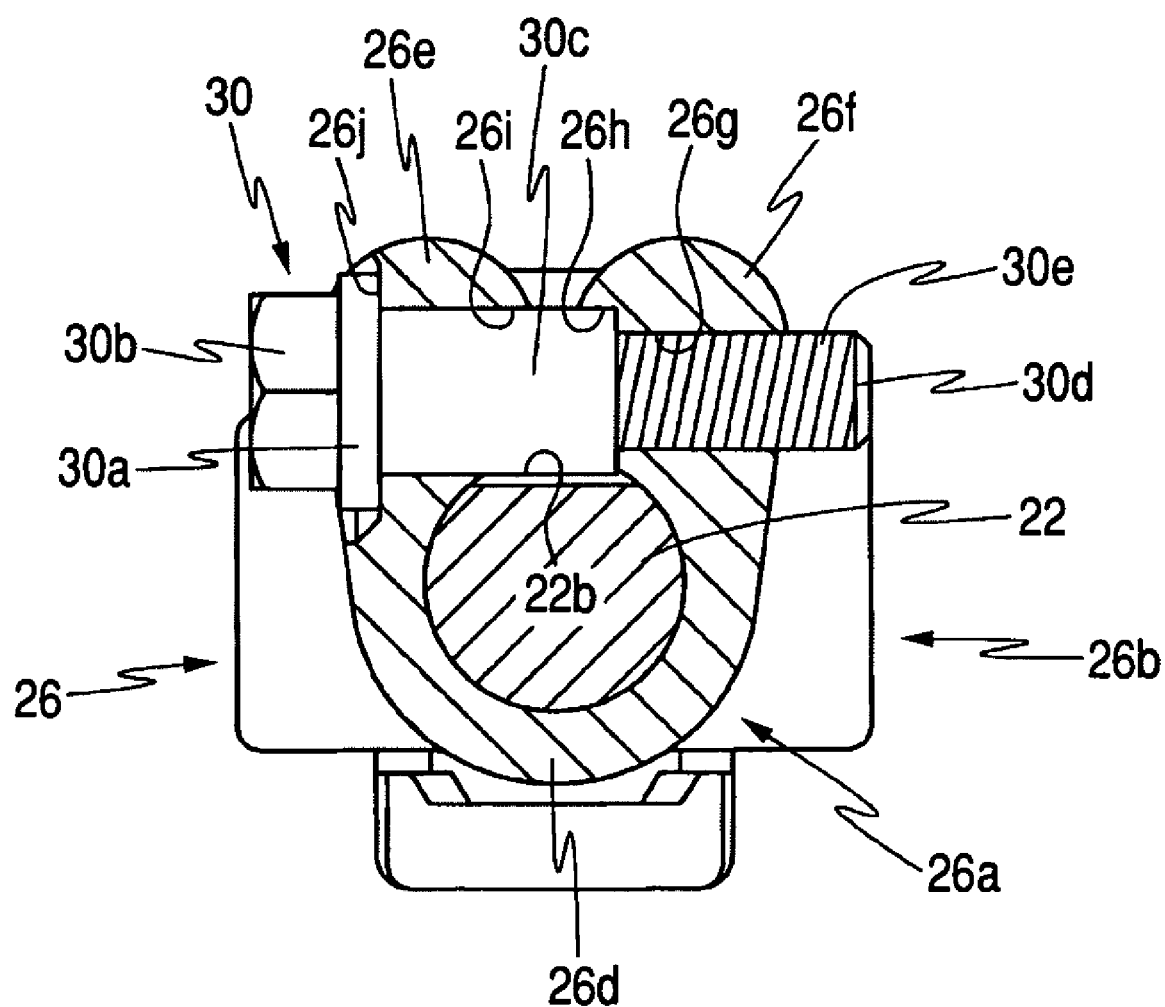
FIG. 3 A sectional view taken along the line III-III in FIG. 2.
Figure 4:
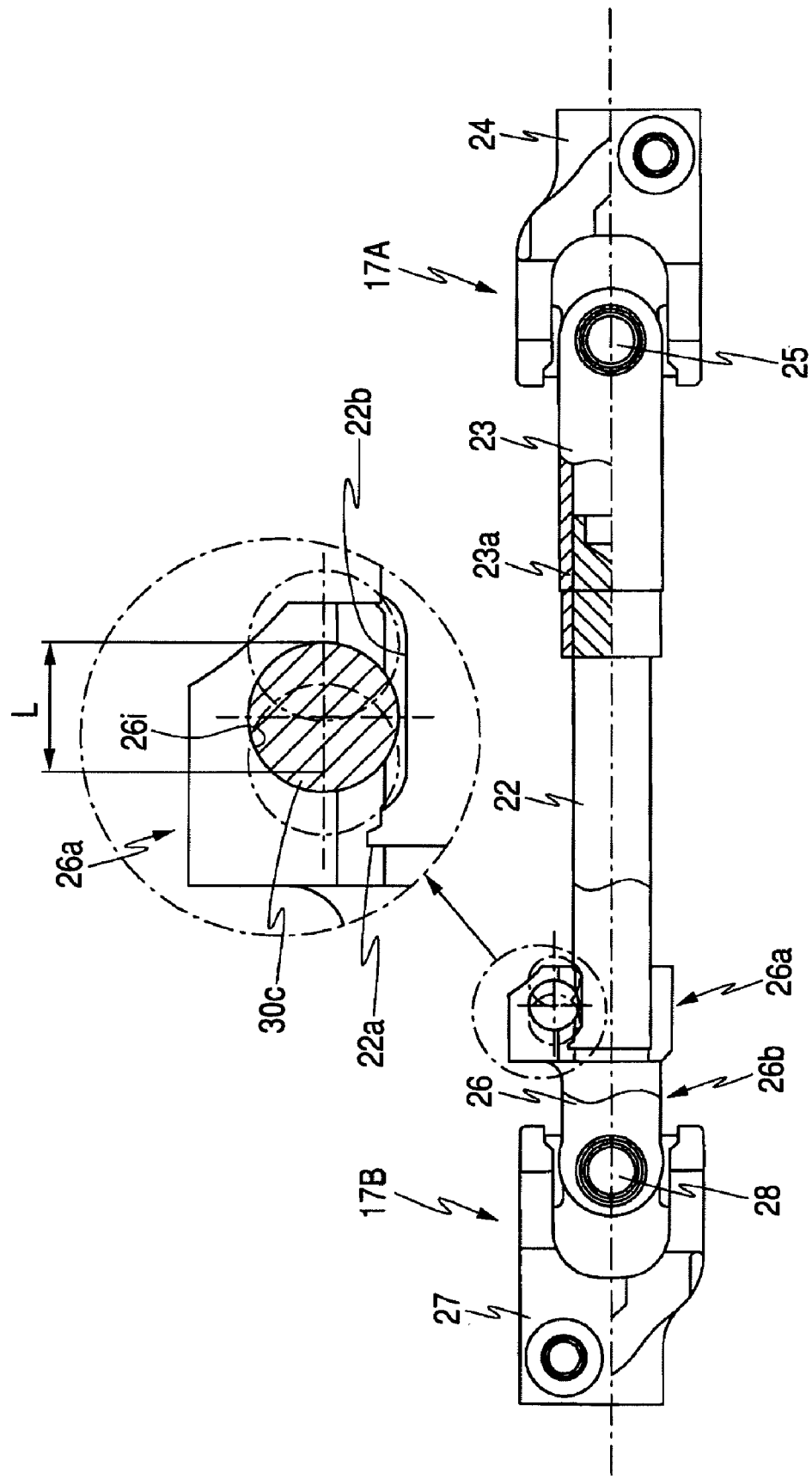
FIG. 4 A side view of the intermediate shaft with a main part thereof shown in section in an enlarged fashion.
Figure 5:
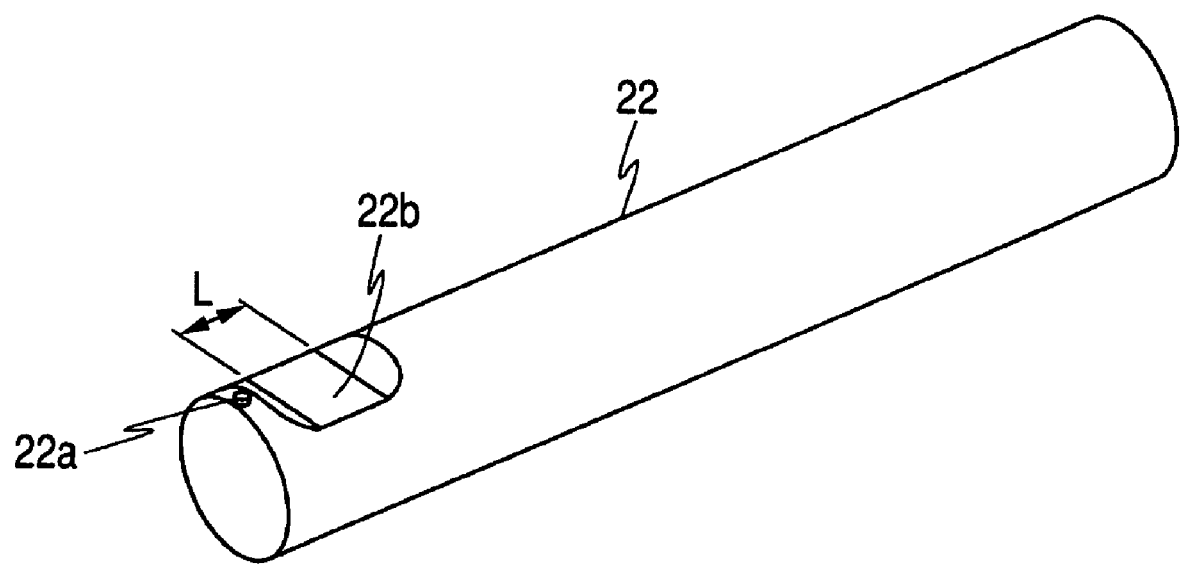
FIG. 5 A perspective view showing the intermediate shaft.
Figure 6:
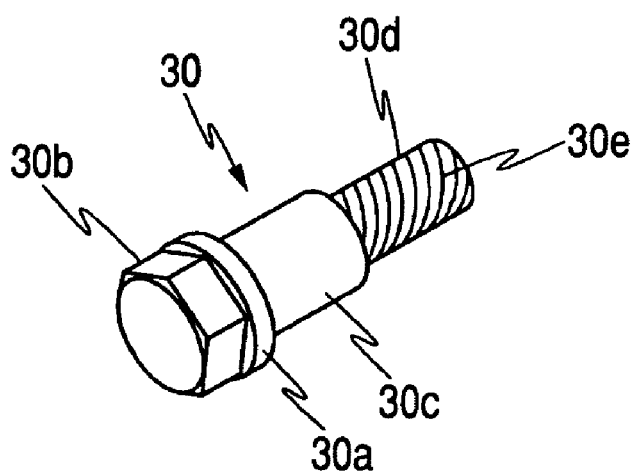
FIG. 6 A perspective view showing a shoulder bolt.
Figure 7:
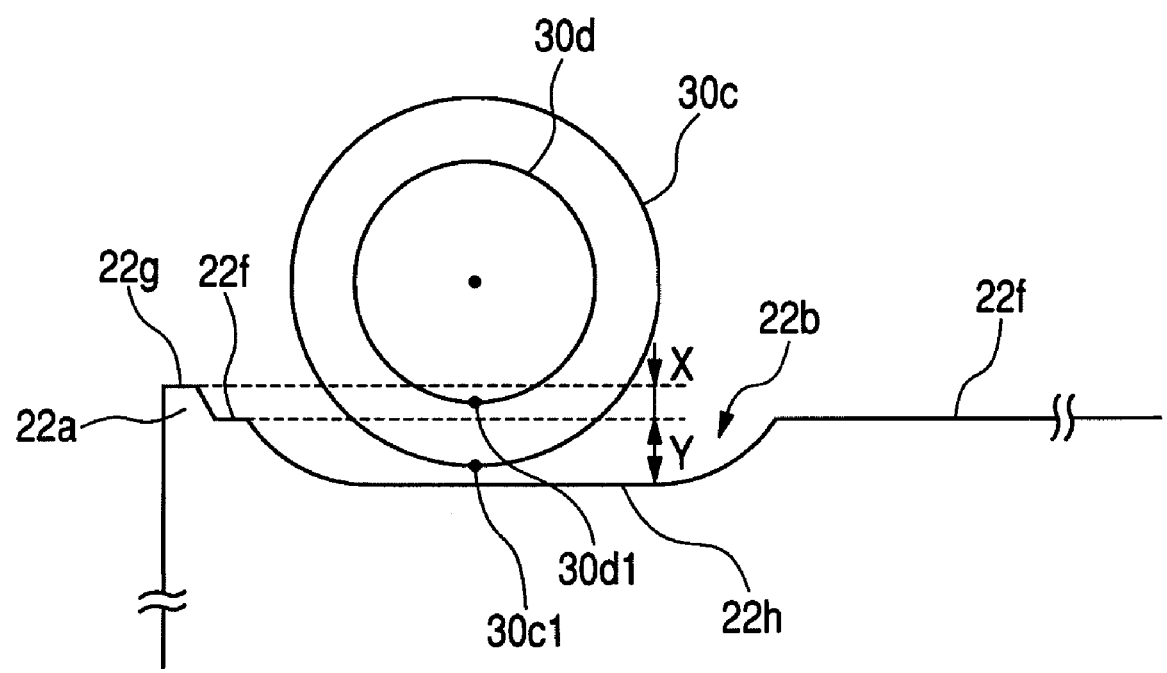
FIG. 7 An enlarged side view showing a positional relationship between the bolt and the intermediate shaft.
Figure 8A:
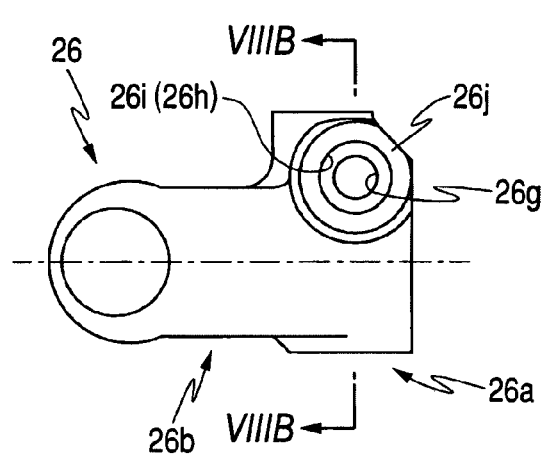
FIG. 8A A side view showing an intermediate shaft side yoke.
Figure 8B:
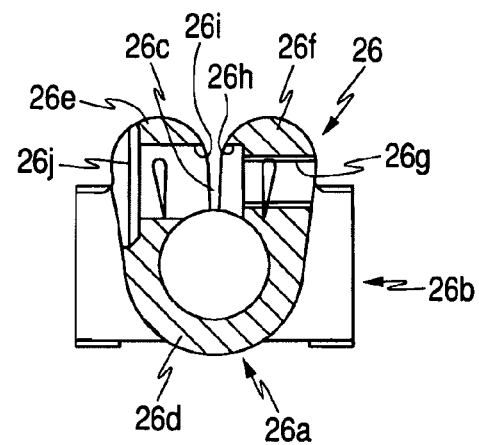
FIG. 8B A sectional view taken along the line VIIIB-VIIIB in FIG. 8A which shows the intermediate shaft side yoke.
Figure 9:
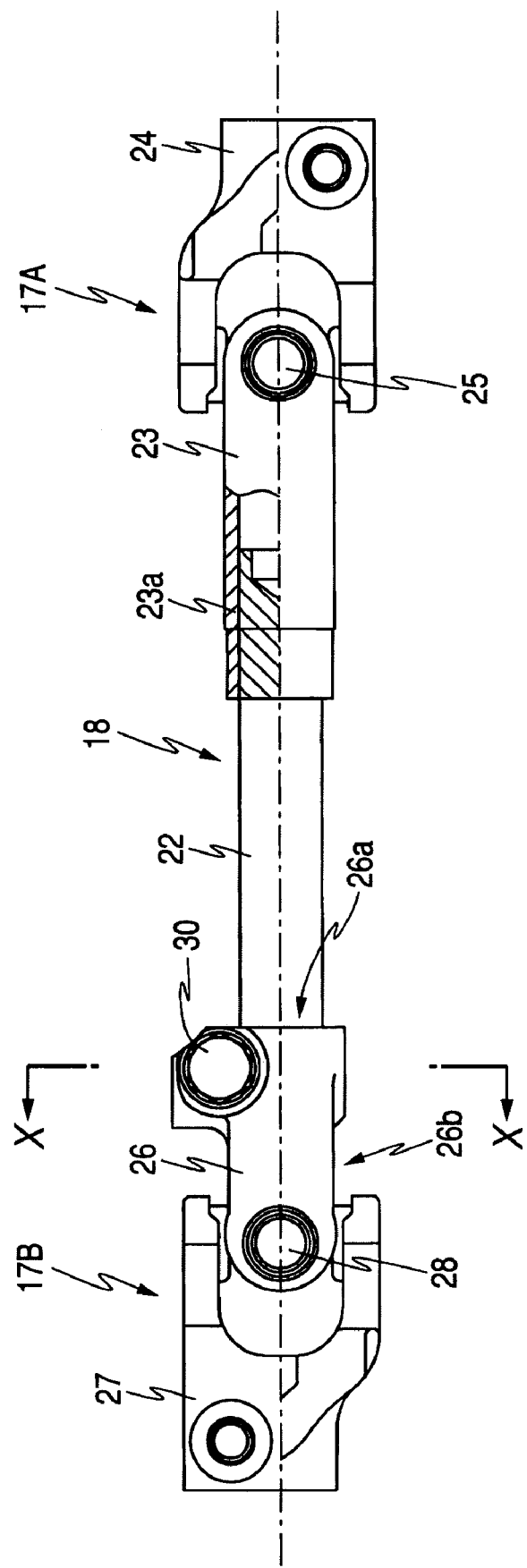
FIG. 9 A partially sectional side view showing the intermediate shaft in a temporarily fastened state.
Figure 10:
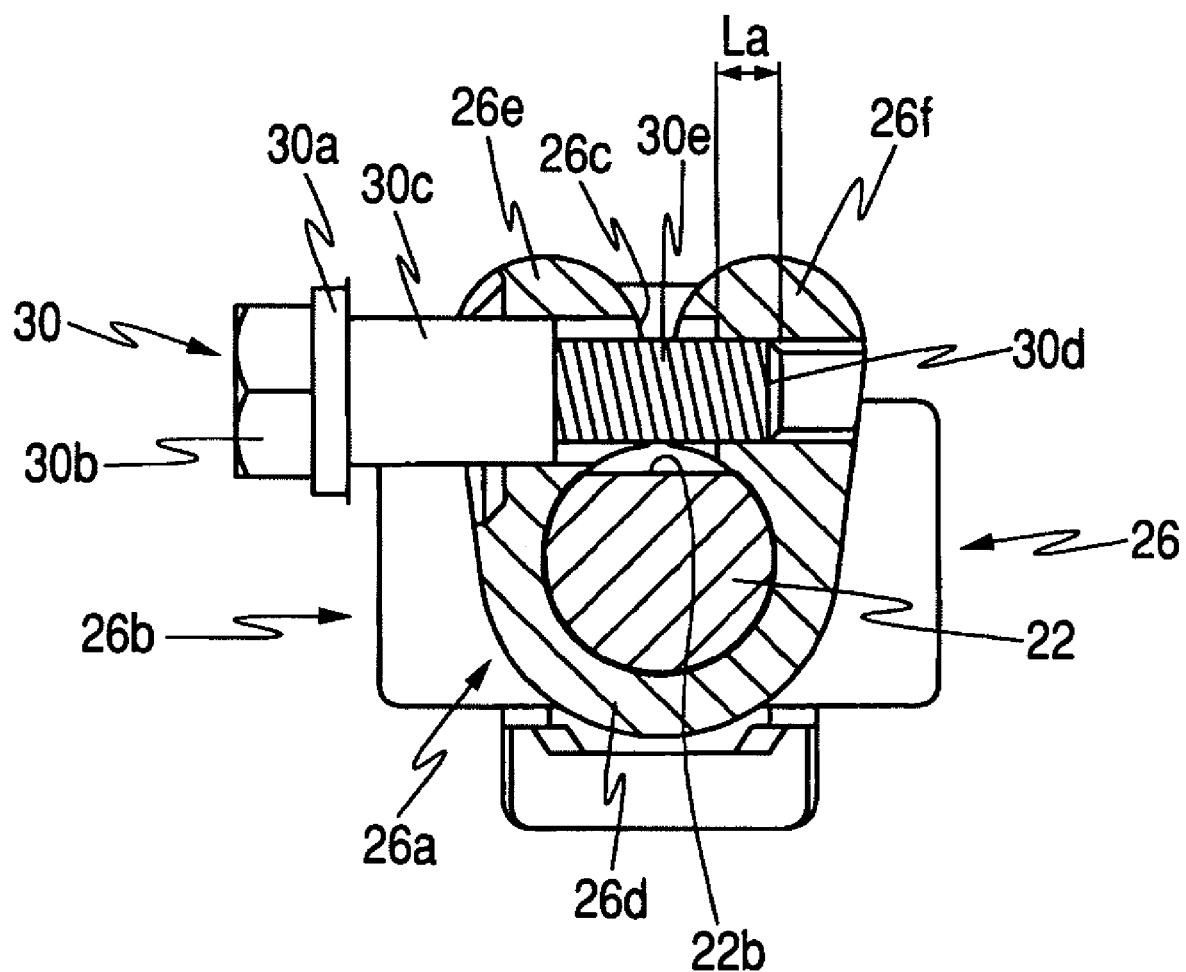
FIG. 10 A sectional view taken along the line X-X in FIG. 9.
Figure 11:
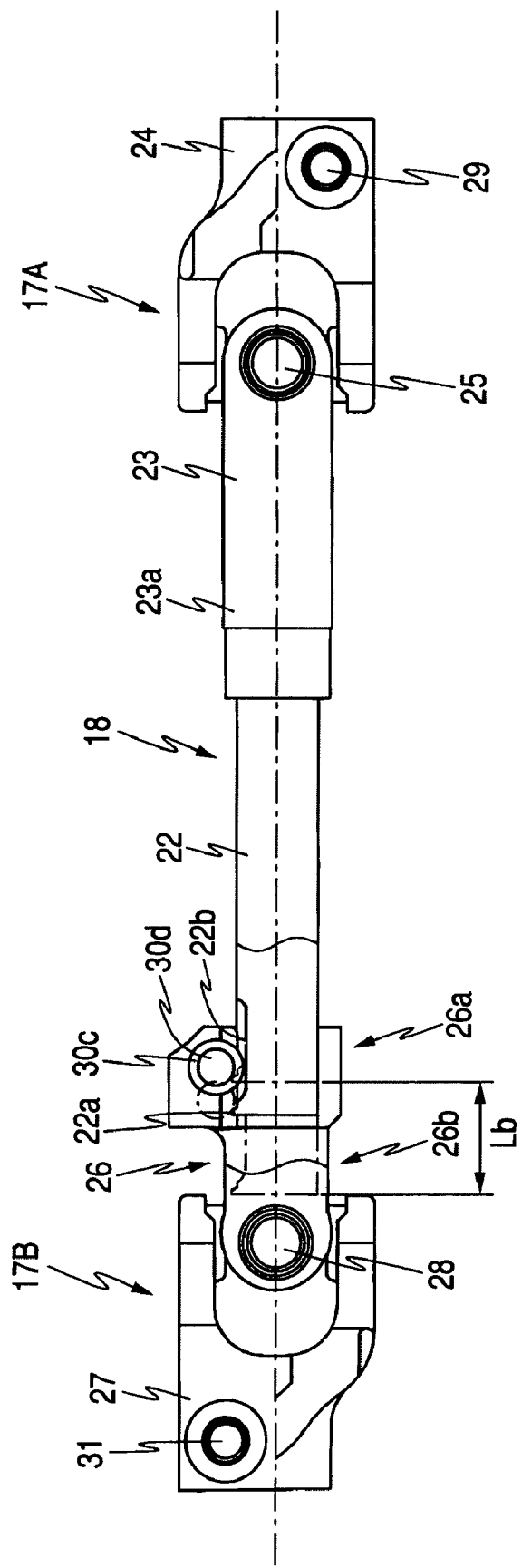
FIG. 11 A side view of the intermediate shaft in the temporarily fastened state with the main part thereof shown in section.

FIG. 1 is an overall block diagram showing an embodiment in which a steering apparatus of the invention is applied to an electric power steering apparatus, FIG. 2 is a side view of an intermediate shaft which in a finally fastened state, FIG. 3 is an enlarged sectional view taken along the line A-A in FIG. 2, FIG. 4 is a side view with a main part in FIG. 2 shown in section, FIG. 5 is a perspective view showing an inner shaft of an intermediate shaft, FIG. 6 is a perspective view of a shoulder bolt, FIG. 7 is an enlarged side view showing a positional relationship between the bolt and the inner shaft, FIG. 8A is a side view showing an intermediate shaft side yoke of the universal joint, FIG. 8B is a sectional view taken along the line VIIIB-VIIIB in FIG. 8A, FIG. 9 is a side view of the intermediate shaft which is in a temporarily fastened state, FIG. 10 is a sectional view taken along the line X-X in FIG. 9, and FIG. 11 is a side view with a main part in FIG. 9 shown in section.

In FIG. 1, reference numeral 2 denotes a steering shaft which has a steering wheel 1 attached to a vehicle rear end (a right end in FIG. 1) side thereof. This steering shaft 2 is held rotatably in a steering column 3. A steering assist mechanism 4 which is made up of a worm reduction gear 11 for imparting a steering assist torque to the steering shaft 2 and an electric motor 12 for generating the steering assist torque in the worm reduction gear 11 is connected to a vehicle front end (a left end in FIG. 1) side of the steering shaft 2.

An intermediate shaft 18 is connected to an output shaft 14 of the worm reduction gear 11 via a universal joint 17A. This intermediate shaft 18 is connected to a pinion shaft 19 of a rack-and-pinion type steering gear mechanism 6 via a universal joint 17B.

A rack shaft (not shown) of the steering gear mechanism 6 is connected to steered road wheels, which are not shown, via tie rods 5.

Here, the steering shaft 2 has an outer shaft 7 and an inner shaft 8, and a front end portion of the outer shaft 7 is spline connected to a rear end portion of the inner shaft 8. Further, the outer shaft 7 and the inner shaft 8 are connected to each other via a synthetic resin 8a. Consequently, the outer shaft 7 and the inner shaft 8 can shorten the overall length by the synthetic resin 8a being broken at the time of collision.

In addition, the cylindrical steering column 3 through which the steering shaft 2 is passed is made up of a telescopic combination of an outer column 9 and an inner column 10, whereby the steering column 3 is made to have a so-called collapsible construction in which when an axial impact is applied to the steering column 3, the overall length thereof is contracted while absorbing energy produced by the impact.

In addition, a front end portion of the inner column 10 is fixed to a rear end face of a housing 11a of the worm reduction gear 11. The inner shaft 8 is inserted into an inside of the housing 11a of the worm reduction gear 11, and a front end portion of the inner shaft 8 is connected to the output shaft 14 which projects from a front end face of the housing 11a of the worm reduction gear 11.

Additionally, the outer column 9 of the steering column 3 is supported on a vehicle body side member 16 by an upper bracket 15U in such a manner as to enable tilt and telescopic position adjustments. Further, the housing 11a of the worm reduction gear 11 of the steering assist mechanism 4 is supported in such a manner as to swing vertically about a pivot pin 15p which is supported rotatably to a lower bracket 15L attached to the vehicle body side member 16.

As is shown in FIG. 2, the intermediate shaft 18 is made up of a cylindrical male shaft 22 to ends of which the universal joints 17A and 17B are attached. As is shown in FIGS. 4 and 5, a dislocation preventive projecting portion 22a is formed at a universal joint 17B side end face portion of the male shaft 22 in such a manner as to project outwards from an outer circumferential surface of a reference outside diameter. Further, a bolt engagement recess portion 22b is formed consecutively to a universal joint 17A side of the dislocation preventive projecting portion 22a in such a manner as to extend in a direction perpendicular to the axis which intersects the axial direction. Here, the bolt engagement recess portion 22b is made up of a milled groove which is formed by cutting a relevant portion of the male shaft 22 by a predetermined length L in the axial direction by a milling cutter of a milling machine which has an outside diameter substantially equal to a large diameter portion of a shoulder bolt, which will be described later.

In addition, a universal joint 17A side end portion of the male shaft 22 is press fitted in an intermediate shaft side yoke 23 of the universal joint 17A. This press fitting between the male shaft 22 and the intermediate shaft side yoke 23 restricts a relative movement between the male shaft 22 and the intermediate shaft side yoke 23 at the time of normal steering. When an impact load directed to the front of the vehicle along the axial direction is inputted into the steering wheel 1 and the impact load reaches or exceeds a collapsing load, the relative movement between the male shaft 22 and the intermediate shaft side yoke 23 is set to be permitted, so as to ensure a predetermined collapsing stroke.

As is shown in FIG. 2, the universal joint 17A is made up of the U-shaped intermediate shaft side yoke 23 which fits on the male shaft 22 of the intermediate shaft 18, a U-shaped column side yoke 24 which is connected to the output shaft 14 of the worm reduction gear 11 and a cross joint 25 which connects these yokes 23, 24 together. Here, a cylindrical tube-shaped portion 23a which press fits the male shaft 22 of the intermediate shaft 18 therein is formed in the intermediate shaft side yoke 23.

On the other hand, the universal joint 17B has a similar configuration to that of the universal joint 17A and includes a U-shaped intermediate shaft side yoke 26 which is connected to the male shaft 22 of the intermediate shaft 18, a U-shaped rack side yoke 27 which is connected to the pinion shaft 19 of the steering gear mechanism 6, and a cross joint 28 which connects these yokes 26, 27 together.

Here, as is shown in FIGS. 2 and 3, the intermediate shaft side yoke 26 is made up of a connecting portion 26a which fittingly holds the male shaft 22 which makes up the intermediate shaft 18 by a shoulder bolt 30 and a U-shaped portion 26b which projects into a U shape from this connecting portion 26a.

As is shown in FIG. 6, the shoulder bolt 30 is made up of a head portion 30b having a collar portion 30a, a large diameter portion 30c which projects to extend from the head portion 30b, and a small diameter portion 30d which projects from an end portion of the large diameter portion 30c.

A relationship between the shoulder bolt 30 and the male shaft 22 is, as is shown in FIG. 7, such that a small diameter portion lower end 30d1 of the shoulder bolt 30 is positioned within a range X which is defined between a reference outside diameter 22f of the male shaft 22 and a dislocation preventive portion upper surface 22a1 of the dislocation preventive portion 22a. In addition, a large diameter portion lower end 30c1 of the shoulder bolt 30 is positioned within a range Y which is defined between the reference outside diameter 22f of the male shaft 22 and a bolt engagement recess portion bottom surface 22b1.

In addition, as is particularly clear in FIGS. 8A and 8B, the connecting portion 26a is made up of an open annular shaft holding portion 26d which has an axial slit 26c in an upper end portion thereof, and flange portions 26e and 26f which extend upwards integrally from left and right end portions of the shaft holding portion 26d which hold the slit 26c therebetween. Additionally, a female thread 26g into which the male thread 30e of the shoulder bolt 30 is screwed is formed in the one flange portion 26f in a direction perpendicular to the axis in such a manner as to penetrate through the one flange portion 26f. A bolt insertion hole 26h into which the large diameter portion 30c of the shoulder bolt 30 is inserted is formed inwards of the female thread 26g concentrically with the female thread 26g, and a bolt insertion hole 26i into which the large diameter portion 30c of the shoulder bolt 30 is inserted is formed in the other flange portion 26e in the direction perpendicular to the axis in such a manner as to penetrate through the other flange portion 26e. Further, a large diameter portion 26j with which the collar portion 30a of the shoulder bolt 30 is brought into engagement is formed outwards of the bolt insertion hole 26i.

In addition, the phase in a rotational direction of the male shaft 22 in the connecting portion 26a of the intermediate shaft side yoke 26 is such that the dislocation preventive projecting portion 22a and the bolt engagement recess portion 22b thereof are positioned on a side which faces the slit 26c. Additionally, as is shown in an enlarged fashion in FIG. 4, the male shaft 22 is inserted into the shaft holding portion 26d in such a manner that the dislocation preventive projecting portion 22a passes through the inside of the slit 26c and is then positioned closer to the U-shaped portion 26b side than the bolt insertion hole 26h. In this state, the shoulder bolt 30 is inserted from the flange portion 26e side and is screwed into the female thread 26g formed in the flange portion 26f.

As this occurs, in a state in which the screw engagement between the male thread 30e of the shoulder bolt 30 and the female thread 26g formed in the flange portion 26f of the intermediate shaft side yoke 26 is shallow, as is shown in FIGS. 9 to 11, a temporarily fastened state is provided in which when the male shaft 22 is attempted to be pulled out of the shaft holding portion 26d, the male thread 30 is brought into engagement with the dislocation preventive projecting portion 22a so as to prevent the dislocation of the male shaft 22.

Then, the male thread 30e of the shoulder bolt 30 is screwed further into the female thread 26g formed in the flange portion 26f of the intermediate shaft side yoke 26. By this action, in such a state that the large diameter portion 30c of the shoulder bolt 30 is in engagement with the bolt engagement recess portion 22b which is formed on the male shaft 22, the flange portion 26e is fastened to the flange portion 26f side so that the male shaft 22 is embraced by the shaft holding portion 26d, whereby a finally fastened state is provided.

Next, the operation of the first embodiment described above will be described.

Firstly, to assemble the electric power steering apparatus having the configuration described above to the vehicle body, by the upper bracket 15U and the lower bracket 15L being attached to the vehicle body side member 16, the steering shaft 2, the steering column 3 and the steering assist mechanism 4 are assembled on to the vehicle body. Further, the steering gear mechanism 6 is attached to a vehicle body side member, not shown, and the tie rods 5 are connected to the steered road wheels, not shown.

In this state, the intermediate shaft 18 to the ends of which the universal joints 17A and 17B are attached is mounted between the output shaft 14 of the worm reduction gear 11 and the pinion shaft 19 of the steering gear mechanism 6.

As this occurs, the male shaft 22 of the intermediate shaft 18 and the cylindrical tube-shaped portion 23a of the intermediate shaft side yoke 23 of the universal joint 17A are fitted in and on in the predetermined position in such a manner that the relative movement therebetween is restricted in the normal state. On the other hand, with respect to the connection of the male shaft 22 of the intermediate shaft 18 with the intermediate shaft side yoke 26 of the universal joint 17B, the male shaft 22 is inserted into the shaft holding portion 26d of the connecting portion 26a of the intermediate shaft side yoke 26. As this occurs, the male shaft 22 is inserted into the shaft holding portion 26d in such a manner that the dislocation preventive projecting portion 22a comes to be positioned closer to the U-shaped portion 26b side than the female thread 26g which is formed in the flange portion 26f as is shown in FIG. 11, while the dislocation preventive projecting portion 22a on the male shaft 22 is being caused to pass through the inside of the slit 26c. In this state, the male thread 30e of the shoulder bolt 30 is screwed from the flange portion 26e side of the connecting portion 26a of the intermediate shaft side yoke 26 into the female thread 26g which is formed in the flange portion 26f through the bolt insertion holes 26i and 26h.

As this occurs, by making a screwed length La over which the male thread 30e of the shoulder bolt 30 is screwed into the female thread 26g be such a length that the large diameter portion 30c does not reach an inner circumferential surface of the shaft holding portion 26d as is shown in FIG. 10, the intermediate shaft side yoke 26 is temporarily fastened on to the male shaft 22. In this case, since the dislocation preventive projecting portion 22a of the male shaft 22 is in engagement with the inside of the slit 26c, a relative circumferential rotation between the male shaft 22 and the intermediate shaft side yoke 26 is restricted. Further, since the dislocation preventive projecting portion 22a is positioned, as is shown in FIG. 11, closer to the U-shaped portion 26b side than the male thread 30e which configures the small diameter portion 30d of the shoulder bolt 30, when the male shaft 22 is pulled out of the intermediate shaft side yoke 26, the dislocation preventive projecting portion 22a is brought into engagement with an outer circumferential surface of the male thread 30e of the shoulder bolt 30 to thereby prevent the dislocation of the male shaft 22, whereby the male shaft 22 is kept in a temporarily fastened state.

In this temporarily fastened state, a relative moving distance between the male shaft 22 and the intermediate shaft side yoke 26 is referred to as a relatively long distance Lb which expands from a position indicated by solid lines in FIG. 11 in which the dislocation preventive projecting portion 22a of the male shaft 22 is in abutment with the male thread 30e of the shoulder bolt 30 to a position in which the male shaft 22 is pushed to the U-shaped portion 26b side and an end face of the male shaft 22 which is indicated by chain lines is brought into abutment with the cruciform shaft 28.

Because of this, for example, the column side yoke 24 of the universal joint 17A is passed on the output shaft 14 of the worm reduction gear 11 and is then tightly fixed thereto by a fastening bolt 29. Thereafter, the male shaft 22 of the intermediate shaft 18 is inserted in such a manner as to be brought into abutment with the cruciform shaft 28 of the intermediate shaft side yoke 26 of the universal joint 17B. Then, in such a state that the distance between the universal joints 17A and 17B is made shortest, the rack side yoke 27 is moved to an upper portion of the pinion shaft 19 of the steering gear mechanism 6, and in this state, the universal joint 17B is lowered so that the pinion shaft 19 is inserted into the rack side yoke 27. As this occurs, as has been described above, in such a state that the male shaft 22 and the intermediate shaft side yoke 26 are temporarily fastened to each other, the relatively long relative moving distance Lb is set, and therefore, the pinion shaft 19 can easily be inserted into the inside of the rack side yoke 27. As this occurs, even in the event that there occur errors during the assemblage of the steering apparatus with respect to the attaching position of the output shaft 14 of the worm reduction gear 11 and the attaching position of the pinion shaft 19 of the steering gear mechanism 6, a large relative moving stroke can be ensured in the temporarily fastened state. Consequently, by absorbing such errors, the universal joint 17B can easily be attached to the pinion shaft 19 of the steering gear mechanism 6.

Then, in such a state that the pinion shaft 19 is inserted to a predetermined position inside the rack side yoke 27, the rack side yoke 27 is fastened by a fastening bolt 31. Consequently, the pinion shaft 19 and the rack side yoke 27 can be connected together strongly and rigidly.

When the connection of the pinion shaft 19 and the rack side yoke 27 is completed, in this state, as is shown in FIGS. 10 and 11, the bolt engagement recess portion 22b of the male shaft 22 confronts the male thread 30e of the shoulder bolt 30. Namely, since the bolt engagement recess portion 22b is formed as a long milled groove in the axial direction, even in the event that there occur positioning errors of the output shaft 14 of the worm reduction gear 11 and the pinion shaft 19 of the steering gear mechanism 6, the errors can be absorbed by the bolt engagement recess portion 22b, thereby making it possible to ensure the engagement of the bolt engagement recess portion 22b with the large diameter portion 30c of the shoulder bolt 30.

In this state, by the male thread 30e of the shoulder bolt 30 being screwed further into the male thread 26g formed in the flange portion 26f of the intermediate shaft side yoke 26, as is shown in FIGS. 3 and 4, the large diameter portion 30c of the shoulder bolt 30 is brought into engagement with the bolt engagement recess portion 22b and the flange portion 26e is pressed towards the flange portion 26f side, so that a final fastening is implemented in which the male shaft 22 is embraced and fixed in place by the shaft holding portion 26d, whereby the connection of the intermediate shaft 18 to the portion defined between the output shaft 14 of the worm reduction gear 11 and the pinion shaft 19 of the steering ring gear mechanism 6 is completed.

In this way, according to the first embodiment, the dislocation preventive projecting portion 22a which projects from the reference outside diameter and the bolt engagement recess portion 22b are formed on the male shaft 22 of the intermediate shaft 18. Further, the fastening bolt of the intermediate shaft side yoke 26 of the universal joint 17B which is connected to the steering gear mechanism 6 is made into the shoulder bolt 30 having the large diameter portion 30c which is brought into engagement with the bolt engagement recess portion 22b and the small diameter portion 30d which is brought into contact with a circumferential portion of the reference outside diameter of the male shaft 22. Because of this, when connecting the male shaft 22 with the intermediate shaft side yoke 26, by the male thread 30e formed on the small diameter portion 30d of the shoulder bolt 30 being screwed shallowly into the female thread 26f formed in the flange portion 26f of the intermediate shaft side yoke 26, the temporarily fastened state can be provided in which when the male shaft 22 is pulled out of the intermediate shaft side yoke 26, the dislocation preventive projecting portion 22a is brought into abutment with the small diameter portion 30d so as to prevent the dislocation of the male shaft 22. In this temporarily fastened state, a large relative stroke between the male shaft 22 and the intermediate shaft side yoke 26 can be obtained, the assembling work which results when mounting the intermediate shaft 18 between the worm gear mechanism 11 and the steering gear mechanism 6 can be facilitated. Thereafter, the male thread 30e of the shoulder bolt 30 is screwed deep into the female thread 26g which is formed in the flange portion 26f of the intermediate shaft side yoke 26, so that the large diameter portion 30c of the shoulder bolt 30 is brought into engagement with the bolt engagement recess portion 22b on the male shaft 22. As this occurs, by the bolt engagement recess portion 22b being made into the milled groove, the axial length is made longer, whereby even in the event that there occur positioning errors of the output shaft 14 of the worm reduction gear 11 and the pinion shaft 19 of the steering gear mechanism 6, the engagement of the bolt engagement recess portion 22b with the large diameter portion 30c of the shoulder bolt 30 can be ensured.

Moreover, since the dislocation preventive projecting portion 22a and the bolt engagement recess portion 22b only have to be provided on the male shaft 22, so as to make the construction simple and no additional temporary fastening recess portion has to be formed, the assemblage of the intermediate shaft 18 can be facilitated without reducing the rigidity of the male shaft 22, that is, the intermediate shaft 18.

In addition, as in the case of the first embodiment, by the male shaft 22 of the intermediate shaft 18 and the intermediate shaft side yoke 23 of the universal joint 17A being press fitted in and on, the collapsing stroke is ensured which is available when the impact load is inputted. Consequently, a fitting portion to ensure the collapsing stroke of the intermediate shaft 18 does not have to be formed, thereby making it possible to reduce the number of components.

In addition, when the driver turns the steering wheel 1 in such a state that the assemblage of the steering apparatus is completed, a steering torque transmitted to the steering wheel 1 is detected by a steering torque sensor, not shown. Further, a vehicle speed is detected by a vehicle speed sensor, not shown, and the electric motor 12 is controlled to be driven so as to generate an optimum steering assist force in a steered state based on the steering torque and the vehicle speed by a steering assist control unit, not shown.

Because of this, a steering assist force generated by the electric motor 12 is transmitted to the steering shaft 2 via the worm reduction gear 11. By the steering assist force being transmitted to the steering shaft 2 in the way described above, a large steering torque is outputted from the output shaft 14 of the worm reduction gear 11, and the large steering torque so outputted is then transmitted to the pinion shaft 19 of the steering gear mechanism 6 via the universal joint 17A, the intermediate shaft 18, and the universal joint 17b. In the steering gear mechanism 6, the rotational motion transmitted to the pinion shaft 19 is transformed into a linear motion in a vehicle's width direction by a pinion and a rack which meshes with the pinion which make up a steering gear, and the linear motion so transformed is then transmitted to the steered road wheels via the tie rods 5 so as to turn the steered road wheels.

In this case, since the optimum steering assist force which matches the steering torque transmitted to the steering wheel 1 is made to be generated by the electric motor 12 of the steering assist mechanism 4, the steering wheel 1 can be turned lightly.

Second Embodiment

Next, a second embodiment of the invention will be described by reference to FIGS. 12 and 13.

In this second embodiment, an impact load is made to be surely absorbed when the impact load is transmitted to a steering wheel 1 and is then transmitted to an intermediate shaft 18 via a steering shaft 2.

Namely, in the second embodiment, a small diameter portion 22d is formed at an intermediate portion of a male shaft 22 which makes up an intermediate shaft 18 in such a manner as to be bent when an impact load is transmitted to the intermediate shaft 18. Further, a connecting tube-shaped element 22e is provided which is press fitted on both end portions which hold therebetween the small diameter portion 22d while covering the small diameter portion 22d. The second embodiment has a similar configuration to that of the first embodiment except for the aforesaid two features, and like reference numerals will be given to like portions to those shown in FIGS. 2 and 4, a detailed description thereof being thereby omitted.

Figure 12:
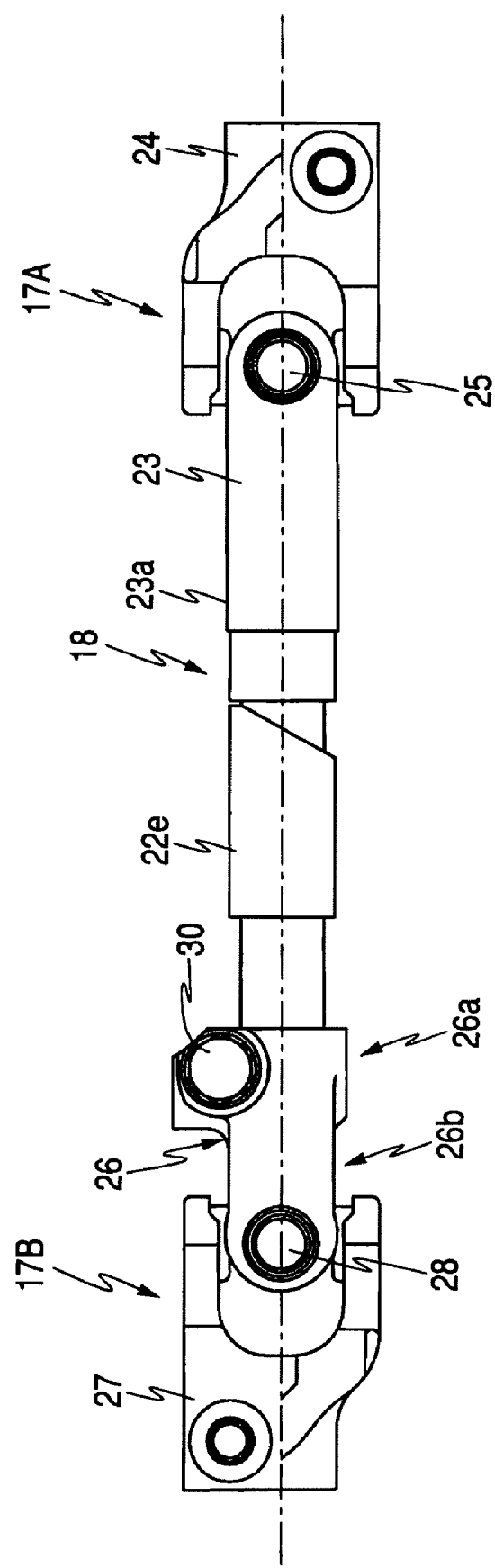
FIG. 12 A side view of an intermediate shaft which shows a second embodiment of the invention.
Figure 13:
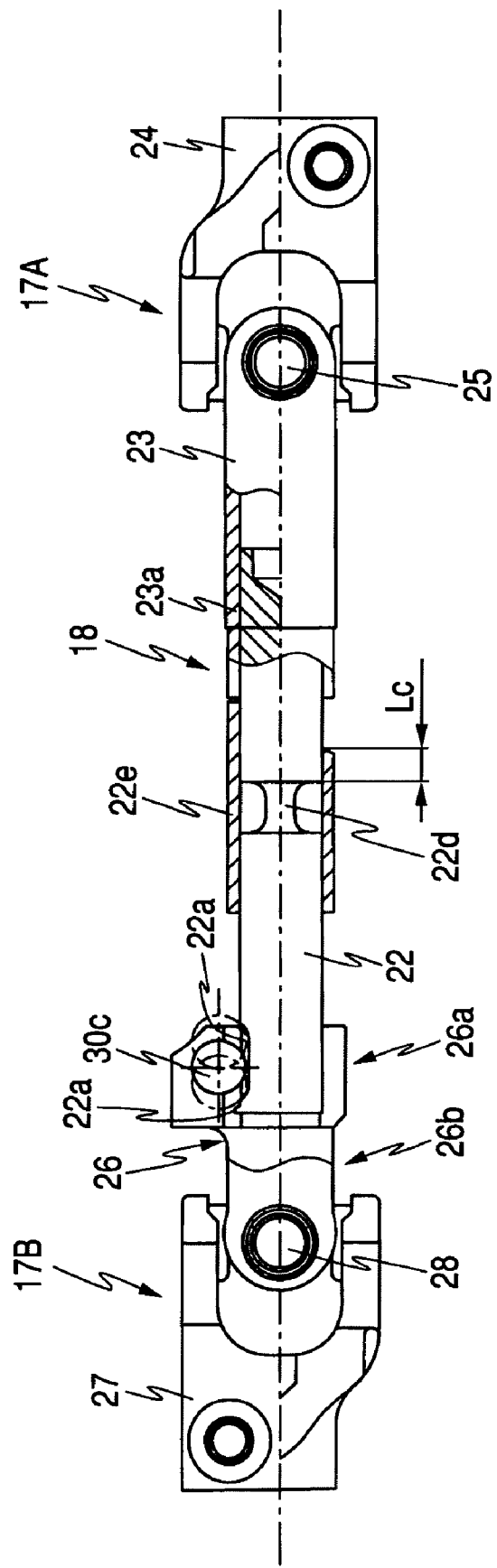
FIG. 13 A side view of the intermediate shaft of the second embodiment with a main part thereof shown in section.

Here, as is shown in FIGS. 12 and 13, the connecting tube-shaped element 22e has a shape in which a universal joint 17A side end face is cut off obliquely with an upper end portion left uncut, and in such a state that the upper end portion is in abutment with a cylindrical tube-shaped portion 23a of an intermediate shaft side yoke 23 of a universal joint 17A, a lower end portion is fitted on the male shaft 22 in such a manner as to extend a relatively short distance Lc towards the universal joint 17A side from a universal joint 17A side end portion of the small diameter portion 22d.

According to the second embodiment, the mounting of the intermediate shaft 18 between an output shaft 14 of a worm reduction gear 11 and a pinion shaft 19 of a steering gear mechanism 6 is implemented in a similar manner to that used in the first embodiment in which the male shaft 22 and an intermediate shaft side yoke 26 of a universal joint 17B are temporarily fastened together by a shoulder bolt 30. Then, at a point in time at which the mounting of the intermediate shaft 18 is completed, the shoulder bolt 30 is finally tightened, whereby the male shaft 22 and the intermediate shaft side yoke 26 of the universal joint 17B can be connected together.

In addition, in such a state that a steering apparatus is built up, normally, when a steering effort is transmitted to the steering wheel 1, the steering effort is transmitted to a steering assist mechanism 4 via the steering shaft 2, a steering assist force which matches the steering effort is generated by an electric motor 12 of the steering assist mechanism 4, and the steering assist force is transmitted to the output shaft 14 via the worm reduction gear 11, whereby a large steering force is transmitted to the intermediate shaft 18. In this state, since the small diameter portion 22d of the male shaft 22 is covered by the connecting tube-shaped element 22e which is fitted on the large diameter portions at both the ends of the small diameter portion 22d, the steering force which is transmitted to the universal joint 17A without bending the small diameter portion 22d is transmitted to the universal joint 17B via the male shaft 22 to thereby be transmitted to the steering gear mechanism 6.

However, when an impact load directed to a front side of the vehicle along the axial direction is transmitted to the steering wheel 1 to thereby move the steering shaft 2 and the output shaft 14 towards the front side of the vehicle and this resulting moving amount is then transmitted to the universal joint 17A, the intermediate shaft side yoke 23 of the universal joint 17A is caused to move towards the front side of the vehicle. Because of this, the connecting tube-shaped element 22e is caused to slide towards the front side of the vehicle by the cylindrical tube-shaped portion 23a of the intermediate shaft side yoke 23, whereby a lower end portion of the connecting tube-shaped element 22e of the universal joint 17A side is dislocated from the large diameter portion, and a state results in which the small diameter portion 22d is exposed. In such a state that the small diameter portion 22d is exposed in this way, when the impact load is received by the small diameter portion 22d so exposed, the small diameter portion 22d is bent so as to absorb impact energy, thereby making it possible to prevent the transmission of reaction force of the impact energy to the steering wheel 1 side in an ensured fashion.

Moreover, since the absorption of impact energy is implemented by bending of the small diameter portion 22d, even in the event that a dimension between the universal joints 17A and 17B is short, a long collapsing stroke can be obtained.

Third Embodiment

Next, a third embodiment of the invention will be described by reference to FIGS. 14 and 15.

The third embodiment is such that a circumferential phase of a male shaft 22 of an intermediate shaft 18 which is fitted in a shaft holding portion 26d of an intermediate shaft side yoke 26 is made to coincide with a normal position.

Figure 14:
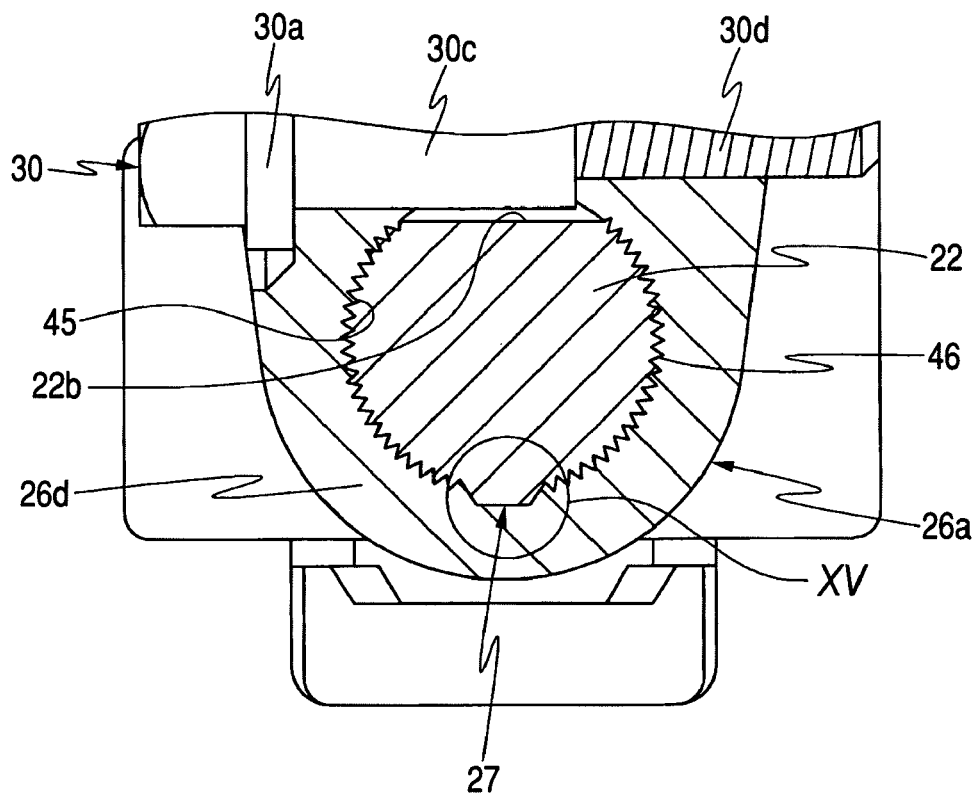
FIG. 14 A sectional view of a connecting portion between a universal joint and an intermediate shaft which shows a third embodiment of the invention.

As is shown in FIG. 14, a serration portion 45 is formed on an inner circumferential surface of the shaft holding portion 26d, and a serration portion 46 which is to fit in the serration portion 45 on the shaft holding portion 26d is formed on an outer circumferential surface of the male shaft 22.

Here, a phase matching portion 47 is formed at parts of the serration portion 45 on the shaft holding portion 26d and the serration portion 46 on the male shaft 22 for matching a circumferential phase of the male shaft 22 so that a bolt engagement recess portion 22b of the male shaft 22 is positioned in a normal position (a position lying between a pair of flange portions 26e, 26f which extend from both left and right end portions of the shaft holding portion 26d).

Figure 15:
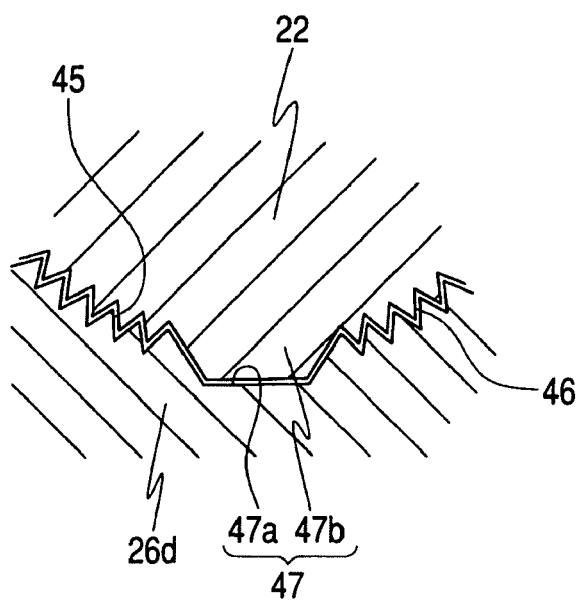
FIG. 15 A diagram showing an area indicated by reference character D in FIG. 14 in an enlarged fashion.

As is shown in FIG. 15, this phase matching portion 47 is made up of a trapezoidal phase matching recess portion 47a which is formed by cutting out part of serrations which make up the serration portion 45 on the shaft holding portion 26d and a trapezoidal phase matching projecting portion 47b which is adapted to fit in the phase matching recess portion 47a when the bolt engagement recess portion 22b of the male shaft 22 comes to be positioned in the normal position.

According to this embodiment, since the bolt engagement recess portion 22b of the male shaft 22 can be disposed in the normal position where a large diameter portion 30c of a shoulder bolt 30 is brought into engagement therewith in an ensured fashion only by matching the phase matching recess portion 47a on the shaft holding portion 26d with the phase matching projecting portion 47b on the male shaft 22 so that the male shaft 22 and the shaft holding portion 26d are brought into serration engagement with each other, the connecting work of an intermediate shaft side yoke 26 and an intermediate shaft 18 can be implemented easily and surely.

In addition, in this embodiment, while in FIG. 14, the phase matching portion 47 is provided at a lower portion of the serration fitting portion between the shaft holding portion 26d and the male shaft 22, the phase matching portion 47 may be provided at other positions.

Additionally, in this embodiment, while the serration portion 45 is formed on the inner circumferential surface of the shaft holding portion 26d and the serration portion 46 is formed on the outer circumferential surface of the male shaft 22, spline portions, which are adapted to be brought into spline engagement with each other, may be formed on the inner circumferential surface of the shaft holding portion 26d and the outer circumferential surface of the male shaft 22.

Fourth Embodiment

Next, a fourth embodiment of the invention will be described by reference to FIGS. 16 to 19.

This fourth embodiment is such that a dead space lying on the periphery of a universal joint 17B is made to be narrowed by reducing the swing circle of the universal joint 17B. The swing circle means a circle which is centered at a shaft center of a male shaft 22 of an intermediate shaft 18 and which has a radius which is referred to as a distance to an outer circumferential position of the universal joint 17B which extends in an orthogonal direction to the shaft center to lie spaced furthest apart the shaft center.

Figure 16:
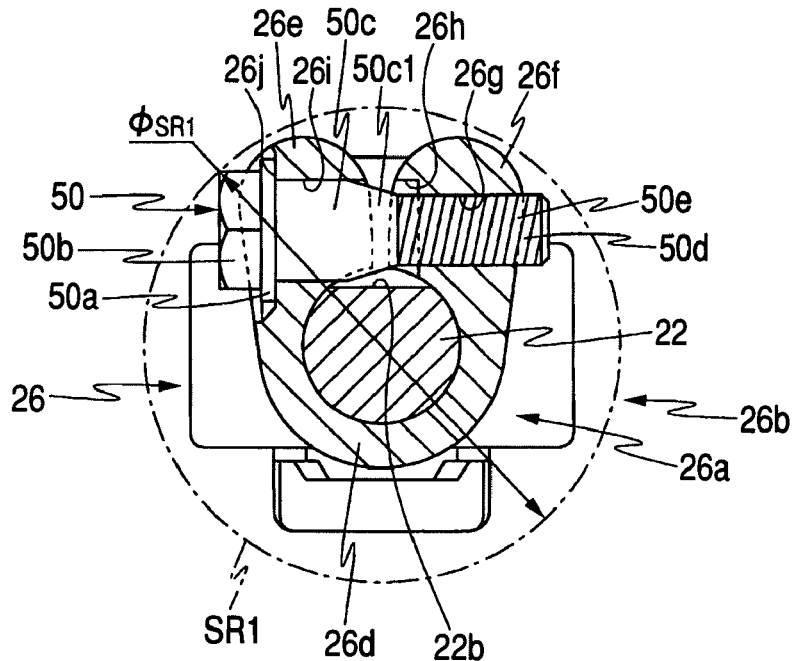
FIG. 16 A sectional view of a connecting portion between a universal joint and an intermediate shaft which shows a fourth embodiment of the invention.

A shoulder bolt 50 of this embodiment has, as is shown in FIG. 16, a tapered outer circumferential surface 50c1 which is formed a side facing a small diameter portion 50d of a large diameter portion 50c which projects to extend from a head portion 50b having a collar portion 50a in such a manner as to gradually decrease in diameter as it extends towards the small diameter portion 50d.

This embodiment is also configured in such a manner that a male thread 50e of the small diameter portion 50d of the shoulder bolt 50 is screwed into a female thread 26g which is formed in one flange portion 26f of an intermediate shaft side yoke 16, and the other flange portion 26e is tightened towards the one flange portion 26f, whereby the male shaft 22 is made to be embraced by a shaft holding portion 26d for final fastening.

Figure 17:
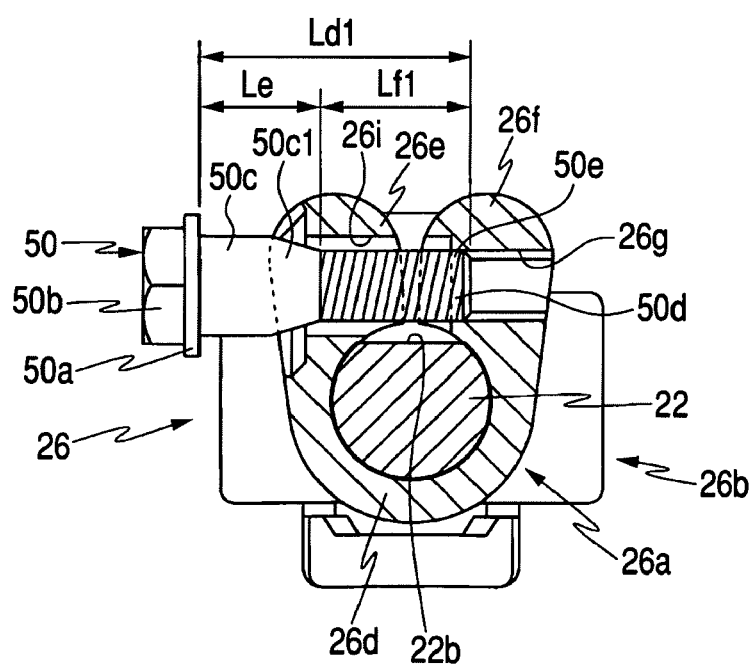
FIG. 17 A diagram showing a state in which a shoulder bolt of the fourth embodiment is temporarily fastened.

In the shoulder bolt 50, in a temporarily fastened state as is shown in FIG. 17, when the distal end of the male thread 50e is screwed into the female thread 26g in the flange portion 26f shallowly, part of the tapered outer circumferential surface 50c1 formed on the small diameter portion 50d side of the large diameter portion 50c is made to be loosely inserted into an inside of a bolt insertion hole 26i which is formed in the other flange portion 26e.

Figure 18:
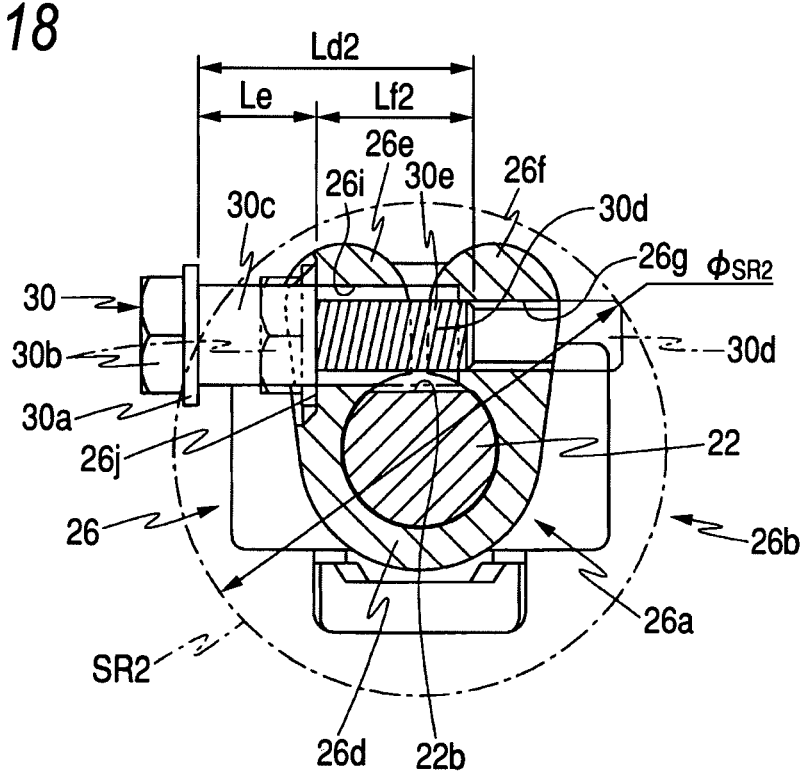
FIG. 18 A diagram showing a state in which the shoulder bolt of the first embodiment is temporarily fastened for comparison with the shoulder bolt of the fourth embodiment.

Here, FIG. 18 shows a case where the shoulder bolt 30 of the first embodiment is used. In the shoulder bolt 30 of the first embodiment, an axial length of the large diameter portion 30c is referred to as Le, and an axial length of the small diameter portion 30d which projects from the end portion of the large diameter portion 30c is referred to as Lf2. The axial length Lf of the small diameter portion 30d is set to such a length that a distal end of the male thread 30e comes to be screwed into the female thread 26g in the one flange portion 26f shallowly before the small diameter portion 30d side end face of the large diameter portion 30c is brought into engagement with the large diameter portion 26j formed in the other flange portion 26e.

In contrast to this, in the shoulder bolt 50 of this embodiment, as is shown in FIG. 17, although an axial length of the large diameter portion 50c on the small diameter portion 50d side of which the tapered outer circumferential surface 50c1 is formed is referred to as Le, since the distal end of the male thread 50e is screwed into the female thread 26g in the one flange portion 26f shallowly with the part of the tapered outer circumferential surface 50c1 made to loosely be inserted into the inside of the bolt insertion hole 26i formed in the other flange portion 26e, an axial length Lf1 of the small diameter portion 50d of the shoulder bolt 50 becomes a shorter dimension than the axial length Lf2 of the small diameter portion 30d of the shoulder bolt 30 of the first embodiment (Lf1<Lf2).

Because of this, a neck length (a length from the collar portion 50a to a distal end of the small diameter portion 50d) Ld1 of the shoulder bolt 50 of this embodiment becomes a smaller dimension than a neck length Ld2 of the shoulder bolt 30 of the first embodiment (Ld1<Ld2).

In addition, as is obvious from FIGS. 16 and 18, a swing circle SR1 of the universal joint 17B of this embodiment which employs the shoulder bolt 50 whose neck length Ld2 is shorter becomes smaller in diameter than a swing circle SR2 of the universal joint 17B which employs the shoulder bolt 30 whose neck length Ld2 is longer ($\Phi_{SR1}<\Phi_{SR2}$).

Consequently, according to this embodiment, by the use of the shoulder bolt 50 in which the tapered outer circumferential surface 50c1 is formed on the small diameter portion 50d side of the large diameter portion 50c in such a manner as to gradually decrease in diameter as it extends towards the small diameter portion 50d, when implementing a temporary fastening, since the part of the tapered outer circumferential surface 50c1 is loosely inserted into the inside of the bolt insertion hole 26i in the other flange portion 26e and the distal end of the male thread 50e is screwed into the female thread 26g in the one flange portion 26f shallowly, the temporary fastening can be surely implemented. In addition, since the neck length Ld1 of the shoulder bolt 50 is made short, the diameter $\Phi_{SR1}$ of the swing circle SR1 of the universal joint 17B becomes small, thereby making it possible to narrow the dead space on the periphery of the universal joint 17B.

In addition, in the shoulder bolt 50 of this embodiment, since the tapered outer circumferential surface 50c1 formed between the large diameter portion 50c and the small diameter portion 50d comes into engagement with an open circumferential edge of the bolt insertion hole 26i before the large diameter portion 50c is inserted into the bolt insertion hole 26i in the other flange portion 26e, the concentration of stress to the open circumferential edge of the bolt insertion hole 26i can be avoided which would otherwise occur as a result of the large diameter portion 50c being brought into abutment therewith.

Figure 19:
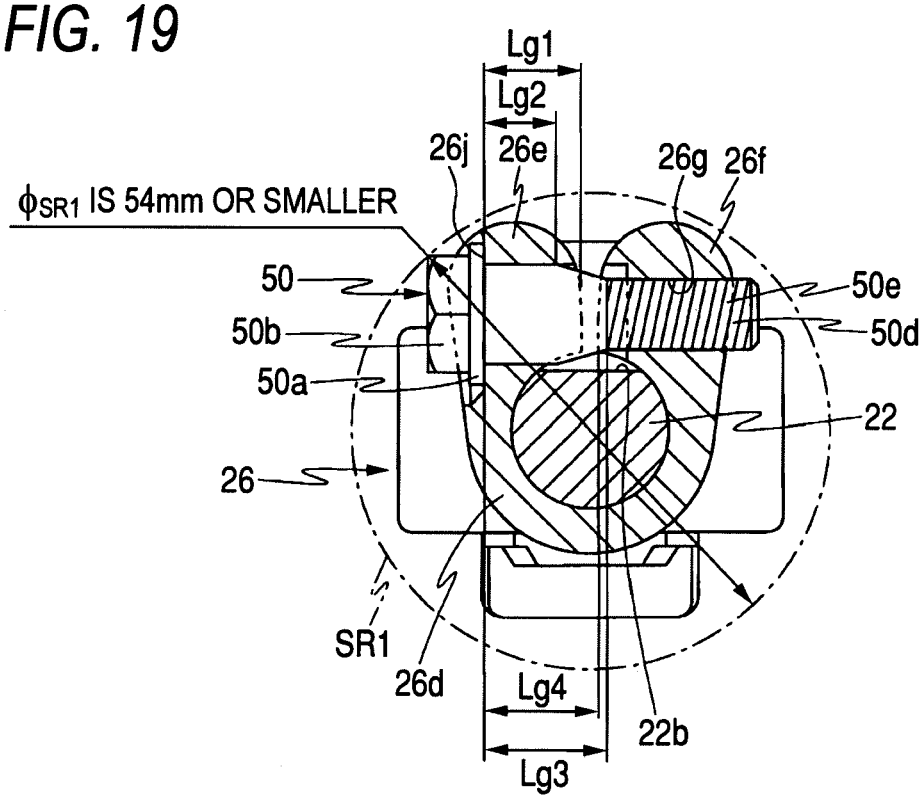
FIG. 19 A diagram showing a swing circle resulting when the shoulder bolt of the fourth embodiment is used.

Here, assuming that an inner circumferential surface of the shaft holding portion 26d and an outer circumferential surface of the male shaft 22 of this embodiment are made to be brought into serration engagement with each other as in the third embodiment, the thread size of the small diameter portion 50d of the shoulder bolt 50 is referred to as 8 M, the axial dimension of the large diameter portion 50c is referred to as 12 mm or smaller, the P.C.D of the serration engagement between the shaft holding portion 26d and the male shaft 22 is referred to as 17 mm or smaller, and a distance between the shaft center of the shoulder bolt 50 and the center of the serration fitting position is referred to as 14 mm or smaller, the diameter $\Phi_{SR1}$ of the swing circle SR1 of the embodiment becomes 54 mm or smaller (refer to FIG. 19). As this occurs, as is shown in FIG. 19, it is desirable that a distance Lg2 from a large diameter portion 26j in the other flange portion 26e to a maximum diameter of the tapered outer circumferential surface 50c1 of the shoulder bolt 50 is smaller than a distance Lg1 from the large diameter portion 26j to a position which confronts the one flange portion 26f, and that a distance Lg3 from the large diameter portion 26j to a minimum diameter of the tapered outer circumferential surface 50c1 of the shoulder bolt 50 is larger than a distance Lg4 from the large diameter portion 26j to a position on the one flange portion 26f which confronts the other flange portion 26e.

When the shoulder bolt 30 of the first embodiment is used for the diameter $\Phi_{SR1}$ (54 mm or smaller) of the swing circle SR1 of the fourth embodiment with the other specifications remaining the same, the diameter $\Phi_{SR2}$ of the swing circle SR2 becomes 56 mm or larger.

Fifth Embodiment

Next, a fifth embodiment of the invention will be described by reference to FIGS. 20 and 21.

The fifth embodiment is also made to narrow a dead space lying on the periphery of a universal joint 17B by reducing a swing circle for the universal joint 17B.

Figure 20:
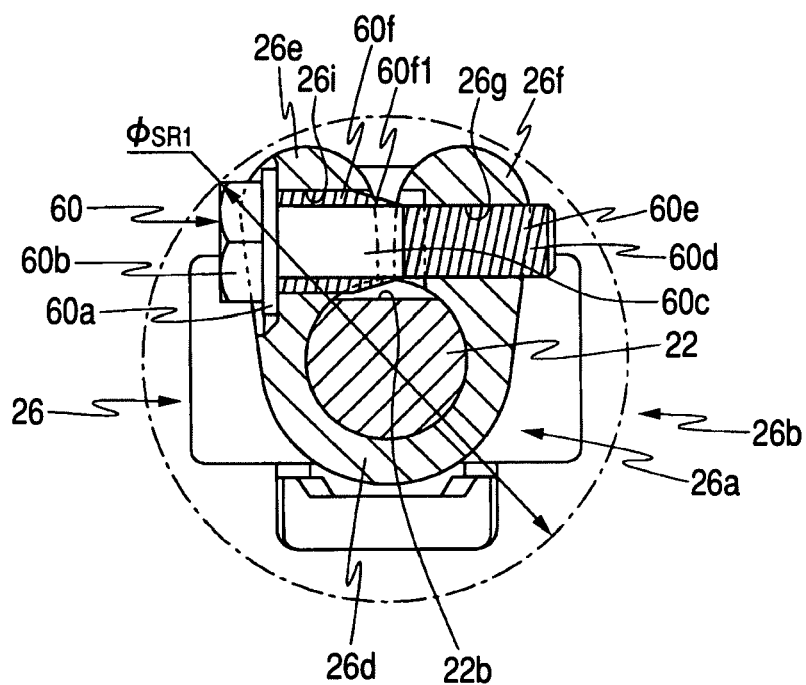
FIG. 20 A sectional view of a connecting portion between a universal joint and an intermediate shaft which shows a fifth embodiment of the invention.

In this embodiment, as is shown in FIG. 20, a bolt 60 is used which includes a straight portion 60c which projects to extend from a head portion 60b having a collar portion 60a and whose diameter is smaller than an inside diameter of a bolt insertion hole 26i in the other flange portion 26e and a small diameter portion 60*d* which extends continuously from an end portion of the straight portion 60*c* in the same diameter and on an outer circumferential surface of which a male thread 60*e* is formed, and a large diameter collar portion 60*f* is attached to an outer circumference of the straight portion 60*c* of the bolt 60.

The large diameter collar portion 60*f* is a cylindrical member which has an outside diameter which is substantially the same as the inside diameter of the bolt insertion hole 26*i* in the other flange portion 26*e* and an inside diameter which is substantially the same as an outside diameter of the straight portion 60*c* and is fitted on an outer circumference of the straight portion 60*c*.

A tapered outer circumferential surface 60*f*1 is formed on an outer circumference in a position lying on a side of the large diameter collar portion 60*f* which faces the small diameter portion 60*d* in such a manner as to gradually decrease in diameter as it extends towards the small diameter portion 60*d*.

This embodiment is also configured in such a manner that a male thread 60*e* of the small diameter portion 60*d* of the bolt 60 is screwed into a female thread 26*g* which is formed in one flange portion 26*f* of an intermediate shaft side yoke 16, and the other flange portion 26*e* is tightened towards the one flange portion 26*f*, whereby a male shaft 22 is made to be embraced by a shaft holding portion 26*d* for final fastening.

Figure 21:
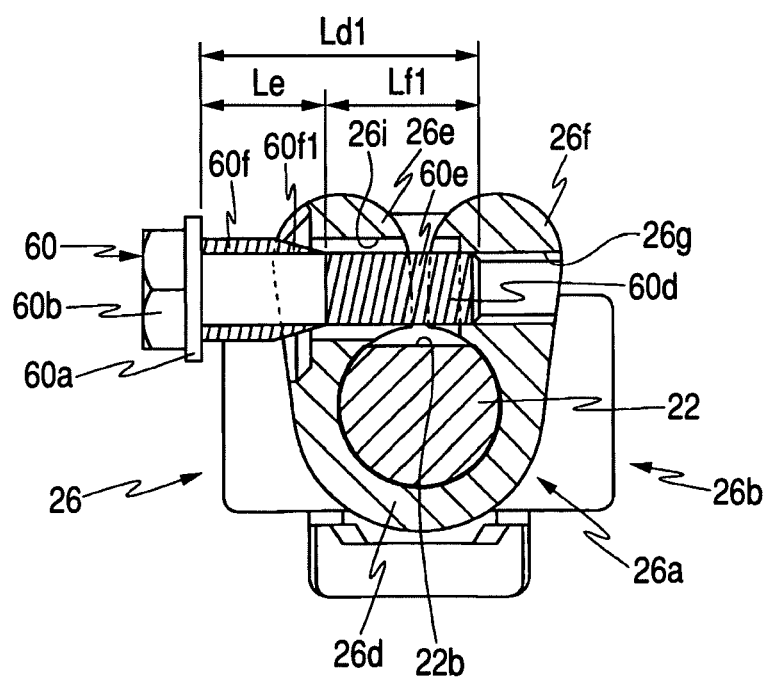
FIG. 21 A diagram showing a state in which a shoulder bolt of the fifth embodiment is temporarily fastened.

The bolt 60 of the embodiment is configures in such a manner that when a distal end of the male thread 60*e* is screwed into the female thread 26*g* of the one flange portion 26*f* shallowly as is shown in FIG. 21, part of the tapered outer circumferential surface 60*f*1 of the large diameter collar portion 60*f* is loosely inserted into an inside of the bolt insertion hole 26*i* in the other flange portion 26*e*.

In addition, in the bolt 60 of this embodiment, compared with the shoulder bolt 30 of the first embodiment shown in FIG. 18, although an axial length Le of the large diameter collar portion 60*f* is the same as the large diameter portion 30*c*, since the distal end of the male thread 60*e* is screwed into the female thread 26*g* in the one flange portion 26*f* shallowly while the part of the tapered outer circumferential surface 60*f*1 of the large diameter collar portion 60*f* is loosely inserted into the inside of the bolt insertion hole 26*i* in the other flange portion 26*e*, the axial length Lf1 of the small diameter portion 60*d* of the bolt 60 becomes a shorter dimension than the axial length Lf1 of the small diameter portion 30*d* of the shoulder bolt 30 of the first embodiment (Lf1<Lf2).

Because of this, a neck length Ld1 of the bolt 60 of this embodiment also becomes a shorter dimension than the neck length Ld2 of the shoulder bolt 30 of the first embodiment (Ld1<Ld2).

In this way, the diameter $\Phi_{SR1}$ of a swing circle SR1 of a universal joint 17B which employs the bolt 60 whose neck length Ld1 is shorter than the diameter $\Phi_{SR2}$ of a swing circle SR2 of a universal joint 17B which employs the shoulder bolt 30 shown in 18 whose neck length Ld2 is longer ($\Phi_{SR1}<\Phi_{SR2}$).

Consequently, in this embodiment, by the use of the bolt 60 in which the tapered outer circumferential surface 60*f*1 is formed on the large diameter collar portion 60*f* which fits on the outer circumference of the straight portion 60*c* in such a manner as to gradually decrease in diameter as it extends towards the small diameter portion 50*d*, when implementing a temporary fastening, the part of the tapered outer circumferential surface 60*f*1 is loosely inserted into the inside of the bolt insertion hole 26*i* in the other flange portion 26*e* and the distal end of the male thread 60*e* is screwed into the female thread 26*g* in the one flange portion 26*f* shallowly, the temporary fastening can be surely implemented. In addition, since the bolt 60 is configured in such a manner that the neck length Ld1 becomes short, the diameter $\Phi_{SR1}$ of the swing circle SR1 of the universal joint 17B becomes small, thereby making it possible to narrow the dead space surrounding the universal joint 17B.

In addition, in the bolt 60 of the embodiment, since the tapered outer circumferential surface 60*f*1 comes into engagement with an open circumferential edge of the bolt insertion hole 26*i* before the large diameter collar portion 60*f* is inserted into the bolt insertion hole 26*i* in the other flange portion 26*e*, the concentration of stress to the open circumferential edge of the bolt insertion hole 26*i* can be avoided which would otherwise occur as a result of the large diameter collar portion being brought into abutment therewith.

Further, in this embodiment, since the simple construction is provided by the use of the normal bolt 60 which has no shoulder with the large diameter collar portion 60*f* caused to fit on the straight portion 60*c* of the bolt 60, a reduction in part costs can be realized.

Figure 22A:
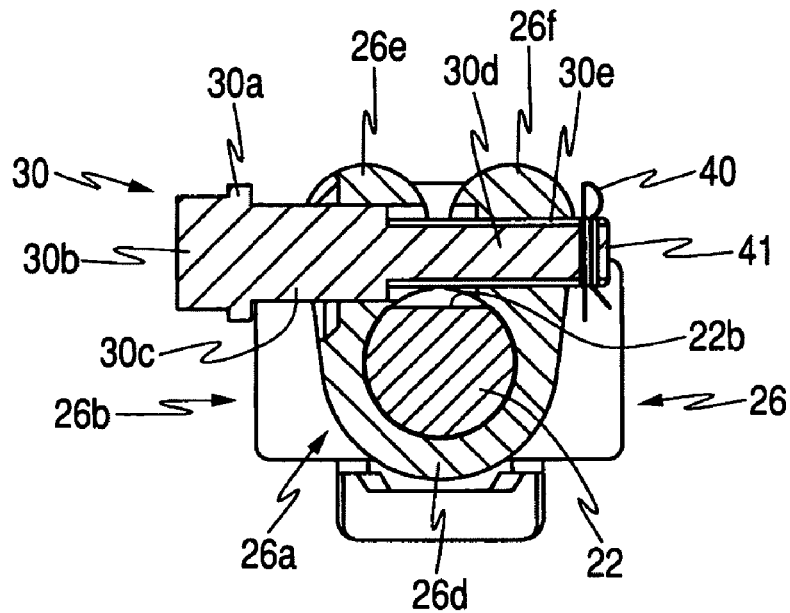
FIG. 22A A sectional view of a temporarily fastened state which shows a modified example to the shoulder bolts used in the first and second embodiments.
Figure 22B:
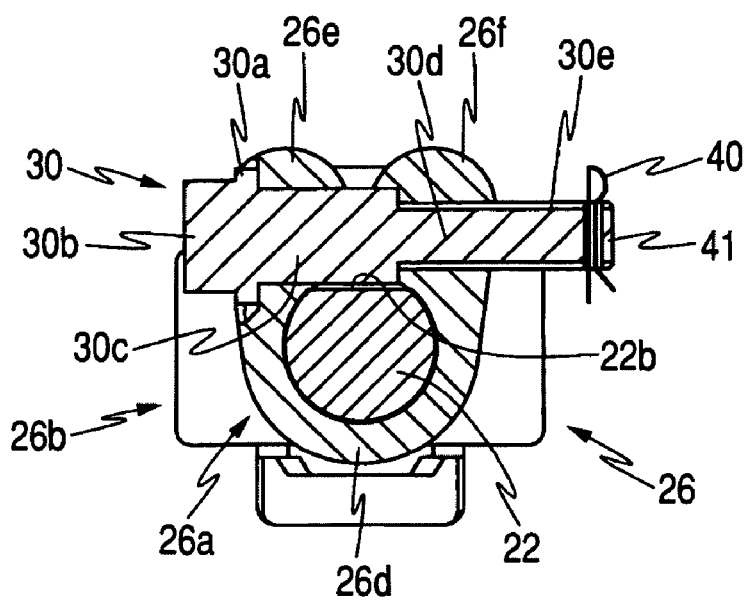
FIG. 22B A sectional view of a finally fastened state which shows the modified example to the shoulder bolts used in the first and second embodiments.
Figure 23:
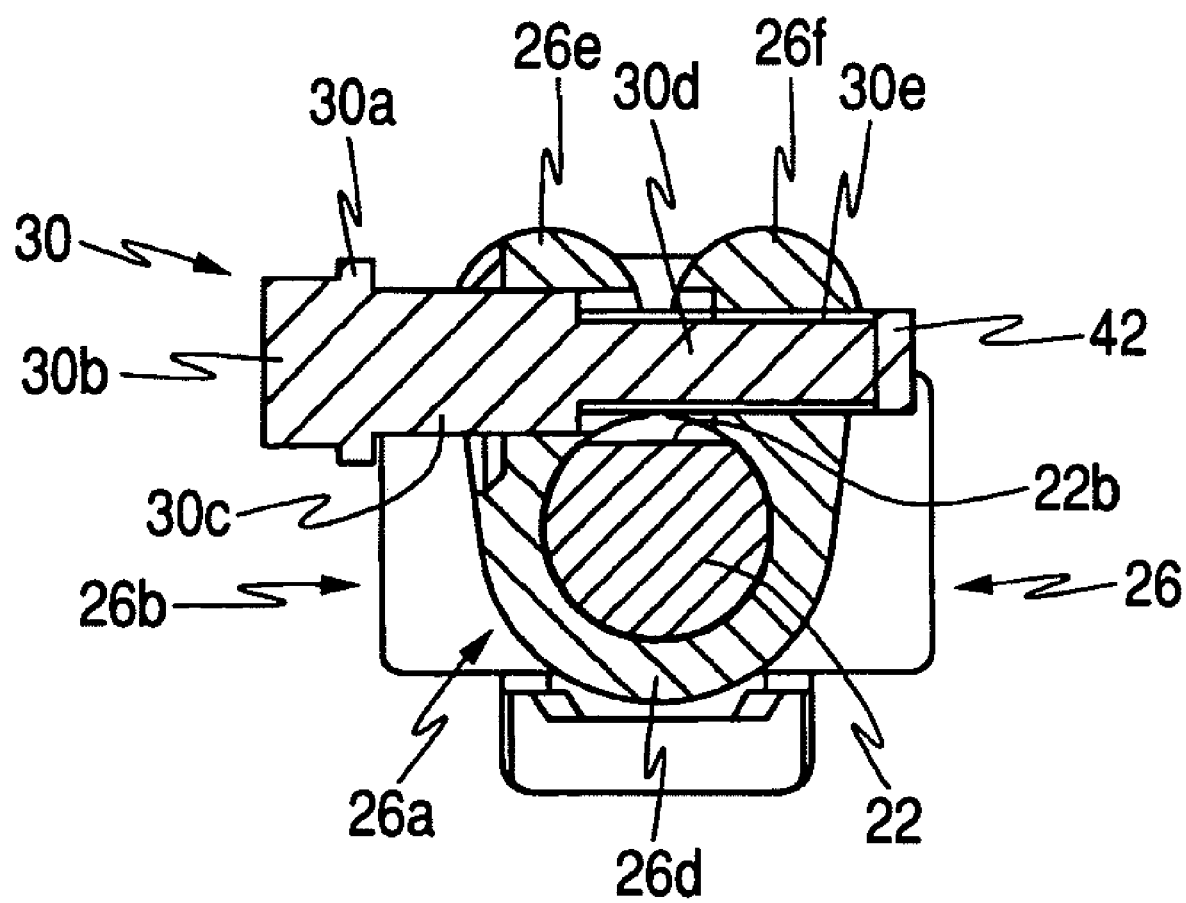
FIG. 23 A sectional view showing another modified example to the shoulder bolts used in the first and second embodiments.

In addition, in the first and second embodiments that have been described above, while no consideration is described as being taken regarding the dislocation of the shoulder bolt 30 in the temporarily fastened state in which the male thread 30*e* of the shoulder bolt 30 is screwed shallowly in the female thread 26*g* formed in the flange portion 26*f* of the intermediate shaft side yoke 26, the invention is not limited thereto. Hence, as is shown in FIGS. 22A and 22B, the length of the small diameter portion 30*d* of the shoulder bolt 30 is made to be such a length that a distal end of the small diameter portion 30*d* projects outwards of the flange portion 26*f* of the intermediate shaft side yoke 26 in the aforesaid temporarily fastened state. Further, the dislocation of the shoulder bolt 30 from the intermediate shaft side yoke 26 in the temporarily fastened state may be prevented by forming a pin insertion hole 41 into which a dislocation preventive pin 40 is inserted at a projecting end of the small diameter portion 30*d* and inserting the dislocation preventive pin 40 into the pin insertion hole 41 in the temporarily fastened state in which the male thread 30*e* of the shoulder bolt 30 is screwed shallowly in the female thread 26*g* formed in the flange portion 26*f* of the intermediate shaft side yoke 26. Further, the dislocation of the shoulder bolt 30 may be prevented by forming a thread collapsed portion 42 in which threads on an end portion of the male thread 30*e* are collapsed which projects outwards of the flange portion 26*f* of the intermediate shaft side yoke 26 with the male thread 30*e* screwed shallowly into the female thread 26*g* formed in the flange portion 26*f* of the intermediate shaft side yoke 26 as is shown in FIG. 23 in place of providing the dislocation preventive pin 40. In addition, the configurations shown in FIGS. 22A and 22B, and 23 may be adopted to be applied to the shoulder bolt 50 illustrated in the fourth embodiment and the bolt 60 illustrated in the fifth embodiment to which the large diameter collar portion 60*f* is attached.

In addition, in the first to fifth embodiments, while the bolt engagement recess portion 22*b* on the male shaft 22 is described as being made up of the milled groove, the invention is not limited thereto. Hence, in the event that the positioning accuracy of the output shaft 14 of the worm reduction gear mechanism 11 and the pinion shaft 19 of the steering gear mechanism 6 is high, the bolt engagement recess portion 22*b* on the male shaft 22 can be made into an arc-shaped recess portion into which the large diameter portion 30*c* of the shoulder bolt 30 can be inserted, and the cross sectional shape of the bolt engagement recess portion 22*b* can be formed into any arbitrary shape as long as the bolt engagement recess portion 22b can be brought into engagement with the large diameter portion 30c of the shoulder bolt 30.

In addition, in the third embodiment, while the male shaft 22 of the intermediate shaft 18 and the intermediate shaft side yoke 26 of the universal joint 17A are described as being brought into serration connection with each other, a configuration may be adopted in which while both the male shaft 22 and the intermediate shaft side yoke 26 are made to be restricted from sliding relatively to each other at the normal time, the serration connecting portion permits both the members to slide relatively to each other when the impact load reaches or exceeds a predetermined collapsing load, so as to ensure a predetermined collapsing stroke. Additionally, in the first to fifth embodiments, while the intermediate shaft side yoke 23 of the universal joint 17A is described as being formed into the cylindrical tube shape and the male shaft 22 of the intermediate shaft 18 as being formed into the cylindrical shape, the invention is not limited thereto. The male shaft 22 may be formed into a polygonal shape such as a triangular shape, a quadrangular shape or the like, and to match the shape of the male shaft 22, a polygonal hole portion may be made to be formed in the intermediate shaft side yoke 23 for insertion of the make shaft 22.

Further, in the first to fifth embodiments, while the invention is described as being applied to the intermediate shaft side yoke 26 of the universal joint 17B, the invention is not limited thereto. Hence, the invention may be applied to the intermediate shaft side yoke 23 of the universal joint 17A.

Furthermore, in the first to fifth embodiments, while the invention is described as being applied to the electric power steering apparatus, the invention is not limited thereto. Hence, the invention can also be applied to a normal steering apparatus from which the steering assist mechanism 4 is omitted.

Sixth Embodiment

Figure 24:
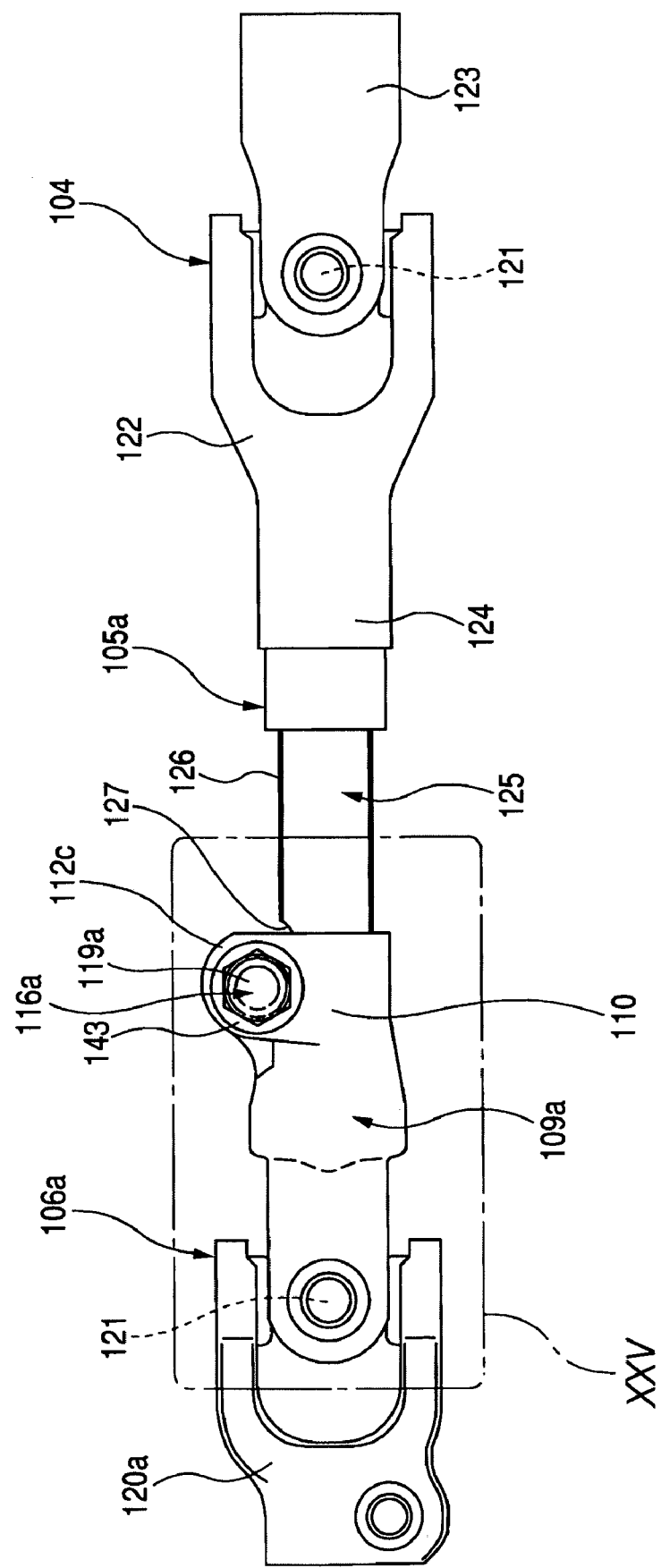
FIG. 24 A side view of a rotation transmission unit for a steering apparatus which incorporates a connecting portion of a sixth embodiment of the invention.

FIGS. 24 to 34 show a sixth embodiment of the invention. Firstly, FIG. 24 shows a rotation transmission unit for a steering apparatus which incorporates a connecting portion of a shaft and a yoke of a universal joint according to the invention. This rotation transmission unit is made up of one universal joint 106a which is connected to a front end portion (a left end portion in FIG. 24) and the other universal joint 104 which is connected to a rear end portion (a right end portion in FIG. 24) of an intermediate shaft 105a. These universal joints 106a (104) are such as to be referred to as a cardan joint and are made by connecting together bifurcated distal end portions of pairs of yokes 109a, 120a (122, 123) via a cross joint 121. In the rotation transmission unit, a connecting portion between the one (right-hand in FIG. 24) yoke 109a which makes up the one universal joint 106a and the intermediate shaft 105a configures a construction according to the invention.

Figure 25:
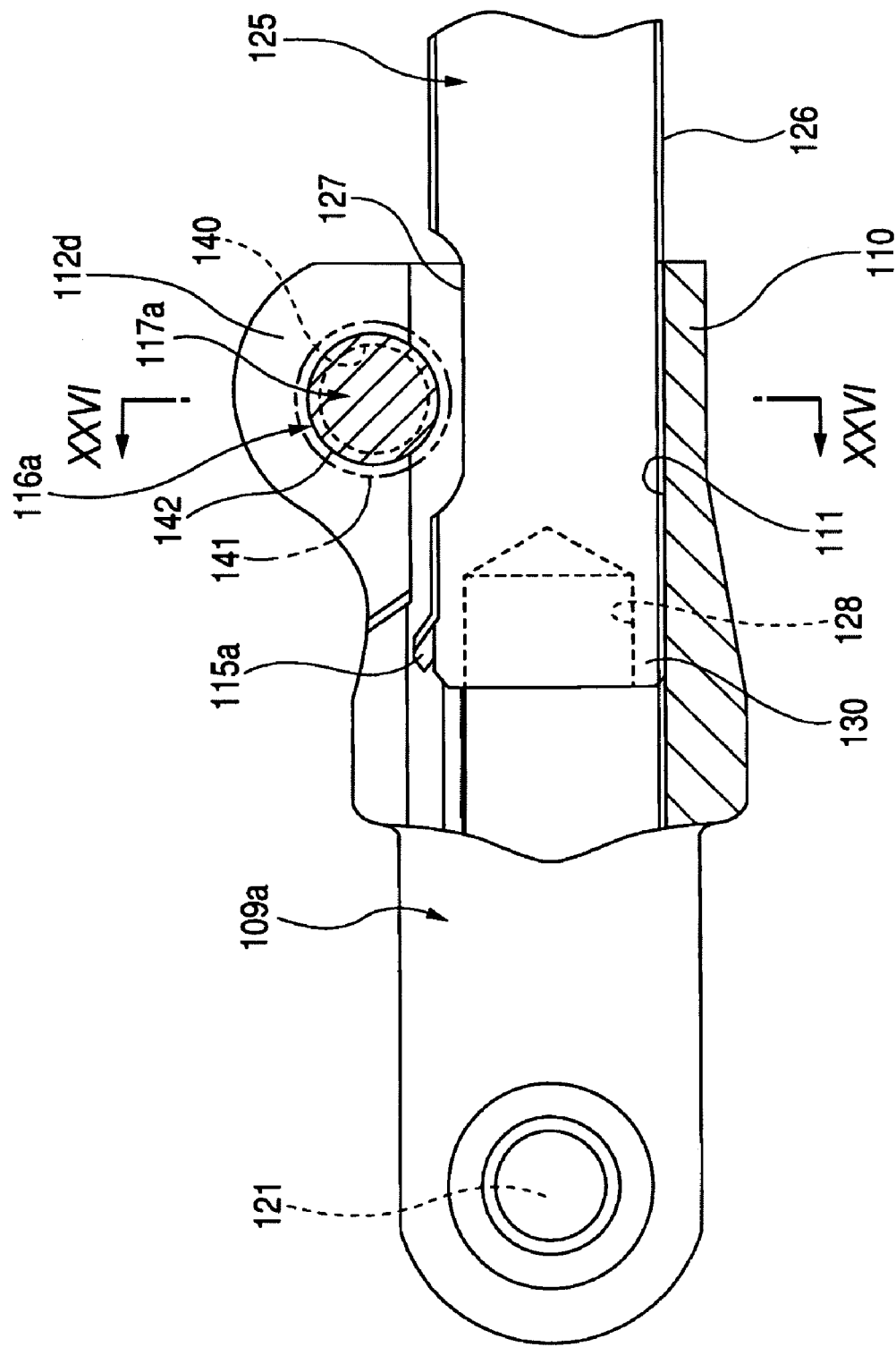
FIG. 25 A partially sectional view showing a part indicated by XXV in FIG. 24 in an enlarged fashion.
Figure 26:
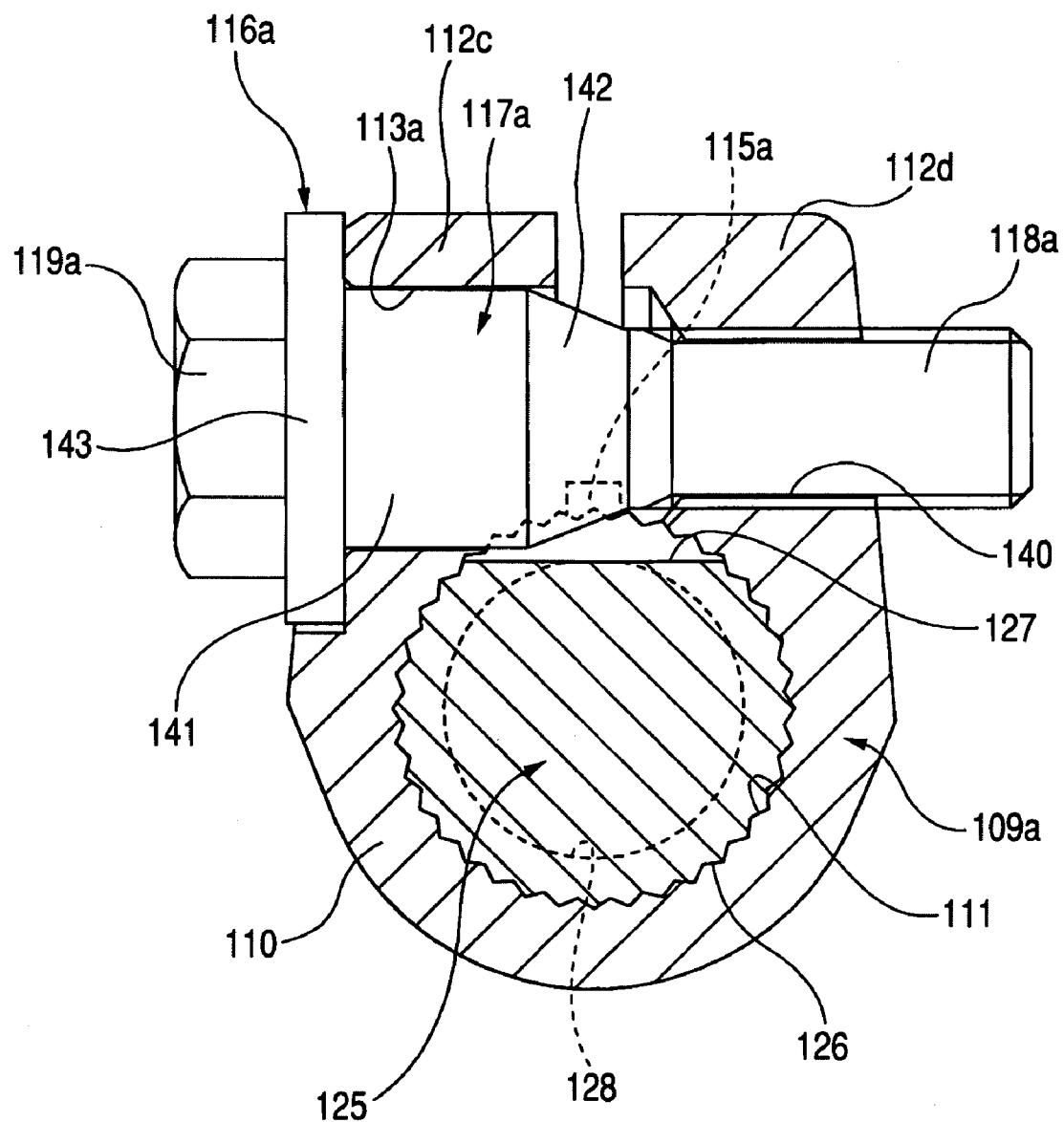
FIG. 26 An enlarged sectional view taken along the line XXVI-XXVI in FIG. 25.
Figure 27:
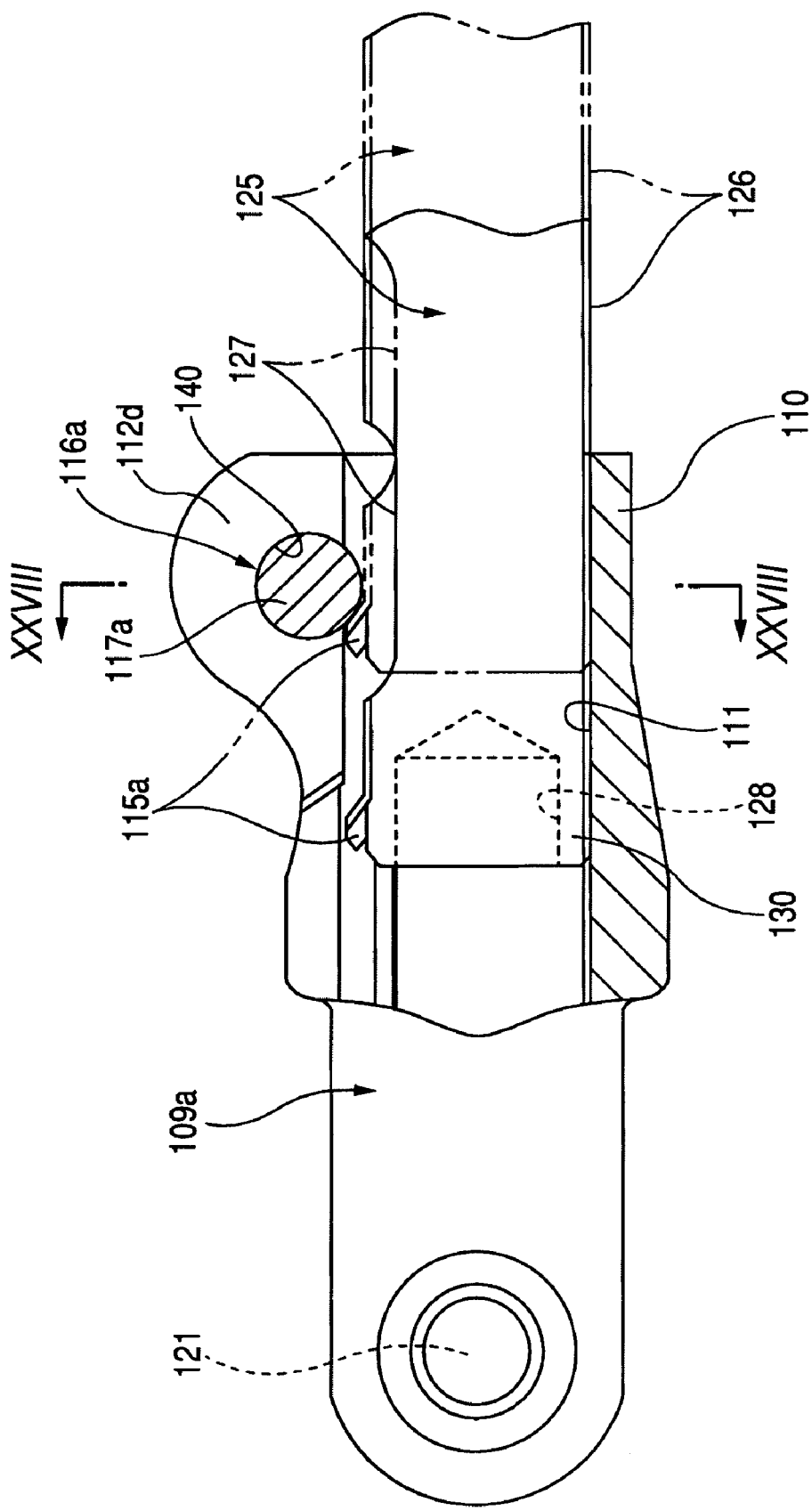
FIG. 27 A diagram similar to FIG. 25, which shows a temporarily fastened state.
Figure 28:
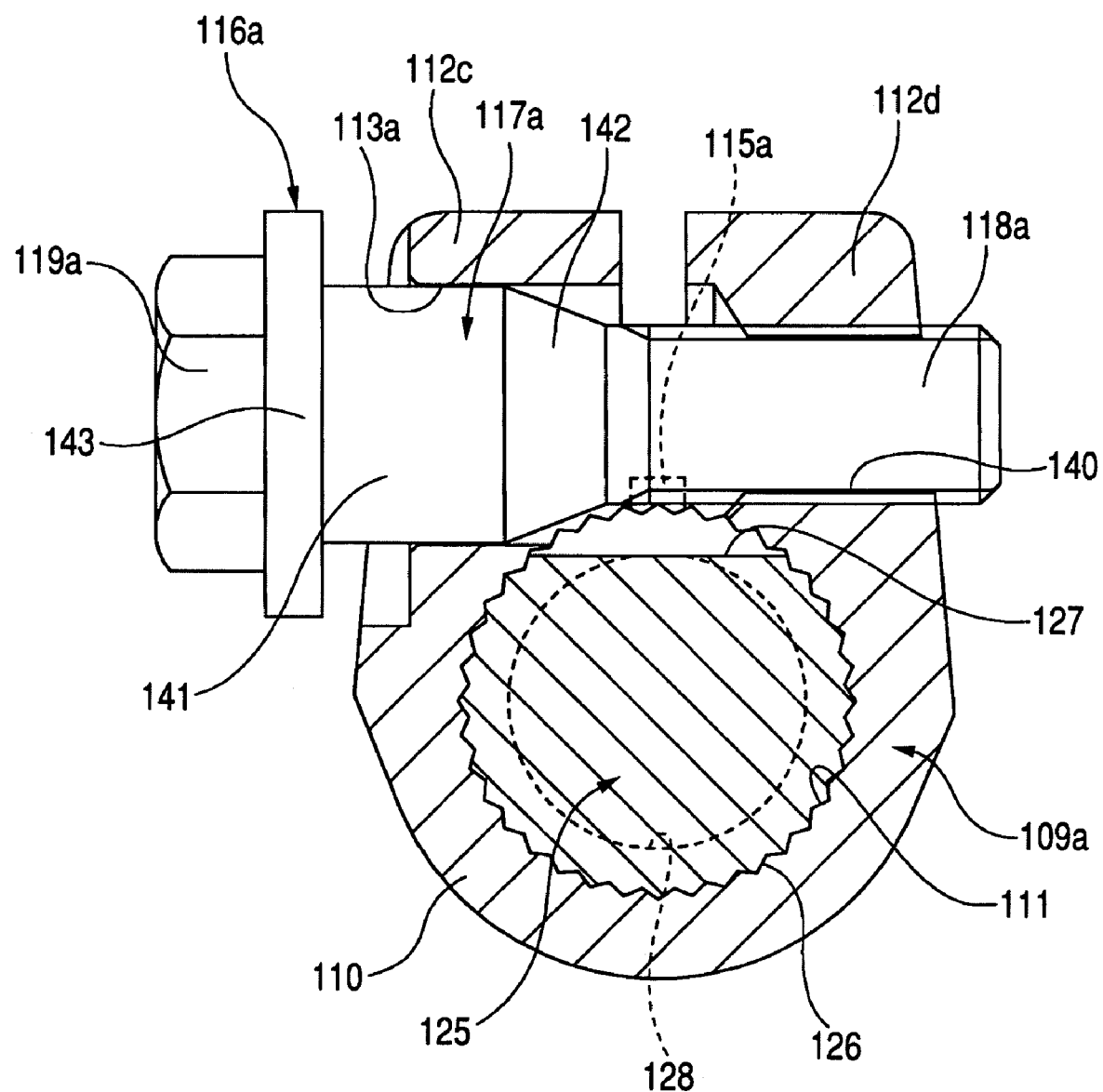
FIG. 28 A sectional view taken along the line XXVII-XXVII in FIG. 27.
Figure 29:
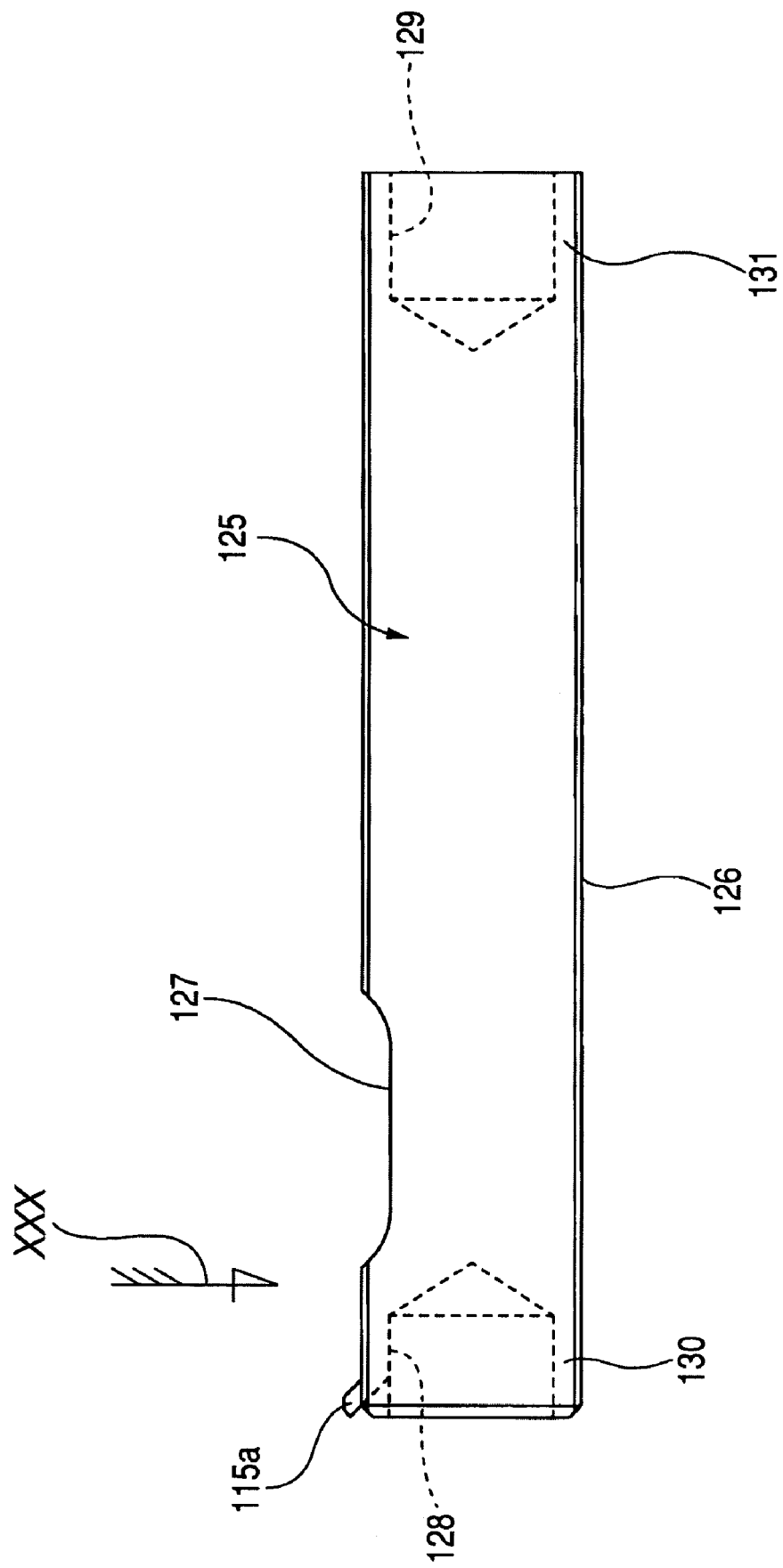
FIG. 29 A side view of an inner shaft which configures an intermediate shaft.
Figure 30:
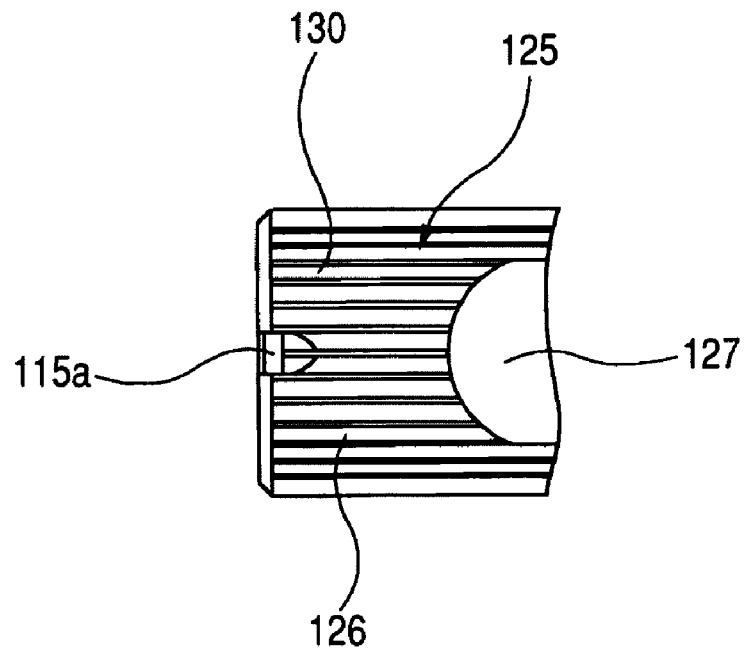
FIG. 30 A view seen from a direction indicated by an arrow XXX in FIG. 29.
Figure 31:
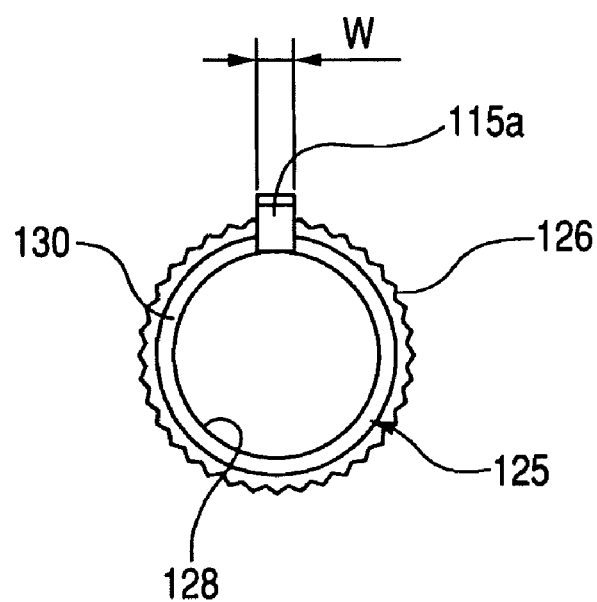
FIG. 31 A view seen from the left in FIG. 29.
Figure 32:
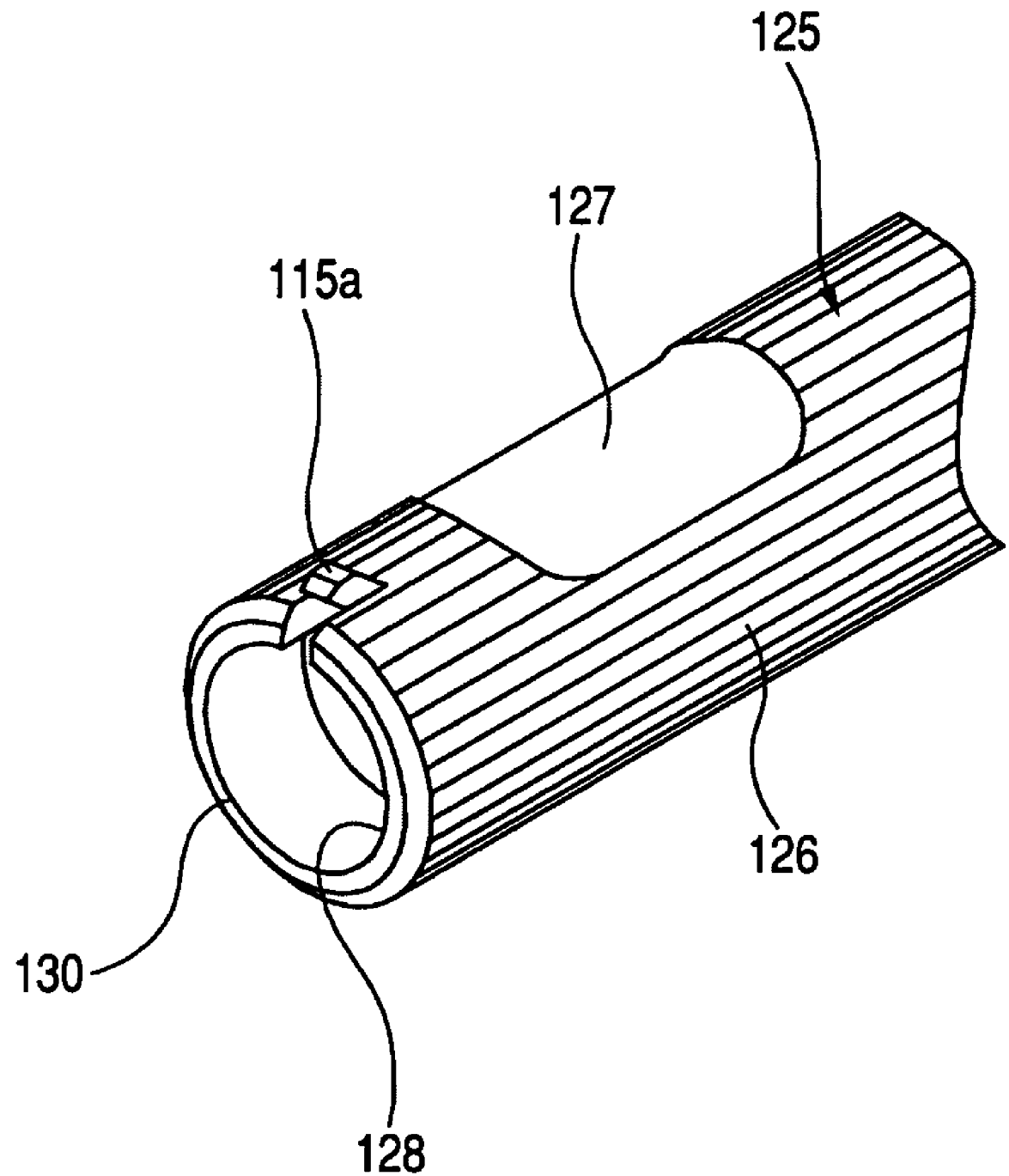
FIG. 32 A perspective view of a front half portion of the inner shaft.

As is seen from, respectively, FIGS. 24 to 26 which show a state resulting after the connection is completed and FIGS. 27 to 28 which show a temporarily fastened state, the connecting portion includes the intermediate shaft 105a, the one yoke 109a and a bolt 116a. In these constituent components, the intermediate shaft 105a is configured in such a manner that a front end portion of a cylindrical tube-shaped outer shaft 124 is made to fit on a rear end portion of a cylindrical inner shaft 125 in such a way that a rotational force can be transmitted therebetween and that an axial relative displacement is allowed only when an axial load (a collapsing load) which exceeds a predetermined magnitude is applied. Because of this, specifically, the front end portion and the rear end portion are brought into serration fit with each other with a predetermined interference provided. The outer shaft 124, which configures the intermediate shaft 105a configured as described above, is formed integrally with one (left-hand in FIG. 24) yoke 122 which configures the other universal joint 104. Further, an inner circumferential surface is made into a female serration portion (not shown). In contrast to this, as is shown in detail in FIGS. 29 to 32, the inner shaft 125 is configured in such a manner that on an outer circumferential surface thereof, portions excluding an engagement recess portion 127 and an engagement projecting portion 115a, which will be described next, are made into a male serration portion 126 which can be brought into serration engagement with the female serration portion with a predetermined interference provided. In addition, an axially elongated engagement recess portion 127 and an engagement projecting portion 115a are formed at one circumferential portion on the outer circumferential surface which lies closer to a front end and at a portion along a front edge portion similarly on the outer circumferential surface which matches the engagement recess portion 127 in circumferential phase, respectively. In addition, both end portions of the inner shaft 125 are made into cylindrical tube-shaped portions 130, 131 at whose central portions circular holes 128, 129 are formed, respectively.

Figure 33:
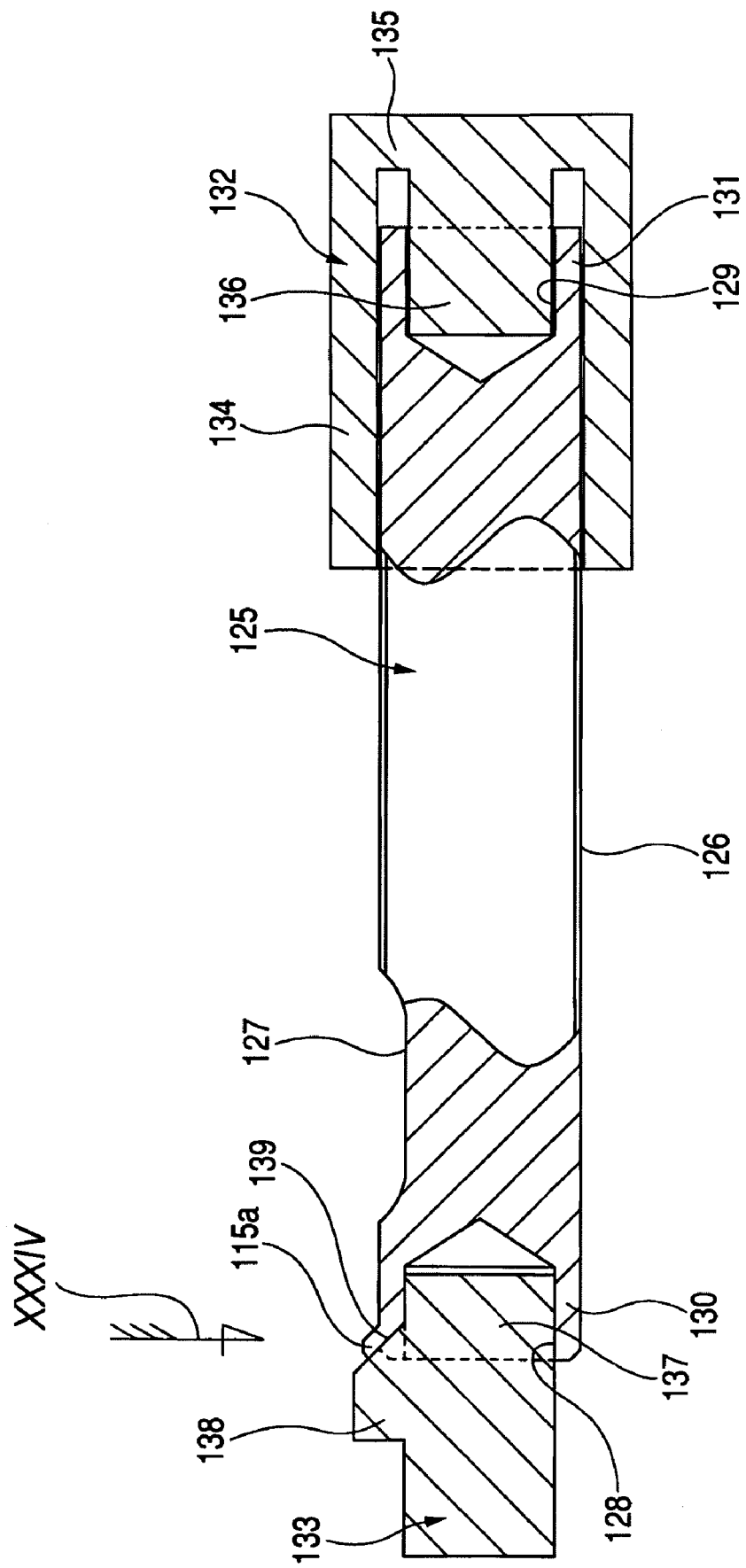
FIG. 33 A partially sectional view showing a working state in which an engagement projecting portion is formed on an outer circumferential surface of a front end portion of the inner shaft.
Figure 34:
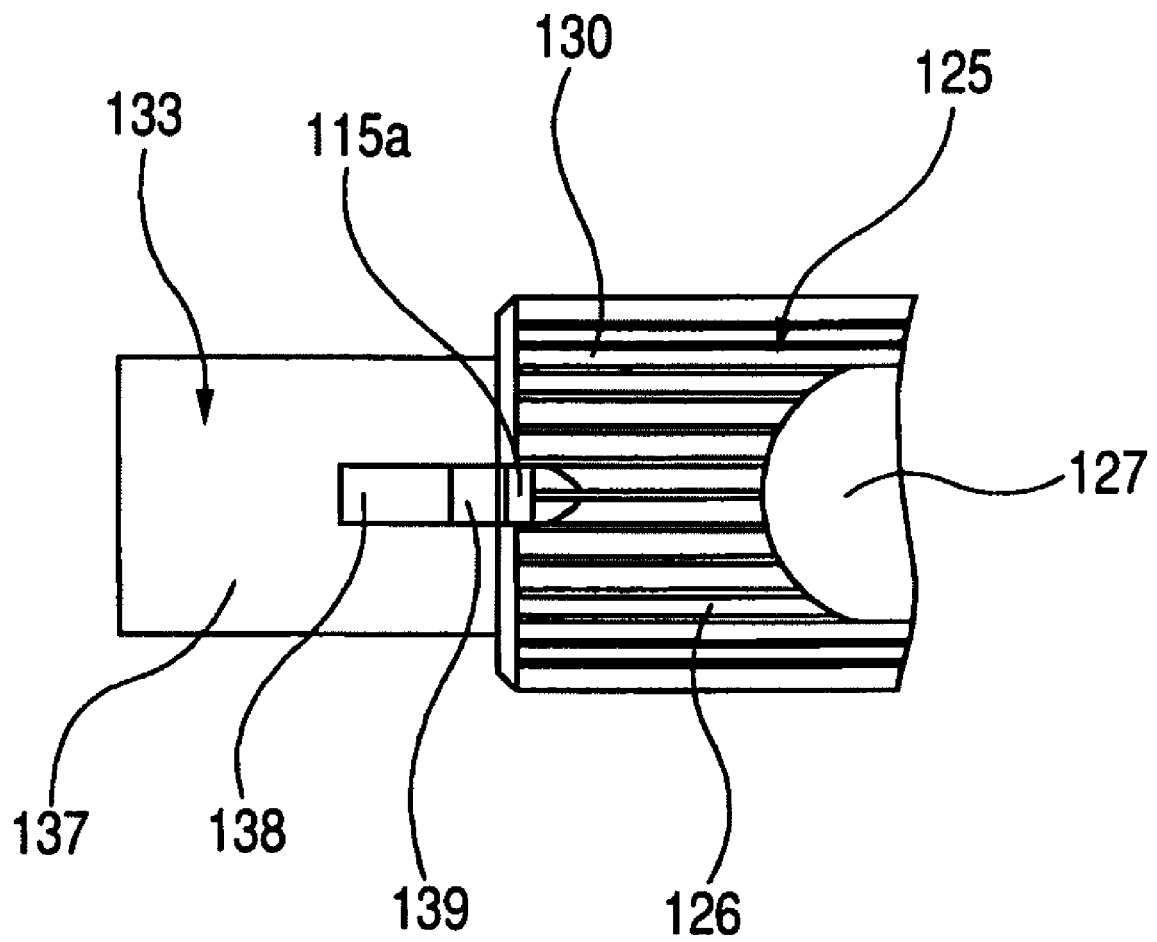
FIG. 34 A view seen from a direction indicated by an arrow XXXIV in FIG. 33.

In the case of this embodiment, the engagement recess portion 127 is formed by milling work after the male serration portion 126 has been formed. In addition, the engagement projecting portion 115a is formed by the use of a receiving jig 132 and a pressing jig 133 as is shown in FIGS. 33 to 34 after a shaft intermediate element has been manufactured on which the male serration portion 126 and the engagement recess portion 127 and both the cylindrical tube-shaped portions 130, 131 are formed. Of these jigs, the receiving jig 132 includes a cylindrical tube-shaped portion 134, a bottom plate portion 135 which closes a proximal end opening of the cylindrical tube-shaped portion 134, and a cylindrical portion 136 which projects from an inner surface of the bottom plate portion 135 inside the cylindrical tube-shaped portion 134 and which is concentric with the cylindrical tube-shaped portion 134. In addition, the pressing jig 133 includes a cylindrical portion 137, and a pressing portion 138 which is provided at one circumferential portion on an outer circumferential surface at an axially intermediate portion of the cylindrical portion 137 in such a manner as to project therefrom. This pressing portion 138 is a plate-shaped portion which resides within a space with a predetermined thickness which expands to both sides of an imaginary plane which includes an axis of the cylindrical portion 137. In addition, in this pressing portion 138, a lateral surface lying at a distal end side of the cylindrical portion 137 (a right-hand side in FIGS. 33 to 34) is made into an inclined surface 139 which is inclined in a direction towards a proximal end side of the cylindrical portion 137 (a left-hand side in FIGS. 33 to 34) as it extends radially outwards of the cylindrical portion 137.

When forming the engagement projecting portion 115a by the use of the receiving jig 132 and the pressing jig 133, as is shown in FIG. 33, the rear end portion of the inner shaft 125 (the shaft intermediate element) is supported by the receiving jig 132 in such a state that the rear end portion is properly positioned radially and axially. To make this happen, specifically, the rear end portion of the inner shaft 125 is inserted into the inside of the cylindrical tube-shaped portion 134 which makes up the receiving jig 132 without any large looseness (via a minute gap which somehow allows the passage of air). In conjunction with this, the cylindrical portion 136 which makes up the receiving jig 132 is inserted into the inside of the cylindrical tube-shaped portion 131 (the circular hole 129) which is provided at the rear end portion of the inner shaft 125 without any large looseness, so that a distal end portion of the cylindrical portion 136 is brought into striking abutment with a deep end portion of the cylindrical tube-shaped portion 131. In addition, in this state, the inclined surface 139 of the pressing portion 138 which makes up the pressing jig 133 is pressed against a portion of the distal end edge portion of the cylindrical tube-shaped portion 130 which matches the engagement projecting portion 127 in phase with respect to the circumferential direction, while the distal end portion of the cylindrical portion 137 which makes up the pressing jig 133 is inserted into the inside of the cylindrical tube-shaped portion 130 (the circular hole 128) which is provided at the front end portion of the inner shaft 125 without any large looseness. By this action, by applying a force directed radially outwards to the relevant portion, the relevant portion is plastically bent to be erected radially outwards along the inclined surface 139 while tearing off portions lying at both sides of the relevant portion in the circumferential direction. Then, the bent and erected portion in the way described above is made into the engagement projecting portion 115a. In addition, vent holes can also be formed individually in central portions of the bottom plate portion 135 and the cylindrical portion 136 of the receiving jig 132 and a central portion of the cylindrical portion 137 of the pressing jig 133 in such a manner as to penetrate through the relevant portions in the axial direction. In addition, in the event that such vent holes are formed, the work of inserting the rear end portion of the inner shaft 125 into the inside of the receiving jig 132 and the work of pushing the distal end portion of the cylindrical portion 137 of the pressing jig 133 into the inside of the front end portion of the inner shaft 125 can smoothly be performed while suppressing or avoiding the increase in internal air pressure.

Figure 50:
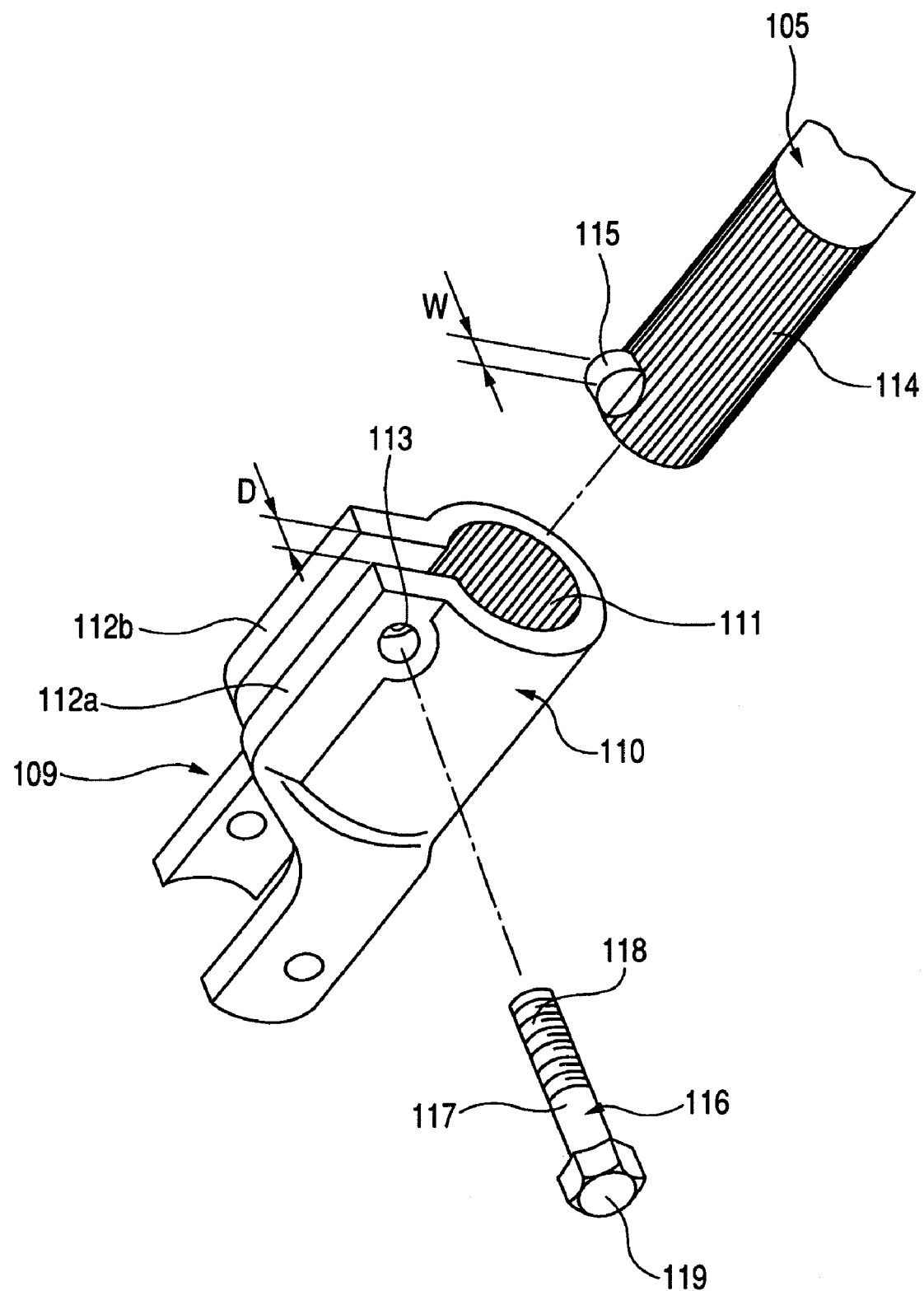
FIG. 50 An exploded perspective view showing an example of a conventional construction of a connecting portion between a shaft and a yoke of a universal joint.

In addition, as with the yoke 109 having the conventional construction which is shown in FIG. 50, provided at a base half portion (a right half portion in FIGS. 24, 26, 28) of the one yoke 109a is a segmental cylindrical tube-shaped shaft attaching portion 110 which has a discontinued portion at one circumferential location. In addition, an inner circumferential surface of the shaft attaching portion 110 is made into a female serration portion 111 which can be brought into serration engagement with the male serration portion 126 which is provided on the outer circumferential surface of the inner shaft 125. In addition, a pair of flange portions 112c, 112d which are parallel to each other are provided at both circumferential edges of the shaft attaching portion 110. In addition, of these flanges, a through hole 113a having a relatively large diameter is formed in part of the one flange portion 112c, while a thread hole 140 having a relatively small diameter is formed in part of the other flange portion 112d, the through hole 113a and the thread hole 140 being formed coaxially with each other.

In addition, the bolt 116a includes a shank portion 117a and a head portion 119 which resides at a proximal end portion of the shank portion 117a. Of these constituent members, in the shank portion 117a, the proximal end portion is made into a cylindrical portion 141 having a relatively large diameter, and a distal half portion is made into a male thread portion 118a having a relatively small diameter. Further, a portion of an outer circumferential surface of the shank portion 117a which resides between the cylindrical portion 141 and the male thread portion 118a is made into a tapered surface portion 142 which is inclined in a direction in which an outside diameter dimension is decreased as the portion extends towards the male thread portion 118a side. In addition, an outwardly oriented flange-shaped collar portion 143 is formed at an end portion of an outer circumferential surface of the head portion 119a which faces the shank portion 117a.

In the case of this embodiment, as is shown in FIGS. 24 to 26, when work of connecting and fixing together the front end portion of the inner shaft 125 which makes up the intermediate shaft 105a and the one yoke 109a is performed, prior to the work, both the universal joints 104, 106a and the intermediate shaft 105a are each built up in advance. Then, in this state, firstly, the front end portion of the inner shaft 125 is inserted into the inside of the shaft attaching portion 110 of the one yoke 109a, and the male serration portion 126 on the outer circumferential surface of the front end portion is brought into serration engagement with the female serration portion 111 on the inner circumferential surface of the shaft attaching portion 110 in a loose fashion (in such a manner as to permit an axial relative displace). At the same time as this occurs, the engagement projecting portion 115a provided on the outer circumferential surface of the front end portion of the inner shaft 125 is caused to enter between both the circumferential edges of the shaft attaching portion 110 which make up the one yoke 109a, whereby the circumferential phases of the inner shaft 125 and the one yoke 109a are made to match each other. In addition, in this state, the engagement projecting portion 115a is disposed in a position lying axially deeper side of the shaft attaching portion 110 (a deeper side in a direction in which the front end portion of the inner shaft 125 is inserted, which is a left-hand side in FIGS. 25, 27) than the through hole 113a and the thread hole 140 which are formed in the flange portions 112c, 112d, respectively. In conjunction with this, the axial phases of part of the axially elongated engagement recess portion 127 which is provided the portion on the outer circumferential surface of the inner shaft 125 which lies closer to the front end thereof and the through hole 113a and the thread hole 140 are made to coincide with each other.

Following this, as is shown in detail in FIG. 26, the cylindrical portion 141 of the bolt 116a is inserted into the through hole 113a without any looseness. Further, the male thread portion 118a of the bolt 116a is screwed into the thread hole 140. Furthermore, the head portion 119a of the bolt 116a is brought into abutment with an outer surface of the one flange portion 112c. In addition, in such a state that the cylindrical portion 141 and the tapered surface portion 142 of the bolt 116a are made to confront the engagement recess portion 127 of the inner shaft 125, the bolt 116a is tightened. By this series of actions, the shaft attaching portion 110 is contracted in diameter while narrowing the space between both the flange portions 112c, 112d, whereby the female serration portion 111 and the male serration portion 126 are brought into strong serration engagement with each other. As a result of this, the front end portion of the inner shaft 125 and the one yoke 109a are connected and fixed to each other.

Figure 49:
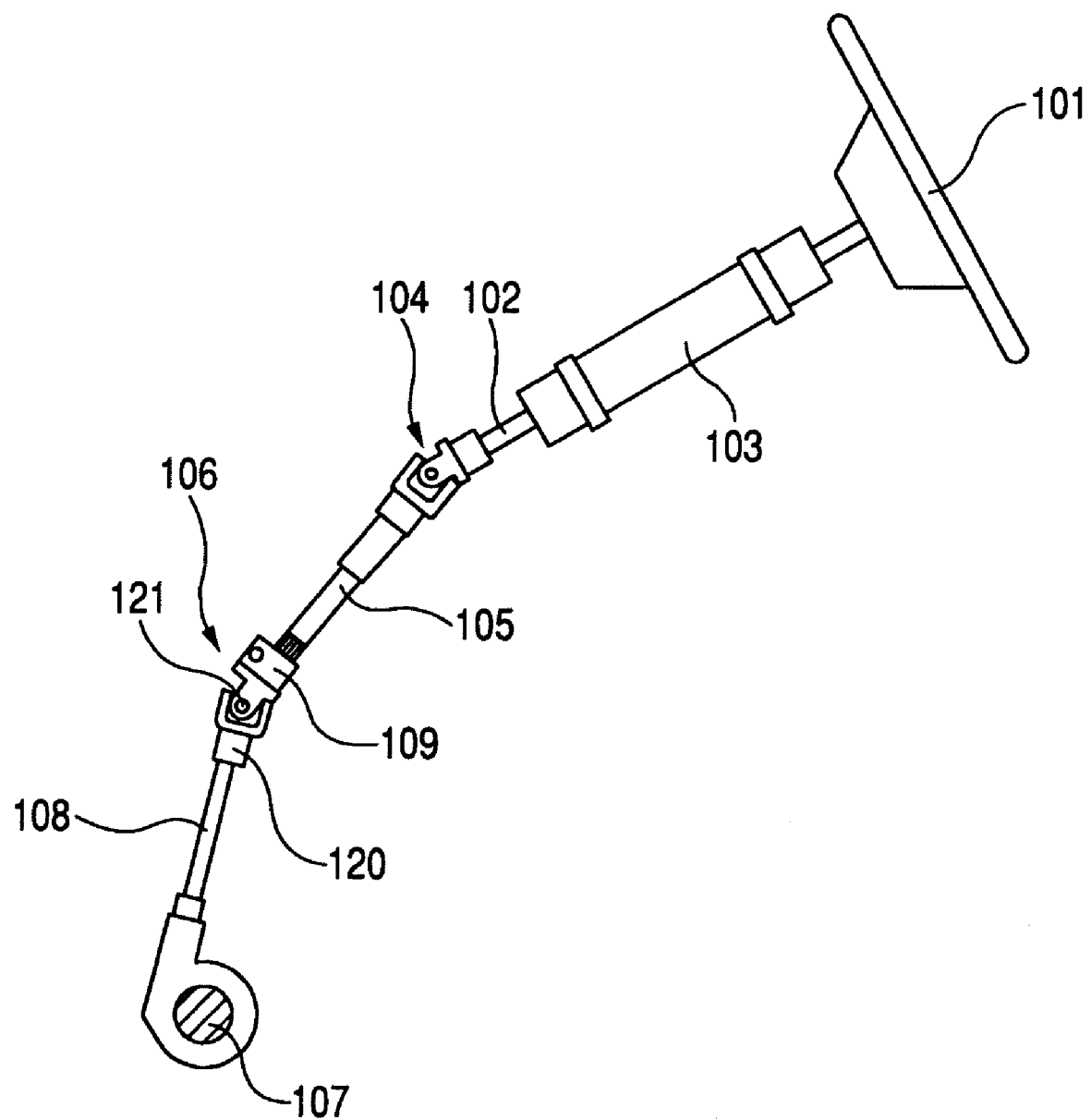
FIG. 49 A schematic side view showing an example of a steering apparatus.

In addition, when the rotation transmission unit shown in FIGS. 24 to 26 is assembled to the vehicle, for example, firstly, the other (the right in FIG. 24) yoke 123 which makes up the other universal joint 104 is connected and fixed (in the case of the construction illustrated, welded and fixed) to the front end portion of the steering shaft 102 (refer to FIG. 49) in advance. Then, the other (the left in FIG. 24) yoke 120a which makes up the one universal joint 106a is connected and fixed to the upper end portion of the input shaft 108 (refer to FIG. 49). Specifically, in such a state that the upper end portion of the input shaft 108 is disposed in an inside of a proximal end portion of the other yoke 120a, the proximal end portion and the upper end portion are connected and fixed to each other by a bolt, not shown. In the case of this embodiment, when this connecting work is performed, the connecting portion between the front end portion of the inner shaft 125 and the one yoke 109a is put into the temporarily fastened state as shown in FIGS. 27 to 28. Namely, by loosening the bolt 116a with the male thread portion 118a kept screwed in the thread hole 140, as is shown in FIG. 28, the cylindrical portion 141 and the tapered surface portion 142 of the bolt 116a are caused to retreat into the inside of the through hole 113a in the one flange portion 112c. By this action, the cylindrical portion 141 and the tapered surface portion 142 are put into a state in which they do not confront the engagement recess portion 127 on the inner shaft 125 (a state in which the male thread portion 118a of the bolt 116a can ride on the male serration portion 126 of the inner shaft 125). In this temporarily fastened state, since there results a state in which the female serration portion 111 and the male serration portion 126 are in a loose serration engagement with each other, the front end portion of the inner shaft 125 and the one yoke 109a are allowed to be displaced relative to each other by a predetermined amount only in the axial direction. Specifically, as is indicated by imaginary lines (chain double-dashed lines) in FIG. 27, the engagement projecting portion 115a provided on the outer circumferential surface of the front end portion of the inner shaft 125 is allowed to be relatively displaced in the axial direction between the position where it is brought into engagement with the male thread portion 118a of the bolt 116a and the position where the front end face of the inner shaft 125 is brought into abutment with the cross joint 121. Consequently, the working properties in connecting the other yoke 120a to the upper end portion of the input shaft 108 can be improved by such an extent that the axial relative displacement described above is permitted.

In any case, when connecting the front end portion of the inner shaft 125 and the one yoke 109a together, not only when the work is performed of connecting the other yoke 120a to the upper end portion of the input shaft 108 but also in case the bolt 116a gets loosened while the motor vehicle is being driven, the front portion of the inner shaft 125 can be prevented from being dislocated from the inside of the shaft attaching portion 110 of the one yoke 109a towards the proximal end side. Namely, in the event that the cylindrical portion 141 and the tapered surface portion 142 of the bolt 116a still remain confronting the engagement recess portion 127 of the inner shaft 125 as is shown in FIG. 26 in such a state that the bolt 116a is loosened, by the front edge of the engagement recess portion 127 being brought into engagement with the cylindrical portion 141 and the tapered surface portion 142, the aforesaid dislocation can be prevented. In contrast to this, in the event that the temporarily fastened state as is shown in FIGS. 27 to 28 is resulting in such a state that the bolt 116a is loosened further, as is indicated by the imaginary lines (the chain double-dashed lines) in FIG. 27, the dislocation can be prevented by the engagement projecting portion 115a of the inner shaft 125 being brought into engagement with the male thread portion 118a of the bolt 116a.

In the case of the connecting portion between the shaft and the yoke of the universal joint and the manufacturing method of the shaft of the embodiment which have been described heretofore, being different from the case of the conventional construction shown in FIG. 50, there occurs no such situation that the material to form the engagement projecting portion 115a is reduced as a result of increasing the circumferential width dimension W of the engagement projecting portion 115a which is determined in the design stage. In addition, compared with the case of the conventional construction shown in FIG. 50, the working force to form the engagement projecting portion 115a can be made small as long as the width dimension W of the engagement projecting portion 115a is not attempted to be made quite large. Because of this, the circumferential portion (for example, the male serration portion 126 which resides around the periphery of the engagement projecting portion 115a) surrounding the worked portion can be made difficult to be deformed by the working force. Consequently, even in the event that the space between both the circumferential edges of the shaft attaching portion 110 which configures the one yoke 109a is wide and the circumferential width dimension of the engagement projecting portion 115a which is determined in the design stage is increased so as to match the increase in the space between the circumferential edges of the shaft attaching portion 110, the formation of the engagement projecting portion 115a is facilitated. Further, in the case of this embodiment, since the one circumferential portion of the cylindrical tube-shaped portion 130 provided at the front end portion of the inner shaft 125 is plastically bent and erected radially outwards so as to form the engagement projecting portion 115a, compared with the case of the conventional construction shown in FIG. 50, the height dimension of the engagement projecting portion 115a can easily be increased. Specifically, in the case of this embodiment, the size of the engagement projecting portion 115a can be set arbitrarily based on the outside diameter and inside diameter of the cylindrical tube-shaped portion 130 provided at the front end portion of the inner shaft 125, the circumferential width dimension of the pressing portion 138 which makes up the pressing jig 133 and the stroke amount of the pressing portion 138 at the time of working.

Seventh Embodiment

Figure 35:
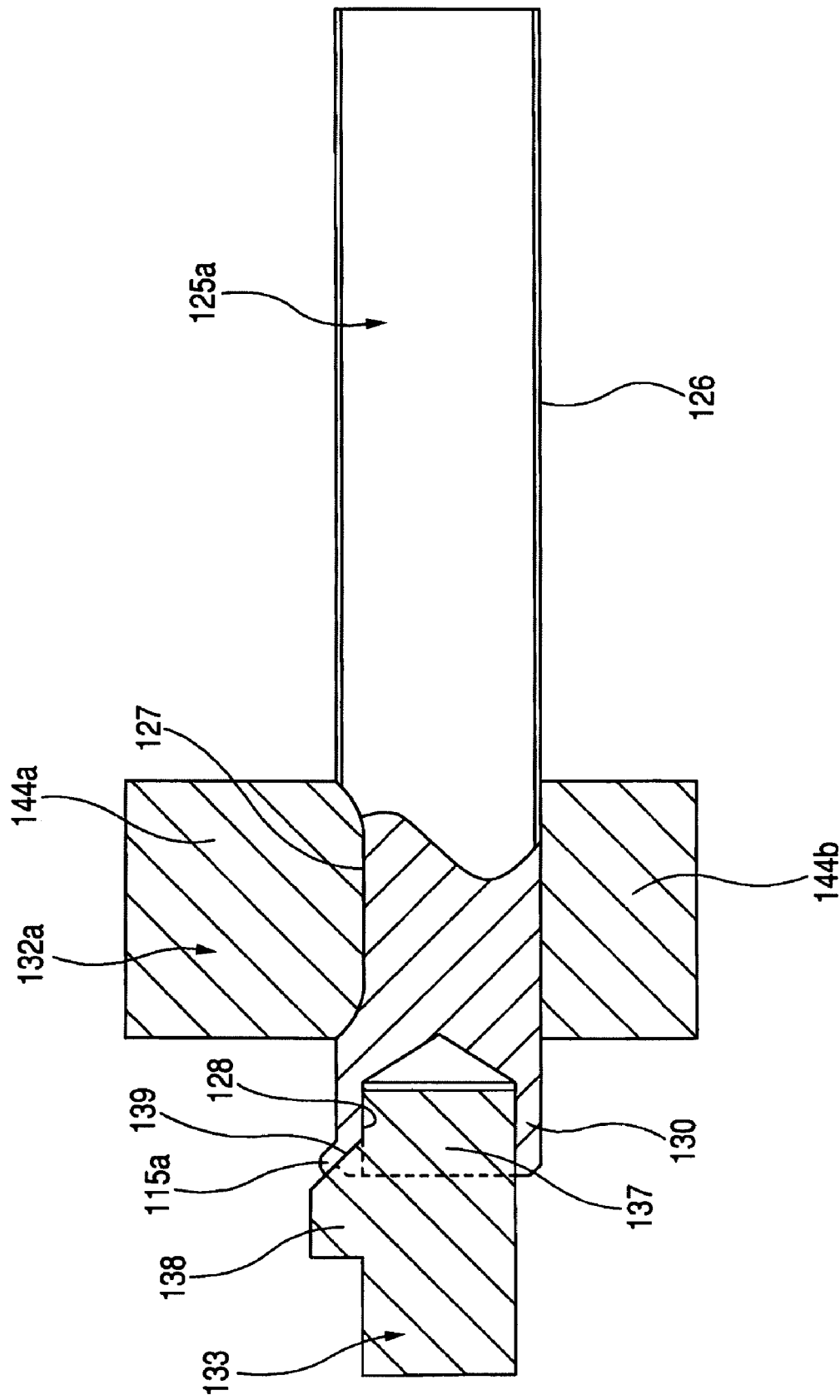
FIG. 35 A diagram similar to FIG. 33, which shows a seventh embodiment of the invention.

FIG. 35 shows a seventh embodiment of the invention. In the case of this embodiment, the construction of a receiving jig 132a which is used when forming an engagement projecting portion 115a on an outer circumferential surface of a front end portion (a left end portion in FIG. 35) of an inner shaft 125a differs from that of the sixth embodiment described above. In the case of this embodiment, the receiving jig 132a includes a pair of divided elements 144a, 144b. In addition, in such a state that of these divided elements, one divided element 144a is brought into engagement with an engagement recess portion 127 on the inner shaft 125a, a portion of the inner shaft 125a which lies closer to a front edge thereof is gripped by both the divided elements 144a, 144b. In the case of this embodiment configured in this way, by making use of the accuracy of the shape of the engagement recess portion 127, the accuracy by which the inner shaft 125a is positioned radially and axially by the receiving jig 132a can be ensured sufficiently. In addition, in the case of this embodiment, since a rear end portion (a right end portion in FIG. 35) of the inner shaft 125a does not have to be fitted in the receiving jig, the rear end portion of the inner shaft 125a is not made into a cylindrical tube-shaped portion. The other configurations and functions of this embodiment are the same as those of the sixth embodiment that has been described above.

Eighth Embodiment

Figure 36:
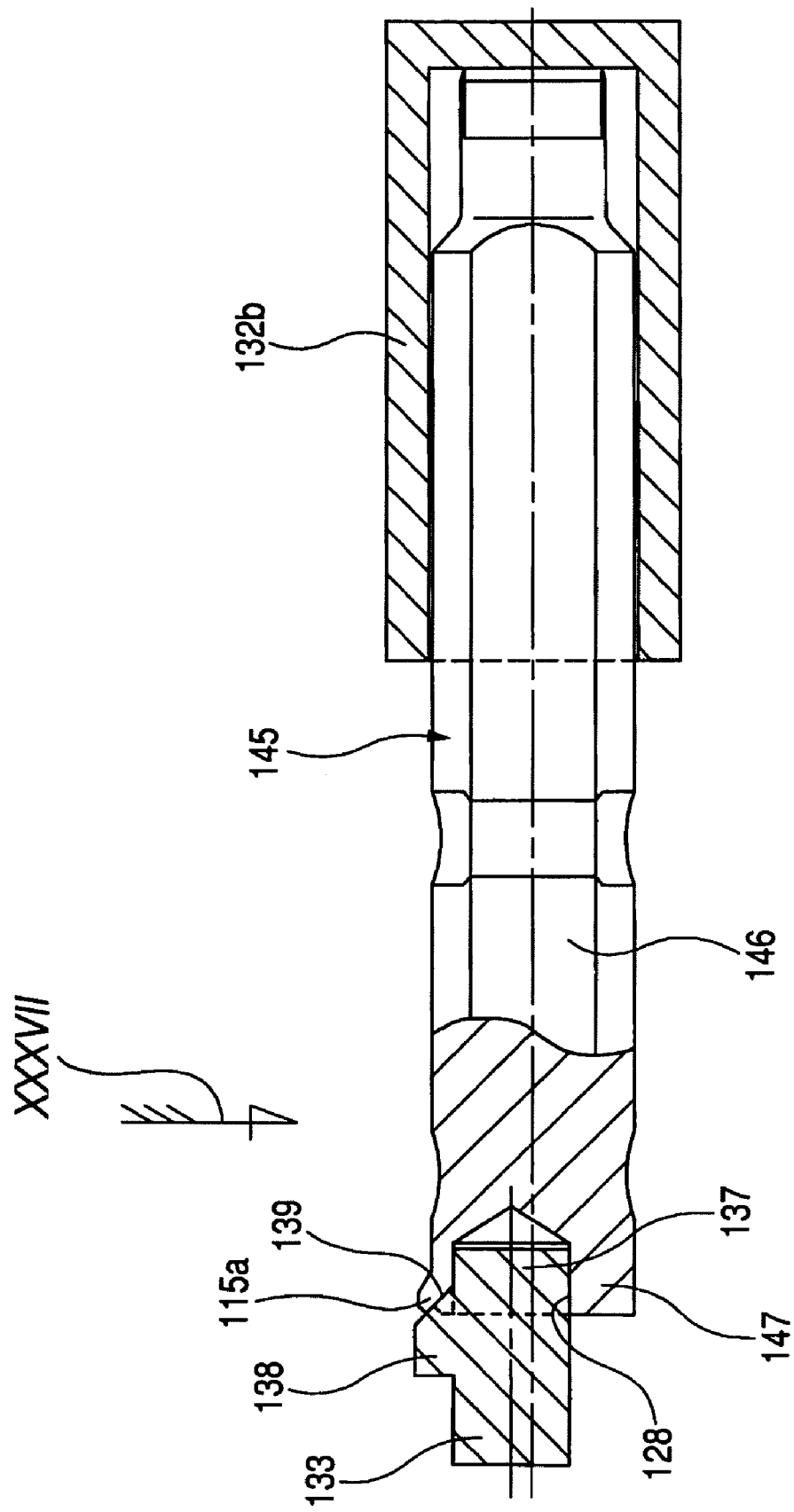
FIG. 36 A diagram similar to FIG. 33, which shows an eighth embodiment of the invention.
Figure 37:
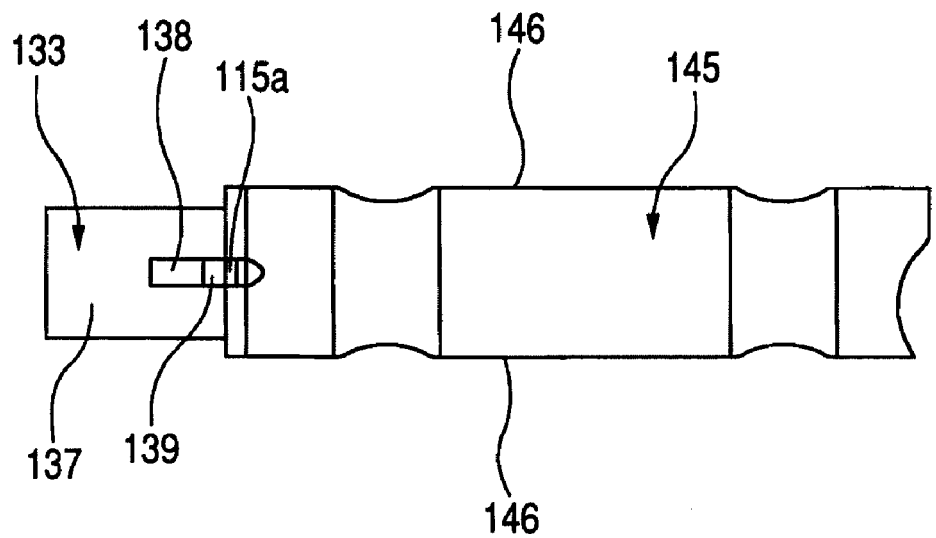
FIG. 37 A view seen from a direction indicated by an arrow XXXVII in FIG. 36.
Figure 38:
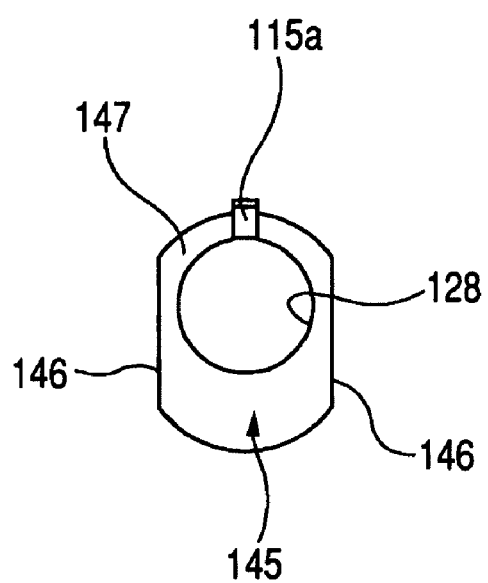
FIG. 38 A view seen from the left in FIG. 36, with only a shaft removed.

FIGS. 36 to 38 show an eighth embodiment of the invention. In the case of this embodiment, a shaft 145 which connects to a yoke of a universal joint (not shown) has a pair of flat surface portions 146, 146 which are parallel to each other on an outer circumferential surface in two positions which are opposite to each other with respect to a diametrical direction. By this configuration, a cross sectional shape of the outer circumferential surface is made into an oval shape as is shown in FIG. 38. In addition, by a circular hole 128 which is eccentric relative to an axis of the shaft 145 being formed on an inside diameter side of one end portion (a left end portion in FIG. 36) of the shaft 145, the one end portion of the shaft 145 is made into a tube-shaped portion 147 whose radial thickness is uneven along the full circumference thereof. In the case of this embodiment, when work is performed of forming an engagement projecting portion 115a on the outer circumferential surface of the one end portion (the upper surface in FIGS. 36, 38) of the shaft 145, as is shown in FIG. 36, the other half portion (a right-hand half portion in FIG. 36) or the shaft 145 is supported by a bottomed tube-shaped jig 132b while the relevant portion is positioned properly with respect to the radial and axial directions. In addition, as in the case of the sixth embodiment that has been described before, in this state, a distal end portion of a cylindrical portion 137 of a pressing jig 133 is pushed into an inside of the circular hole 128, to thereby form the engagement projecting portion 115a by a pressing portion 138 of the pressing jig 133. In addition, in the case of this embodiment, as the yoke of the universal joint, a yoke is used which has a shaft attaching portion which includes a pair of holding surfaces which are brought into friction engagement with one end portions of both the flat surface portions 146, 146 with a bolt tightened (for example, a so-called side-insertion-type yoke).

Ninth Embodiment

Figure 39:
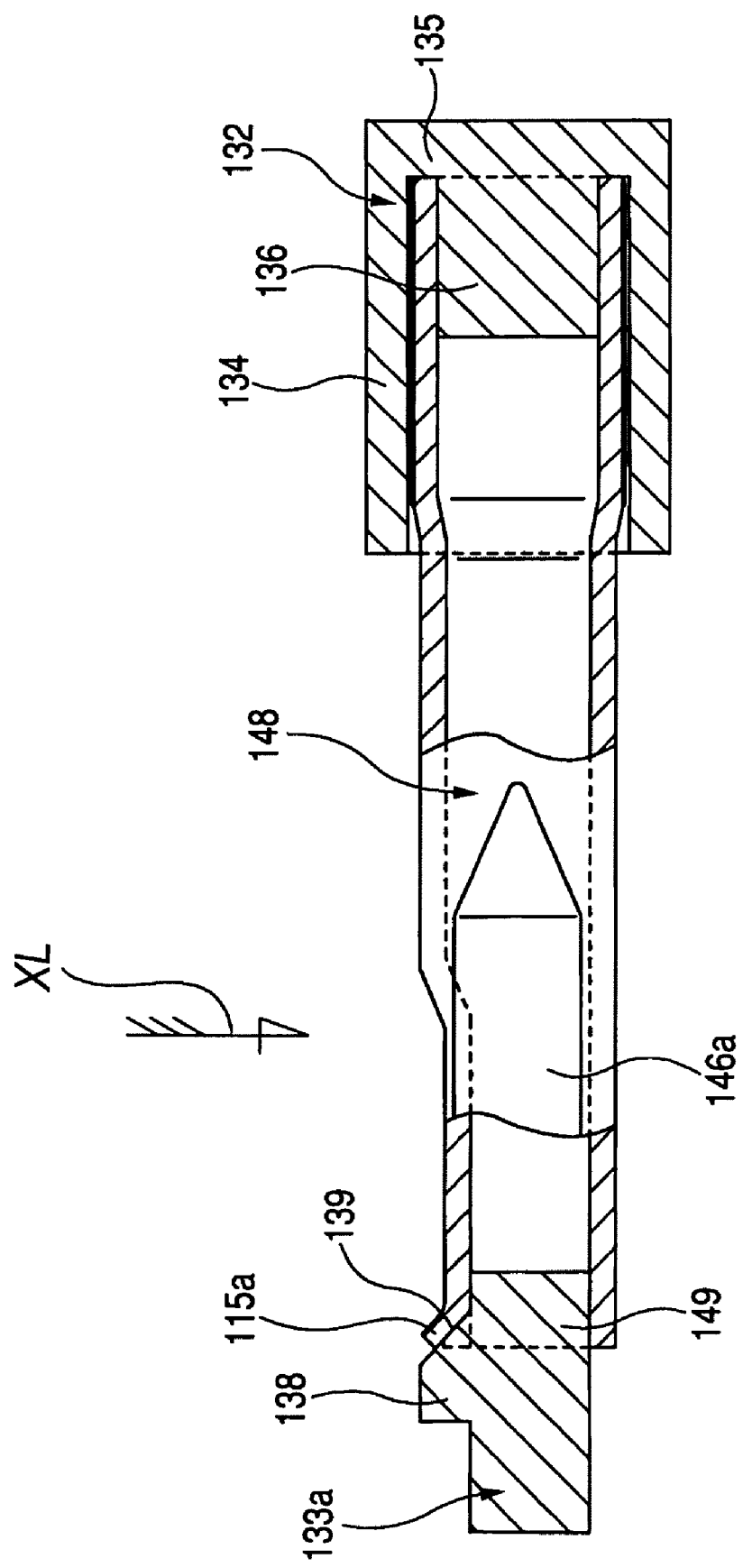
FIG. 39 A diagram similar to FIG. 33, which shows a ninth embodiment of the invention.
Figure 40:
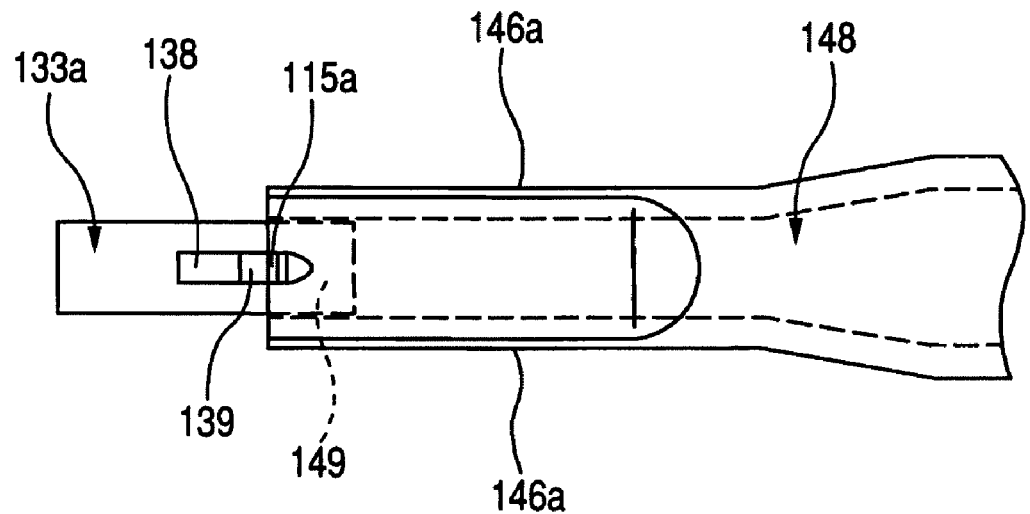
FIG. 40 A view seen from a direction indicated by an arrow XL in FIG. 39.
Figure 41:
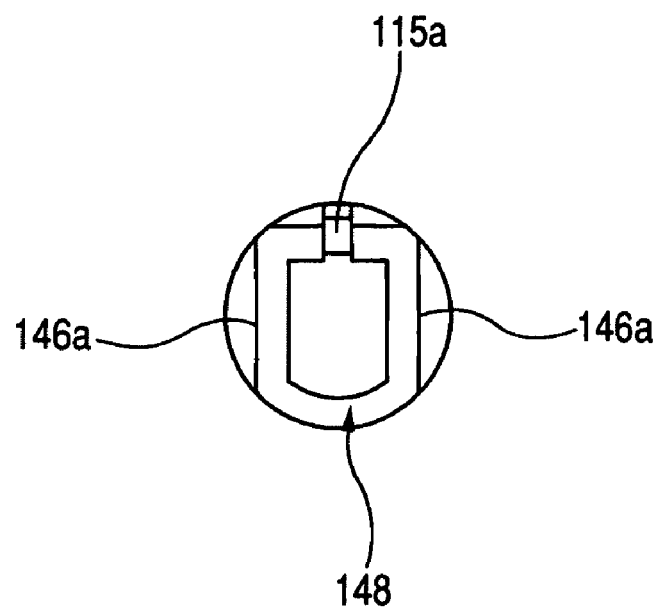
FIG. 41 A view seen from the left in FIG. 39, with only a shaft removed.
Figure 42:
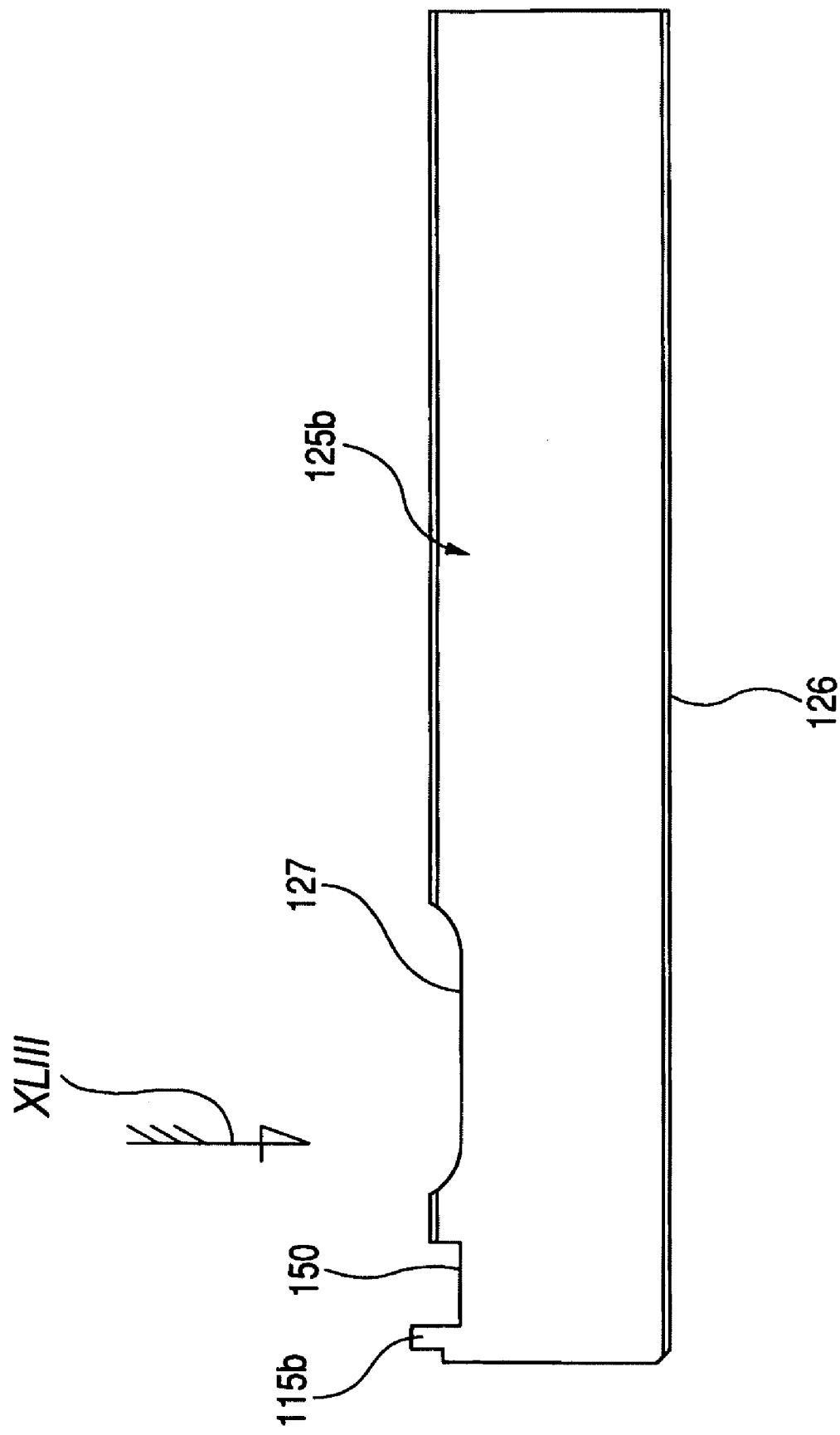
FIG. 42 A side view of an inner shaft which configures an intermediate shaft, which shows a tenth embodiment of the invention.
Figure 43:
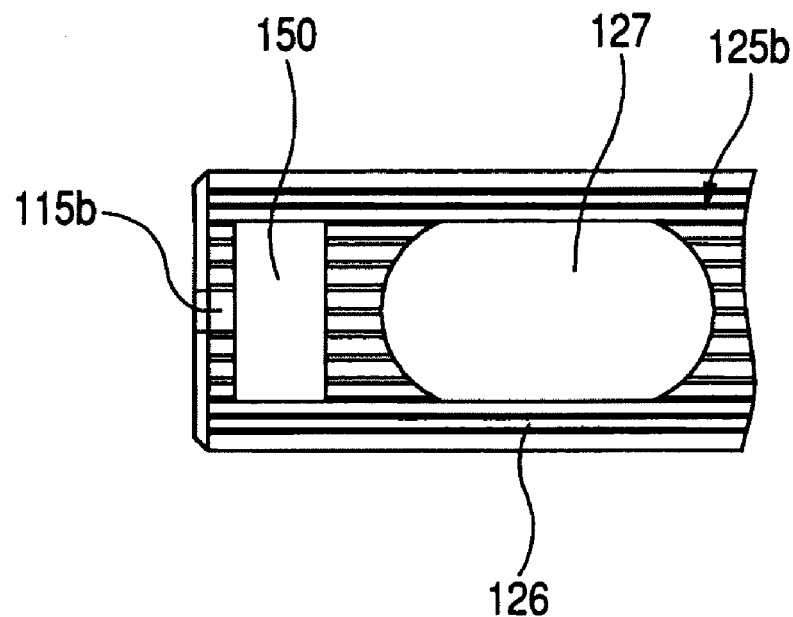
FIG. 43 A view seen from a direction indicated by an arrow XLIII in FIG. 42.
Figure 44:
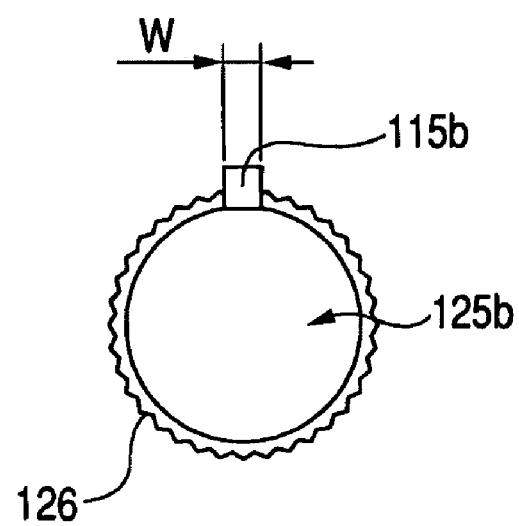
FIG. 44 A view seen from the left in FIG. 42.
Figure 45:
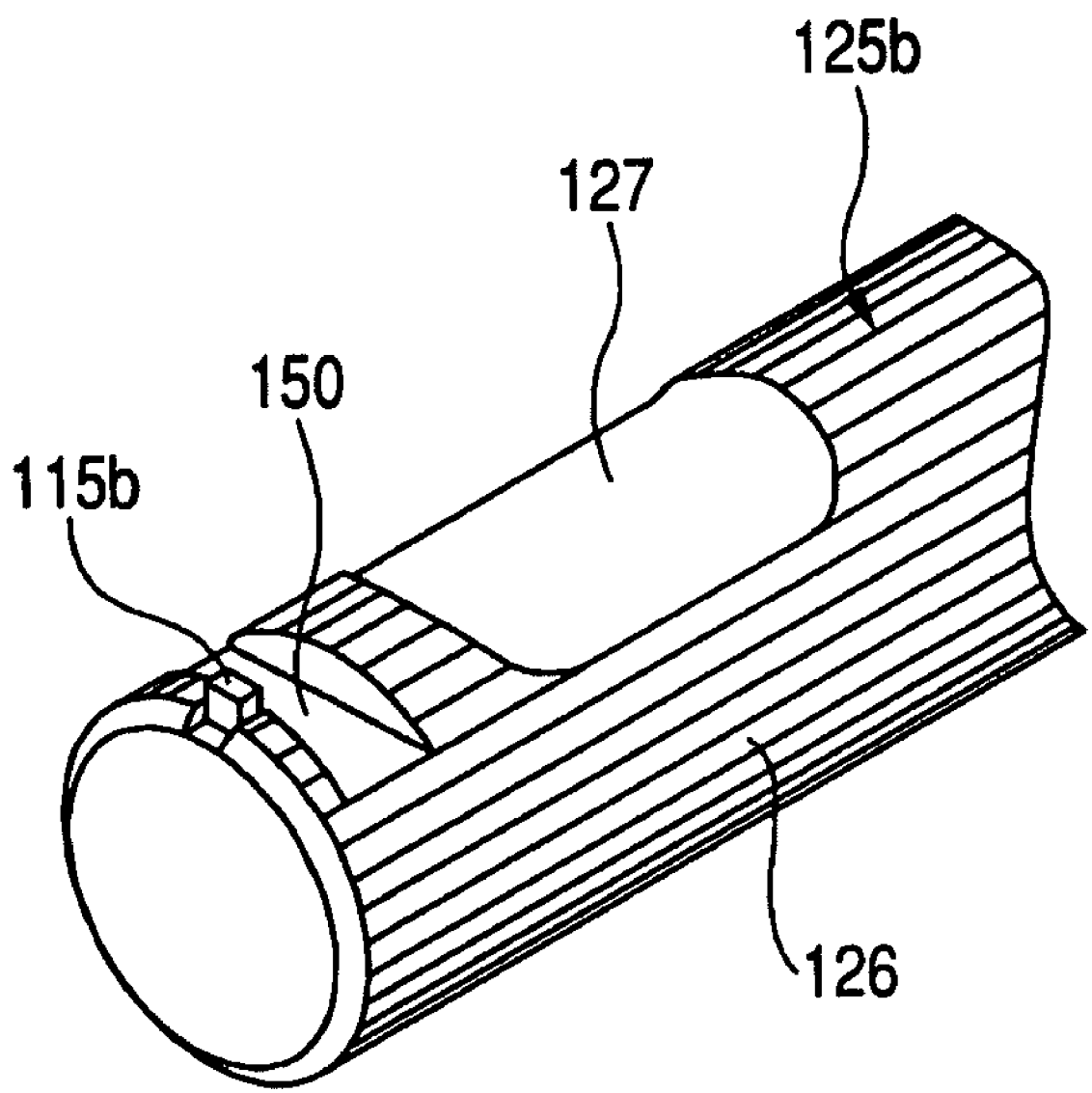
FIG. 45 A perspective view of a front half portion of the inner shaft.

FIGS. 39 to 41 show a ninth embodiment of the invention. In the case of this embodiment, a shaft 148 which connects to a yoke of a universal joint, not shown, is formed into a tube-like shape as a whole. Specifically, part of this shaft 148 from one end portion (a left end portion in FIG. 39) to a portion lying one end thereof is formed into an angular tube shape. Further, part of the shaft 148 from the other end portion (a right end portion in FIG. 39) to an intermediate portion is formed into a cylindrical tube-like shape. In the case of this embodiment, when work is performed of forming an engagement projecting portion 115a on an outer circumferential surface (an upper surface in FIGS. 39, 41) of the one end portion of the shaft 148, as is shown in FIG. 39, the other end portion of the shaft 148 is supported by a receiving jig 132 while the relevant portion is positioned properly with respect to the radial and axial directions. In addition, in this state, a distal end portion of a prism-like portion 149 of a pressing jig 133 is pushed into an inside of the one end portion of the shaft without any looseness, to thereby form the engagement projecting portion 115a by a pressing portion 138 of the pressing jig 133, as in the case of the sixth embodiment that has been described before. In addition, in the case of this embodiment, as well, as the yoke of the universal joint, a yoke is used which has a shaft attaching portion which includes a pair of holding surfaces which are brought into friction engagement with a pair of flat surface portions 146a, 146a which reside on both sides of the one end portion of the shaft 148 with a bolt tightened (for example, a so-called side-insertion-type yoke).

In addition, when this embodiment is carried out, the engagement projecting portion can also be formed by forming cuts in portions lying at both circumferential sides of a portion of the tube-shaped portion provided at the one end portion of the shaft and thereafter, plastically bending and erecting a portion lying between both the cuts radially outwards.

Tenth Embodiment

FIGS. 42 to 47 show a tenth embodiment of the invention. This embodiment is characterized by the construction of an engagement projecting portion 115b which is provided on an outer circumferential surface of a front end portion (a left end portion in FIGS. 42, 43, 44, 45) and a method of forming the same engagement projecting portion. Since the constructions and functions of other portions are the same as those of the sixth embodiment shown in FIGS. 24 to 28 that has been described before, repeated illustrations and descriptions will be omitted or be made briefly, and hereinafter, characteristic portions of this embodiment and portions which differ from the sixth embodiment will mainly be described.

As is shown in FIGS. 42 to 45 which show a completed inner shaft 125b, in the case of this embodiment, in order to form an engagement projecting portion 115b on an outer circumferential surface of a front end portion of the inner shaft 125b, a rectangular recessed groove 150 is formed on the outer circumferential surface of the inner shaft 125b at a portion which is adjacent to a rear end side (a right end side in FIGS. 42, 43, 46, 47) of the engagement projecting portion 115b. In the case of this embodiment, a circumferential phase and width dimension of the recessed groove 150 are made equal to a circumferential phase and width dimension of an engagement recess portion 127 which resides further rearwards than the recessed groove 150. In addition, in the case of this embodiment, these engagement recess portion 127 and recessed groove 150 are formed by milling work after a male serration portion 126 has been formed on the outer circumferential surface of the inner shaft 125b. In addition, as has been described above, in the case of this embodiment, the engagement recess portion 127 and the recessed groove 150 are formed on the outer circumferential surface of the inner shaft 125b in positions which are equal with respect to circumferential phase and are close to each other. Because of this, in forming the engagement recess portion 127 and the recessed groove 150, work of milling the engagement recess portion 127 and work of milling the recessed groove 150 can be implemented in the same chucking state (attachment and detachment of the works to and from a chuck of a milling machine can be implemented at one time).

Figure 46:
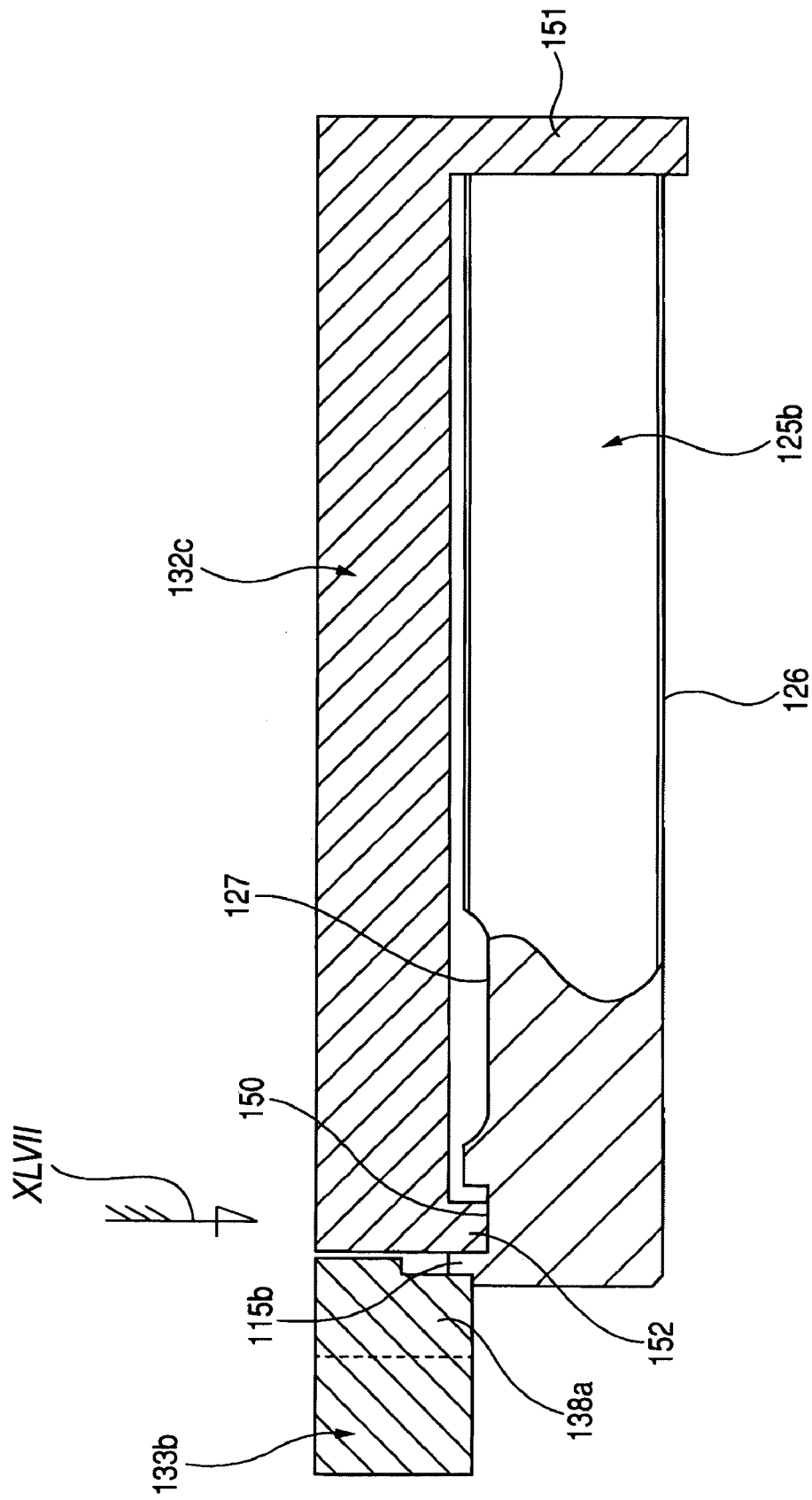
FIG. 46 A partially sectional view showing a working state in which an engagement projecting portion is formed on an outer circumferential surface of a front end portion of the inner shaft.
Figure 47:
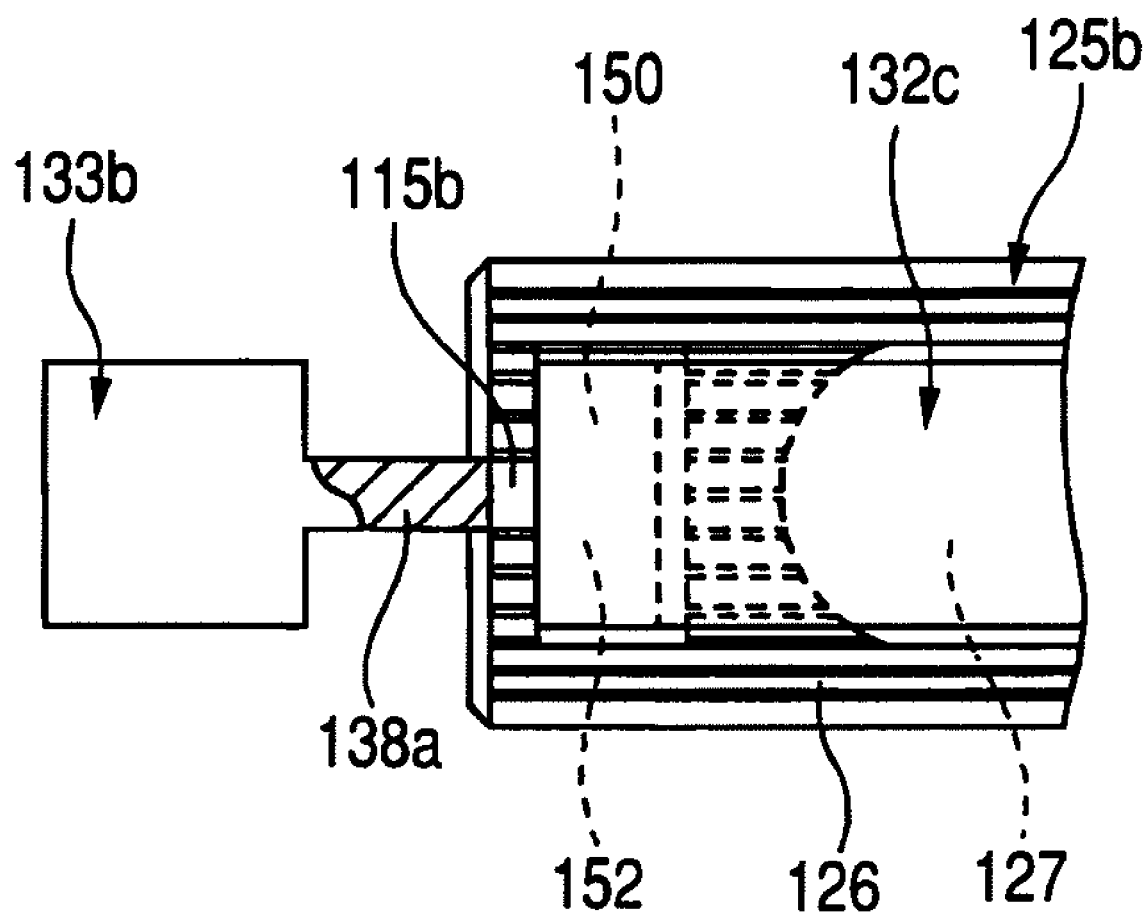
FIG. 47 A partially cut away view seen from a direction indicated by an arrow XLVII in FIG. 46.

In addition, the engagement projecting portion 115b is formed by the use of a receiving jig 132c and a pressing jig 133b as is shown in FIGS. 46 to 47 after a shaft intermediate element has been manufactured on which the male serration portion 126 and the engagement recess portion 127 and the recessed groove 150 are formed. Of the receiving jig 132c and the pressing jig 133b, the receiving jig 132c includes a support plate portion 151 on a lower surface (in a vertical direction in FIG. 46) of a proximal end portion (a right end portion in FIG. 46) and a holding plate portion 152 on a lower surface of a distal end portion. In addition, the pressing jig 133b includes a plate-like pressing portion 138a having the same lateral width as that of the engagement projecting portion 115b at a lower half portion of the distal end portion (a right end portion in FIGS. 46 to 47).

When forming the engagement projecting portion 115b by the use of the receiving jig 132c and the pressing jig 133b, as is shown in FIG. 46, a rear end face of the inner shaft 125b is supported by the support plate portion 151 which makes up the receiving jig 132c. In conjunction with this, a state is produced in which a rear end face of a material which resides in a portion lying between a front end face of the inner shaft 125b and the recessed groove 150 is held by the holding plate portion 152 which makes up the receiving jig 132c. In addition, in this state, a front end face of the pressing portion 138a which makes up the pressing jig 133b is pressed against a circumferentially central portion of a front end face of the material. Further, a distal end portion of the pressing portion 138a is pushed into an inside of the material lying at the portion so pressed against while plastically deforming the material. By this action, a portion of the material which is held between the pressing portion 138a and the holding plate portion 152 is collapsed in the axial direction so as to erect it in the radial direction. In addition, the portion which is erected in the radial direction is referred to as the engagement projecting portion 115b.

In addition, in the case of this embodiment, the height dimension of the engagement projecting portion 115b can be adjusted by the depth dimension of the recessed groove 150 and the push-in amount of the pressing portion 138a into the material. In the case of this course of approach being taken, the push-in amount of the pressing portion 138a can be regulated by various methods which includes, for example, a method in which the push-in amount of the pressing portion 138a into the material is referred to as an amount by which a distal end face of a portion which projects further towards the distal end side than the pressing portion 138a is to be brought into abutment with an upper half portion of a distal end face of the receiving jig 132c at an upper half portion of a distal end portion of the pressing jig 133b.

In the case of the embodiment that has been described above, being different from the case of the conventional construction shown in FIG. 50, there occurs no such situation that the material to form the engagement projecting portion 115b is reduced as a result of increasing the circumferential width dimension W (FIG. 44) of the engagement projecting portion 115b which is determined in the design stage. Because of this, even in the event that a space between both circumferential edges of a shaft attaching portion 110 (refer to FIG. 26) which configures a yoke 109a is wide and a circumferential width dimension of the engagement projecting portion 115b which is determined in the design stage is increased so as to match the increase in the space between the circumferential edges of the shaft attaching portion 110, the formation of the engagement projecting portion 115b is facilitated. In addition, in the case of this embodiment, no hole needs to be formed in the front end face of the inner shaft 125b (the front end portion thereof does not have to be made into a tube-shaped portion) in order to form the engagement projecting portion 115b. In addition, although the aforesaid recess groove 150 needs to be formed in place of so forming a hole, as has been described before, the inner shaft portion 125b can be worked to produce this recessed groove 150 together with the engagement recess portion 127 in the same chucking state. Because of this, the manufacturing costs of the inner shaft 125b can be suppressed.

Eleventh Embodiment

Figure 48:
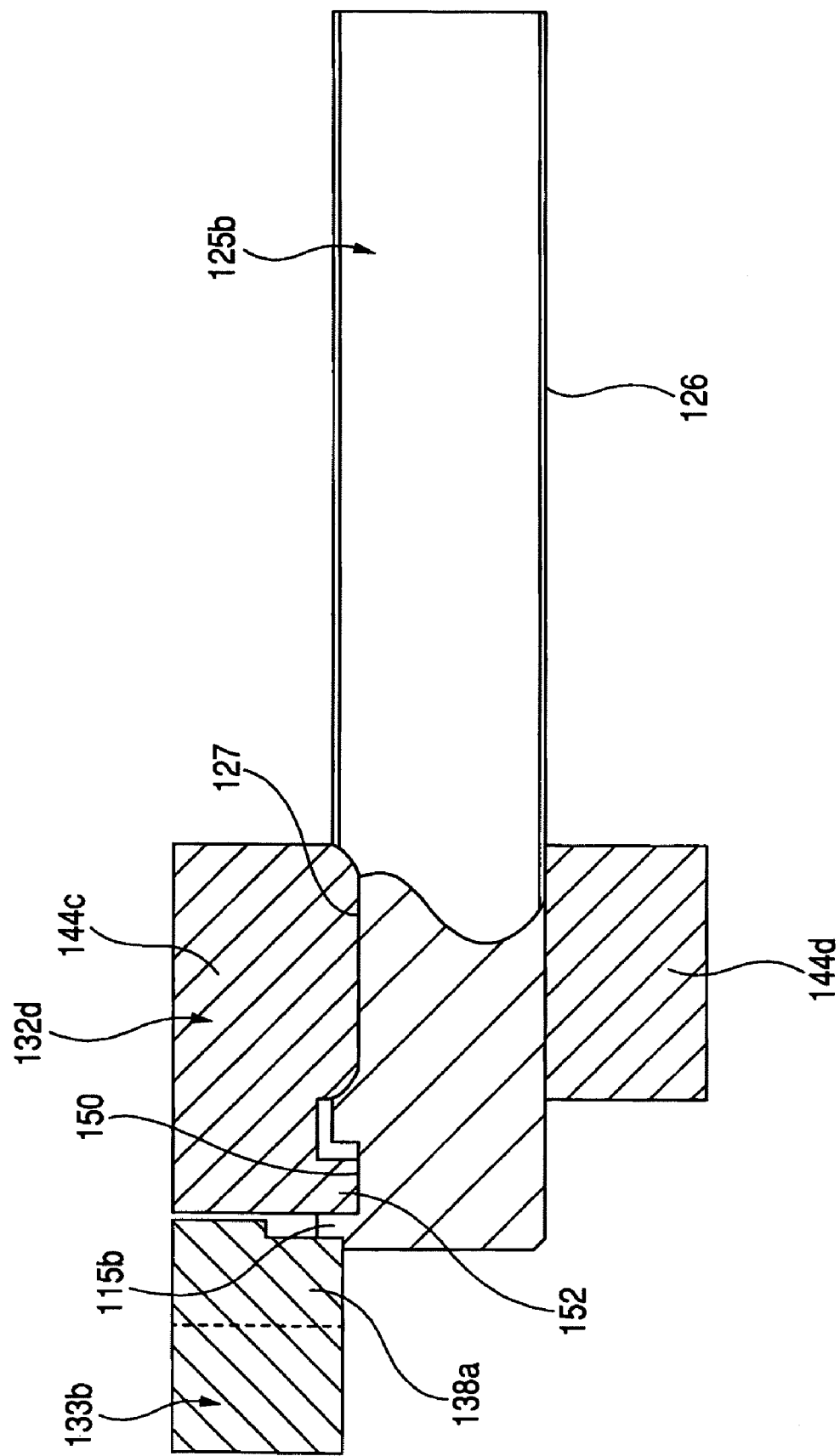
FIG. 48 A diagram similar to FIG. 46, which shows an eleventh embodiment of the invention.

FIG. 48 shows an eleventh embodiment of the invention. In the case of this embodiment, the construction of a receiving jig 132d which is used to form an engagement projecting portion 115b on an outer circumferential surface of a front end portion of an inner shaft 125b differs from that of the tenth embodiment that has been described above. In the case of this embodiment, this receiving jig 132d includes a pair of divided elements 144c, 144d. In addition, of these divided elements, with one divided element 144c being brought into engagement with an engagement recess portion 127 on the inner shaft 125b, a portion of the inner shaft 125b which lies close to a front end thereof is gripped by both the divided elements 144c, 144d. In the case of this embodiment configured as described above, by making use of the accuracy of the shape of the engagement recess portion 127, the accuracy with which the inner shaft 125b is positioned properly in the radial direction and the axial direction can be ensured sufficiently.

Since the other configurations and functions of this embodiment are the same as those of the tenth embodiment, like reference numerals will be imparted to like portions to those of the tenth embodiment, and the repeated description thereof will be omitted.

In addition, although the illustration thereof is omitted, when carrying out the tenth to eleventh embodiments that have been described above, a guide recess portion can also be provided on a distal end portion of the receiving jig or the pressing jig so as to prevent the width dimension of the engagement projecting portion which is being formed from extending toward the circumferential direction.

Additionally, although the illustration thereof is omitted, the tenth and eleventh embodiments can be carried out to be applied to a shaft like the one shown in FIGS. 36 to 38, that is, a shaft having a pair of flat surface portions which are parallel to each other in two positions on an outer circumferential surface of the shaft which are opposite to each other in a diametric direction. Further, the tenth and eleventh embodiments can also be carried out to be applied to a hollow shaft like the one shown in FIGS. 39 to 41.

While the invention has been described in detail or by reference to the specific embodiments, it is obvious to those skilled in the art to which the invention pertains that various changes or modifications can be made to the invention without departing from the spirit and scope thereof.

This patent application is based on:

Japanese Patent Application (No. 2007-118500) filed on Apr. 27, 2007;

Japanese Patent Application (No. 2007-339349) filed on Dec. 28, 2007;

Japanese Patent Application (No. 2008-017053) filed on Jan. 29, 2008; and

Japanese Patent Application (No. 2008-032705) filed on Feb. 14, 2008, and the contents thereof are to be incorporated herein by reference.

INDUSTRIAL APPLICABILITY

According to the invention, since the bolt engagement recess portion and the dislocation projecting portion are formed on the shaft of the intermediate shaft, the small diameter portion of the shoulder bolt is made to be brought into engagement with the outer circumferential portion of the shaft of the intermediate shaft and the large diameter portion of the shoulder bolt is made to be brought into engagement with the bolt engagement recess portion, not only can both the temporary fastening and final fastening be implemented without reducing the cross sectional area of the shaft of the intermediate shaft but also the free stroke length when the temporary fastening is implemented can be made long, there can be obtained the advantage that the assembling work of the steering apparatus can be facilitated.

The invention claimed is:

1. A steering apparatus comprising an intermediate shaft, a first universal joint connecting the intermediate shaft and a steering shaft to which a steering wheel is attached, and a second universal joint connecting the intermediate shaft and a steering gear mechanism, wherein the intermediate shaft has a bolt engagement recess portion which is formed on an outer circumferential surface of a shaft portion of the intermediate shaft in such a manner as to extend in a direction which intersects an axial direction and a dislocation preventive projecting portion which is formed on an outer circumferential surface of an end portion of the intermediate shaft, and wherein as a member for fastening a first yoke of one of the first and second universal joints and the shaft portion of the intermediate shaft together, a shoulder bolt is provided on which a small diameter portion adapted to be brought into engagement with the dislocation preventive projecting portion of the intermediate shaft and a large diameter portion adapted to be brought into engagement with the bolt engagement recess portion are formed in that order from a distal end portion side, whereby the first yoke and the shaft portion of the intermediate shaft are temporarily fastened together by bringing the small diameter portion of the shoulder bolt into engagement with the dislocation preventive projecting portion which lies adjacent to the bolt engagement recess portion, and the first yoke and the shaft portion of the intermediate shaft are finally fastened together by bringing the large diameter portion of the shoulder bolt into engagement with the bolt engagement recess portion, wherein a portion of the large diameter portion of the shoulder bolt is disposed within a radial range between a bottom of the bolt engagement recess portion and an outside diameter of the shaft portion of the intermediate shaft, and wherein a portion of the small diameter portion of the shoulder bolt is disposed within a radial range between the outside diameter of the shaft portion of the intermediate shaft and a distal end of the dislocation preventive projecting portion.

2. The steering apparatus according to claim 1, wherein the intermediate shaft is fitted in a second yoke of the other of the first and second universal joints such that, when an impact load is inputted, a relative movement between the intermediate shaft and the second yoke is permitted.

3. The steering apparatus according to claim 1, wherein a small diameter portion is formed on the shaft portion of the intermediate shaft, and a slidable connecting tube-shaped element for connecting between shaft portions which hold therebetween the small diameter portion is fitted on an outer circumference of the small diameter portion, whereby when absorbing impact, the other yoke of the universal joint pushes the connecting tube-shaped element in the axial direction to thereby release a connected state between the shaft portions which hold therebetween the small diameter portion.

4. The steering apparatus according to claim 1, wherein a bolt dislocation preventive portion is formed at a distal end of the small diameter portion of the shoulder bolt.

5. The steering apparatus according to claim 1, wherein the bolt engagement recess portion is made up of a milled groove whose bottom portion has a predetermined length in the axial direction.

6. The steering apparatus according to claim 1, wherein the shoulder bolt fastens the first yoke of the second universal joint and the shaft portion of the intermediate shaft.

7. The steering apparatus according to claim 1, wherein
the shoulder bolt comprises a male thread formed on an outer circumferential surface of the small diameter portion and a tapered outer circumferential surface which is formed on a side of the large diameter portion which lies to face the small diameter portion and which is gradually reduced in diameter as it extends towards the small diameter portion, and wherein
the first yoke comprises a shaft holding portion which is an annular member having a slit provided therein for free contraction in diameter so as to fit on to hold the shaft portion of the intermediate shaft, a pair of flange portions which extend from positions which hold therebetween the slit in the shaft holding portion with a predetermined distance maintained therebetween, a female thread formed in one flange portions of the pair of flange portions for screw engagement with the male thread on the small diameter portion, and a bolt through hole formed in the other flange portion in such a manner as to penetrate therethrough towards the female thread for engagement with the large diameter portion of the shoulder bolt, whereby when the shoulder bolt is inserted from the other flange portion side so that the male thread on the small diameter portion is screwed into the female thread on the one flange portion in a temporarily fastened state in which the shaft holding portion is not contracted in diameter, part of the tapered outer circumferential surface formed on the side of the large diameter portion which lies to face the small diameter portion is loosely inserted into the bolt insertion hole in the other flange portion.

8. The steering apparatus according to claim 7, wherein the shoulder bolt has a straight portion whose axial outside diameter remains the same between the small diameter portion and the bolt head portion, and a large diameter collar portion in which the tapered outer circumferential surface is provided on a side thereof which lies to face the small diameter portion is fitted on the straight portion.

9. The steering apparatus according to claim 1, comprising a phase matching portion which matches a circumferential phase of the shaft portion to the first yoke so that the bolt engagement recess portion is disposed in a position where the bolt engagement recess portion is brought into engagement with the large diameter portion of the shoulder bolt.

10. The steering apparatus according to claim 9, wherein
the shaft portion of the intermediate shaft and the first yoke are connected together though serration engagement or spline engagement, and wherein
the phase matching portion is made up of a projecting portion which is formed by cutting part of serration teeth or spline teeth of one of the shaft portion and the first yoke and a recess portion which is formed by cutting part of serration teeth or spline teeth of the other of the shaft portion and the first yoke, the projecting portion and the recess portion being made to fit in and on each other only when the bolt engagement recess portion is disposed in a position where the bolt engagement recess portion is brought into engagement with the large diameter portion of the shoulder bolt.

11. The steering apparatus according to claim 1, wherein
the first yoke has a tube-shaped shaft attaching portion which has a discontinued portion at one location in a circumferential direction, a pair of flange portions which are provided substantially parallel to each other in such a manner as to extend continuously from both circumferential edges of the shaft attaching portion, a through hole which is provided in one of the flange portions, and a thread hole which is provided in the other of the flange portions in such a manner as to be coaxial with the through hole, wherein
the end portion of the intermediate shaft is inserted into an inside of the shaft attaching portion, such that the dislocation preventive projecting portion is disposed between the flange portions and deeper into the shaft attaching portion in axial direction than the through hole and the thread hole, wherein
the bolt has a shank portion which has a male thread portion provided at least at a distal end portion thereof and a head portion which resides at a proximal end portion of the shank portion, of the shank portion and the head portion, by the shank portion being inserted into an inside of the through hole and by the male thread portion being screwed into the thread hole and being further tightened thereinto, the end portion of the intermediate shaft being made to be connected to the shaft attaching portion, whereby the dislocation of the end portion of the intermediate shaft from the inside of the shaft attaching portion towards the other end side is made to be prevented based on engagement of the shank portion of the bolt with the dislocation preventive projecting portion even in a temporarily fastened state in which the shank portion of the bolt is inserted into the inside of the through hole and the male thread portion is screwed into the thread hole, with the bolt being not tightened.

12. The steering apparatus according to claim 11, wherein the intermediate shaft is made into a tube-shaped portion at least at the end portion thereof, and wherein the dislocation preventive projecting portion is formed by plastically bending and erecting radially outwards one circumferential portion of the tube-shaped portion at a distal end portion thereof in such a state that the dislocation preventive projecting portion is cut apart from both circumferential side portions of the one circumferential portion.

13. The steering apparatus according to claim 11, wherein the intermediate shaft has a recessed groove formed in one circumferential location on an outer circumferential surface of a portion which lies closer to the end portion, and wherein the dislocation preventive projecting portion is formed by squeezing a material of the intermediate shaft residing in a portion between the recessed groove and one end face of the intermediate shaft in the axial direction of the intermediate shaft so as to erect the material so squeezed radially outwards.

14. The steering apparatus according to claim 1, wherein the shoulder bolt, including the small diameter portion and the large diameter portion, is formed as a single unitary piece.

15. The steering apparatus according to claim 1, wherein, when the first yoke and the shaft portion of the intermediate shaft are temporarily fastened together, the small diameter portion of the shoulder bolt directly contacts the dislocation preventive projecting portion.

16. A method for manufacturing a steering apparatus comprising an intermediate shaft, a first universal joint connecting the intermediate shaft and a steering shaft to which a steering wheel is attached, and a second universal joint connecting the intermediate shaft and a steering gear mechanism, wherein the intermediate shaft has a bolt engagement recess portion which is formed on an outer circumferential surface of a shaft portion of the intermediate shaft in such a manner as to extend in a direction which intersects an axial direction and a dislocation preventive projecting portion which is formed on an outer circumferential surface of an end portion of the intermediate shaft, and wherein as a member for fastening a yoke of one of the first and second universal joints and the shaft portion of the intermediate shaft together, a shoulder bolt is provided on which a small diameter portion adapted to be brought into engagement with the dislocation preventive projecting portion of the intermediate shaft and a large diameter portion adapted to be brought into engagement with the bolt engagement recess portion are formed in that order from a distal end portion side, wherein a portion of the large diameter portion of the shoulder bolt is disposed within a radial range between a bottom of the bolt engagement recess portion and an outside diameter of the shaft portion of the intermediate shaft, and wherein a portion of the small diameter portion of the shoulder bolt is disposed within a radial range between the outside diameter of the shaft portion of the intermediate shaft and a distal end of the dislocation preventive projecting portion, the method comprising:

a first step of temporarily fastening the yoke and the shaft portion of the intermediate shaft together by bringing the small diameter portion of the shoulder bolt into engagement with the dislocation preventive projecting portion which lies adjacent to the bolt engagement recess portion; and a second step of finally fastening the yoke and the shaft portion of the intermediate shaft together by bringing the large diameter portion of the shoulder bolt into engagement with the bolt engagement recess portion.

17. A method for manufacturing the intermediate shaft set forth in claim 16, wherein after a shaft intermediate element of which at least one end portion is made into a tube-shaped portion is manufactured, with a jig being pressed on to one circumferential portion of the tube-shaped portion at a distal end portion thereof in an axial direction to thereby cause a force directed radially outwards to be exerted on the one circumferential portion, the one circumferential portion is plastically bent and erected radially outwards while tearing off portions lying on both circumferential sides of the one circumferential portion so as to form the dislocation preventive projecting portion.

18. A method for manufacturing the intermediate shaft according to claim 16, wherein after a shaft intermediate element in which a recessed groove is formed in one circumferential location on an outer circumferential surface of a portion which lies closer to one end portion of the shaft intermediate element, a material residing in a portion between the recessed groove and one end face of the shaft intermediate element is squeezed in an axial direction of the shaft intermediate element by a pair of jigs so as to cause the material so squeezed to be erected radially outwards to thereby form the dislocation preventive projecting portion.

19. The method according to claim 16, wherein the shoulder bolt, including the small diameter portion and the large diameter portion, is formed as a single unitary piece.

20. The method according to claim 16, wherein, when the yoke and the shaft portion of the intermediate shaft are temporarily fastened together, the small diameter portion of the shoulder bolt directly contacts the dislocation preventive projecting portion.

* * * * *